US012597661B2

(12) United States Patent　　　(10) Patent No.: US 12,597,661 B2
Herter et al.　　　　　　　　　　(45) Date of Patent: Apr. 7, 2026

(54) BATTERY DEVICES AND METHOD FOR FIXING BATTERY CELLS

(71) Applicant: ElringKlinger AG, Dettingen (DE)

(72) Inventors: Stefan Herter, Uttenweiler (DE); Tobias Schmidt, Pliezhausen (DE); Stefan Dwenger, Reutlingen (DE); Jochen Hantschel, Dettingen/Erms (DE); Michael Grotz, Eningen (DE); Moritz Bertsch, Dettingen/Erms (DE); Armin Diez, Lenningen (DE); Mark Laderer, Grabenstetten (DE); André Wiechert, Gomadingen (DE); Joachim Buck, Laichingen (DE); Christian Honeck, Pfullingen (DE); Florian Schwarz, Reutlingen (DE); Heinrich Rot, Stuttgart (DE); Thomas Sträussl, Krumbach (DE)

(73) Assignee: ElringKlinger AG, Dettingen (DE)

( * ) Notice: Subject to any disclaimer, the term of this patent is extended or adjusted under 35 U.S.C. 154(b) by 658 days.

(21) Appl. No.: 17/582,767

(22) Filed: Jan. 24, 2022

(65) Prior Publication Data

US 2022/0216557 A1　　Jul. 7, 2022

Related U.S. Application Data

(63) Continuation of application No. PCT/EP2020/071022, filed on Jul. 24, 2020.

(30) Foreign Application Priority Data

Jul. 26, 2019　(DE) ..................... 10 2019 211 191.2
Jul. 26, 2019　(DE) ..................... 20 2019 106 550.8

Dec. 5, 2019　(DE) ..................... 10 2019 219 015.4

(51) Int. Cl.
H01M 50/213　　(2021.01)
H01M 10/643　　(2014.01)
　　　(Continued)

(52) U.S. Cl.
CPC ....... H01M 50/213 (2021.01); H01M 10/643 (2015.04); H01M 10/6556 (2015.04);
　　　(Continued)

(58) Field of Classification Search
CPC ............ H01M 50/213; H01M 50/224; H01M 50/258; H01M 50/262; H01M 50/289; H01M 10/643; H01M 10/6556
See application file for complete search history.

(56) References Cited

U.S. PATENT DOCUMENTS 5,443,926 A　　8/1995　Holland et al.
6,087,038 A　　7/2000　Flament et al.
　　　(Continued)

FOREIGN PATENT DOCUMENTS

DE　　10 2008 059 956 A1　　6/2010
DE　　10 2008 059 972 A1　　6/2010
　　　(Continued)

*Primary Examiner* — Eugenia Wang
(74) *Attorney, Agent, or Firm* — ASLAN LAW, P.C.

(57)　　　ABSTRACT

A battery device comprises one or more battery modules, one of the respective battery modules comprising the following: a frame element, a base element and a plurality of battery cell.

16 Claims, 28 Drawing Sheets

(51) Int. Cl.

| | |
|---|---|
| *H01M 10/6556* | (2014.01) |
| *H01M 50/224* | (2021.01) |
| *H01M 50/258* | (2021.01) |
| *H01M 50/262* | (2021.01) |
| *H01M 50/289* | (2021.01) |

(52) U.S. Cl.
CPC ....... *H01M 50/224* (2021.01); *H01M 50/258* (2021.01); *H01M 50/262* (2021.01); *H01M 50/289* (2021.01)

(56) References Cited

U.S. PATENT DOCUMENTS

| | | |
|---|---|---|
| 2006/0028170 A1 | 2/2006 | Izawa |
| 2011/0200856 A1 | 8/2011 | Yasui et al. |
| 2011/0212348 A1 | 9/2011 | Yasui et al. |
| 2012/0018238 A1 | 1/2012 | Mizoguchi et al. |
| 2012/0156537 A1 | 6/2012 | Meintschel et al. |
| 2012/0164490 A1 | 6/2012 | Itoi et al. |
| 2012/0263991 A1 | 10/2012 | Temmyo et al. |
| 2012/0270097 A1 | 10/2012 | Yasui et al. |
| 2014/0017530 A1 | 1/2014 | Youngs et al. |
| 2015/0243950 A1 | 8/2015 | Hara et al. |
| 2017/0025646 A1 | 1/2017 | Ota et al. |
| 2017/0025656 A1 | 1/2017 | Maeda et al. |
| 2017/0125756 A1 | 5/2017 | Nietling et al. |
| 2018/0219265 A1 | 8/2018 | Osio et al. |
| 2018/0269694 A1 | 9/2018 | Nam |
| 2018/0351220 A1 | 12/2018 | Homann |
| 2019/0044202 A1 | 2/2019 | Ruehle et al. |
| 2019/0148681 A1 | 5/2019 | Park |
| 2019/0214694 A1 | 7/2019 | Yang |
| 2019/0273231 A1 | 9/2019 | Günther et al. |
| 2019/0372069 A1 | 12/2019 | Lee |
| 2021/0028420 A1 | 1/2021 | Mayer et al. |
| 2021/0184289 A1 | 6/2021 | Jeong et al. |

FOREIGN PATENT DOCUMENTS

| | | | |
|---|---|---|---|
| DE | 10 2009 005 124 A1 | 7/2010 | |
| DE | 10 2011 081 537 A1 | 2/2013 | |
| DE | 10 2012 014 775 A1 | 1/2014 | |
| DE | 10 2012 219 301 A1 | 2/2014 | |
| DE | 10 2012 221 503 A1 | 3/2014 | |
| DE | 10 2013 207 535 A1 | 10/2014 | |
| DE | 10 2015 202 907 A1 | 8/2015 | |
| DE | 11 2015 001 861 T5 | 3/2017 | |
| DE | 10 2015 221 269 A1 | 5/2017 | |
| DE | 10 2015 221 739 A1 | 5/2017 | |
| DE | 11 2015 001 776 B4 | 10/2017 | |
| DE | 10 2016 214 640 A1 | 2/2018 | |
| DE | 10 2017 206 165 A1 | 10/2018 | |
| DE | 10 2017 213 257 A1 | 2/2019 | |
| DE | 10 2017 219 928 A1 | 5/2019 | |
| DE | 10 2017 219 934 A1 | 5/2019 | |
| DE | 10 2019 109 501 A1 | 5/2019 | |
| EP | 0 596 794 A1 | 5/1994 | |
| EP | 0 869 571 A1 | 10/1998 | |
| EP | 2 437 345 A1 | 4/2012 | |
| EP | 3 273 508 A1 | 1/2018 | |
| WO | WO-2017066596 A1 * | 4/2017 | .......... H01M 10/613 |

* cited by examiner

BATTERY DEVICES AND METHOD FOR FIXING BATTERY CELLS

RELATED APPLICATION

This application is a continuation of international application No. PCT/EP2020/071022 filed on Jul. 24, 2020, and claims the benefit of German applications No. 10 2019 211 191.2 filed on Jul. 26, 2019, No. 20 2019 106 550.8 filed on Jul. 26, 2019, and No. 10 2019 219 015.4 filed on Dec. 5, 2019, which are incorporated herein by reference in their entirety and for all purposes.

FIELD OF DISCLOSURE

The present invention relates to a battery device.

SUMMARY OF THE INVENTION

The object of the present invention is to provide a battery device that is simple and economical to produce.

This object is achieved by the features of the independent device claim.

Advantageous further developments are the subject matter of the dependent claims.

The battery device according to the invention preferably comprises the following:

One or more battery modules, each battery module comprising:

a frame element;

a base element; and a plurality of battery cells.

The battery modules are preferably arranged or can be arranged along a stacking direction.

For example, it is conceivable that a battery module comprises at least approximately 50 battery cells.

For example, it can be favorable if a battery module comprises approximately 200 to approximately 600 battery cells, for example approximately 400 battery cells.

The battery device comprises, for example, two or more than two battery modules.

The frame element of a respective battery module is preferably designed to be closed in a ring shape.

The frame element and the base element of a respective battery module preferably define an in particular pot-shaped receiving space in which battery cells of the battery module are received.

It can be favorable if the receiving space of a battery module is delimited by the frame element and by the base element of the battery module and by the base element of an adjacent battery module.

The battery device can preferably be arranged in such a way that the stacking direction of the battery modules runs parallel to the direction of gravity. In this case, the battery device is in particular arranged "vertically."

Alternatively, it is conceivable that the battery device can be arranged in such a way that the stacking direction of the battery modules runs substantially perpendicular to the direction of gravity. The battery device is in particular arranged "horizontally."

The frame element of a respective battery module preferably surrounds all of the battery cells of the battery module, in particular in a direction perpendicular to the stacking direction.

The battery cells are preferably galvanic cells.

In particular, the battery cells are what are referred to as secondary cells.

It can be favorable if the battery cells, in particular the secondary cells, are rechargeable.

The battery modules of the battery device are preferably designed to be self-supporting.

In one embodiment of the battery device, it is provided that the frame elements of the respective battery modules form housing portions of the battery device.

Preferably, the frame elements of the battery modules together form an outer skin of the battery device.

The frame element of a respective battery module preferably comprises a wall that is closed in a ring shape.

For example, it is conceivable that the frame element comprises a connecting web that is arranged between two opposing wall portions of the wall of the frame element and connects them to one another.

In particular, a surface of the wall of the respective frame element forms part of a surface of a housing of the battery device.

It can be favorable if a respective frame element comprises a double wall comprising an inner wall element and an outer wall element.

A wall, in particular an outer wall element of a double wall, of a respective frame element preferably forms part of an enclosure of the battery device, in particular part of an overall housing of the battery device, in a direction perpendicular to the stacking direction of the battery modules.

The frame elements of the battery modules of the battery device are therefore preferably not delimited by an additional enclosure in a radial direction.

The production costs of the battery device can preferably be reduced by eliminating an additional enclosure.

Within the scope of this description and the appended claims, a radial direction is understood to mean, in particular, a direction transverse, preferably perpendicular, to the stacking direction of the battery modules.

In one embodiment of the battery device, it is provided that the longitudinal axes of the battery cells of a respective battery module are arranged substantially parallel to the stacking direction of the battery modules.

If the longitudinal axes of the battery cells of a respective battery module are arranged substantially parallel to the stacking direction of the battery modules, an outer contour of the frame elements of the battery modules can preferably be optimally adapted to an available installation space, for example in a vehicle.

In particular, an available installation space, for example in a vehicle, can be optimally utilized.

It can be favorable here if a degree of filling of a receiving space of the battery modules of the battery device can be increased by arranging the longitudinal axes of the battery cells parallel to the stacking direction of the battery modules.

Within the scope of this description and the appended claims, a degree of filling of a receiving space of the respective battery modules is understood in particular to mean a ratio of the displacement volume displaced by the battery cells arranged in the receiving space relative to a total volume of the receiving space.

An energy storage capacity of the battery modules and in particular of the battery device can preferably be increased by increasing the degree of filling.

In one embodiment of the battery device, it is provided that the battery cells are round cells.

The battery cells are preferably circular-cylindrical battery cells, in particular circular-cylindrical round cells.

The battery cells are preferably at least approximately rotationally symmetrical with respect to a longitudinal axis thereof.

Alternatively, it is conceivable that the battery cells are prismatic cells.

A degree of filling of a receiving space of a respective battery module can preferably be increased by using round cells.

A receiving space of a battery module can preferably be optimally utilized by using round cells. In particular, a receiving space of a battery module can be at least approximately completely filled by using round cells.

In one embodiment of the battery device, it is provided that the battery device comprises two end bodies, the battery modules of the battery device preferably being arranged between the two end bodies.

For example, it is conceivable that the two end bodies comprise or are formed from a metallic material, in particular steel or aluminum.

In one embodiment of the battery device, it is provided that the two end bodies comprise fastening elements, by means of which the battery device can be fixed to a supporting structure, for example to a supporting structure of a vehicle.

As an alternative or in addition to this, it is conceivable that the battery modules each comprise one or more further fastening elements, by means of which the battery device can be fixed to a supporting structure.

For example, only the two end bodies comprise fastening elements, by means of which the battery device can be fixed to a supporting structure.

It can therefore be favorable if the battery device can only be fixed to a supporting structure by means of the end bodies.

In one embodiment of the battery device, it is provided that the battery modules of the battery device are clamped or can be clamped together.

In particular, it is conceivable that the battery modules of the battery device are clamped or can be clamped between the two end bodies.

In particular, it can be favorable if substantially no force is exerted on the battery cells of the battery modules by clamping the battery modules, in particular parallel to the stacking direction and/or parallel to a longitudinal axis of the battery cells of a respective battery module.

For example, it can be provided that the battery modules of the battery device are clamped or can be clamped between the two end bodies by means of one or more clamping elements.

In particular, it is conceivable that the clamping elements are what are referred to as tie rods.

It can be favorable if the clamping elements comprise or are formed from a metallic material, for example steel or aluminum.

Preferably, the clamping elements comprise or are formed from steel.

Tie rods designed as clamping elements each comprise, in particular, a metallic rod having a thread. In order to clamp the battery modules, the rod can preferably be arranged parallel to the stacking direction. The battery modules can preferably be clamped together, in particular between the two end bodies, by means of one or more screw elements that can be screwed onto the rod.

For example, it is conceivable that the battery modules are clamped in the stacking direction with a clamping force corresponding to a tension of at most approximately 30%, for example at most approximately 50%, of an upper yield point of a material of the clamping elements.

In one embodiment of the battery device, it is provided that a respective battery module comprises a sealing element.

The sealing element of a battery module is preferably a ring-shaped sealing element.

It can be favorable if the sealing element comprises a plastic material or is formed therefrom.

The sealing element of a respective battery module is received or can be received, for example, in a receiving groove of the battery module.

For example, it is conceivable that the receiving groove for receiving the sealing element is arranged on and/or formed in an end face of the frame element of a respective battery module that is arranged perpendicular to the stacking direction.

It can be favorable if a sealing element of a respective battery module is compressed by clamping the battery modules of the battery device between two adjacent battery modules, in particular between a frame element and a base element of two adjacent battery modules.

A sealing effect in accordance with protection class IP 6K9K can be achieved, for example, by means of a sealing element of a respective battery module.

In one embodiment of the battery device, it is provided that the battery cells of a respective battery module are fixed to the base element of the battery module.

The battery cells and the base element are preferably not in direct material contact.

The battery cells, in particular cell bases of the battery cells, are preferably at a distance from the base element, for example within the range of approximately 0.2 mm to approximately 1.5 mm, preferably within the range of approximately 0.3 mm to approximately 1 mm.

The battery cells of a respective battery module are preferably thermally coupled directly and/or indirectly to the base element of the battery module and/or are electrically insulated from the base element.

It can be favorable if the battery cells of a respective battery module are thermally coupled to the base element by means of a thermally conductive paste and/or by means of a casting compound and/or are electrically insulated therefrom.

In particular, it can be provided that the battery cells of a respective battery module are integrally connected to the base element of the battery module by means of a casting compound.

Preferably, the battery cells of a respective battery module are arranged at a distance from the base element by means of a casting compound and are connected thereto by means of the casting compound, for example at a distance within the range of approximately 0.2 mm to approximately 1.5 mm, preferably within the range of approximately 0.3 mm to about 1 mm.

For example, it is conceivable that the battery cells of a respective battery module are completely embedded in the casting compound.

Alternatively, it is conceivable, for example, that at least approximately 30%, for example at least approximately 50%, of a respective battery cell is embedded in a casting compound based on a length of said battery cell measured parallel to a longitudinal axis of the battery cell.

The casting compound comprises, for example, polyurethane, silicone and/or an epoxy resin.

For example, it is conceivable that the casting compound is a one-component material, a two-component material or a multi-component material.

For example, it can be favorable if the casting compound is a two-component material having a curing agent, in particular a cross-linking agent.

In particular, it can be favorable if the casting compound is designed to be thermosetting and/or moisture-setting.

It can be favorable if the battery cells of a respective battery module are each embedded in a first casting compound and in a second casting compound.

In particular, it is conceivable that the battery cells are integrally connected to the base element of a respective battery module by means of a first casting compound. Preferably, at most approximately 50%, for example at most approximately 40%, in particular at most approximately 30% of a respective battery cell is embedded in the first casting compound based on a length of said battery cell measured parallel to a longitudinal axis of the battery cell.

The battery cells are preferably also embedded in a second casting compound, by means of which a receiving space of a respective battery module is at least in part filled. For example, the receiving space of a respective battery module is foamed with the second casting compound.

It can be favorable if the first casting compound has a higher strength than the second casting compound.

In particular, it is conceivable that the first casting compound has a higher density than the second casting compound.

Furthermore, it is in particular conceivable that the second casting compound has a lower thermal conductivity than the first casting compound.

The second casting compound is a foam material, for example.

If the battery cells of a respective battery module are thermally coupled directly to the base element, the battery module has the following sequence in the stacking direction, for example: base element, electrical insulation film, thermally conductive paste, battery cell. In particular, it can be favorable if there is no distance between the individual layers and/or elements.

If the battery cells of a respective battery module are thermally coupled indirectly to the base element, the battery cells of the battery module are thermally coupled directly to a casting compound, for example. Preferably, the casting compound is in turn thermally coupled directly to the base element of the battery module. It can be favorable if the battery cells are arranged at a distance from the base element.

It can be favorable if the battery cells are at a distance from the base element within the range of approximately 0.2 mm to approximately 1.5 mm, preferably within the range of approximately 0.3 mm to approximately 1 mm, in a direction parallel to the stacking direction of the battery device.

In one embodiment of the battery device, it is provided that the frame element of a respective battery module comprises or forms a temperature control device.

It can be favorable if the temperature control device is designed for active temperature control and/or for passive temperature control.

Within the scope of this description and the appended claims, active temperature control is understood to mean, in particular, temperature control whose effect is substantially based on convection, in particular on forced convection. Active temperature control is preferably implemented by means of a temperature control fluid flowing by way of external mechanical action, in particular by means of a temperature control liquid flowing by way of external mechanical action.

Active temperature control takes place, for example, by means of liquid cooling.

Within the scope of this description and the appended claims, passive temperature control is understood to mean, in particular, temperature control whose effect is substantially based on thermal conduction.

It can be favorable, for example, if the frame element comprises a temperature control channel by means of which a temperature control medium can flow.

A temperature control channel of the frame element is arranged or formed in particular in a wall, for example in a double wall, of the frame element.

Alternatively or additionally, it is conceivable that the temperature control device comprises one or more heat-conducting elements, in particular one or more cooling fins.

One or more heat-conducting elements of the temperature control device are preferably arranged on an outer surface of the frame element.

For example, it is conceivable that heat-conducting elements designed as cooling fins are arranged substantially parallel to the stacking direction.

Demolding of the frame element can preferably be facilitated by cooling fins running parallel to the stacking direction.

An outer surface of the frame element can preferably be enlarged by means of the heat-conducting elements, in particular by means of the cooling fins.

If the frame element comprises or is formed from a metallic material, it can be provided that the temperature control device comprises one or more heat-conducting elements, in particular cooling fins.

It can also be favorable if the temperature control device comprises, in addition to one or more heat-conducting elements, a blower by means of which the heat-conducting elements can be blown on in order to dissipate heat therefrom.

As an alternative or in addition to this, it is conceivable that the heat-conducting elements can be blown on by the relative wind when a vehicle is moving in order to dissipate heat therefrom.

In one embodiment of the battery device, it is provided that one, a plurality of or all battery modules of the battery device each comprise a degassing element for degassing a receiving space of the respective battery module.

It can be favorable if a degassing element of a battery module is arranged on the frame element of the battery module.

For example, it is conceivable that a degassing element comprises or is formed by a bursting element and/or a pressure equalization element.

If all battery modules of the battery device each comprise one or more degassing elements, a particularly short degassing path can preferably be implemented, such that hot gases can be routed as directly as possible into an area surrounding the battery device.

A propagation of a thermal runaway of battery cells of a battery module to other battery cells of the same battery module and/or to battery cells of adjacent battery modules can preferably be prevented.

In one embodiment of the battery device, it is provided that all battery modules of the battery device or more than 50% of the battery modules of the battery device are of identical design, preferably more than 80% of the battery modules.

For example, it is conceivable that, with the exception of one battery module, all the battery modules of the battery device are of identical design.

In particular, all frame elements of the battery modules of the battery device are of identical design.

In one embodiment of the battery device, it is provided that a respective battery module comprises a propagation protection element.

By providing a propagation protection element, a propagation of a thermal runaway of battery cells of a battery module to battery cells of an adjacent battery module can preferably be prevented.

It can be favorable if a propagation protection element of a respective battery module comprises or is formed from a heat-resistant and/or thermally insulating material, for example mineral wool fleece and/or glass fiber fleece.

For example, it is conceivable that a propagation protection element of a battery module is connected, for example bonded, to the base element of the respective battery module.

It can be favorable, for example, if a propagation protection element of a battery module is arranged on a side of the base element that faces away from the receiving space of the battery module.

It is in particular conceivable that the propagation protection element of a battery module delimits the receiving space of an adjacent battery module.

In one embodiment of the battery device, it is provided that the battery device comprises one or more temperature control elements, each of which is arranged between two adjacent battery modules.

It can be favorable, for example, if the one or more temperature control elements, each of which is arranged between two adjacent battery modules, comprise or are formed by electrical resistance heating elements.

A temperature control element, which comprises or is formed by an electrical resistance heating element, preferably forms a propagation protection element. In particular, it can be favorable if a temperature control element, which comprises or is formed by an electrical resistance heating element, comprises a heat-resistant material.

Alternatively or additionally, it is conceivable that the one or more temperature control elements, each of which is arranged between two adjacent battery modules, comprise one or more temperature control channels through which a temperature control medium, for example a cooling or heating liquid, can be conveyed.

It can be favorable, for example, if the one or more temperature control elements, each of which is arranged between two adjacent battery modules, are produced by means of a roll-bonding process.

It is conceivable that a temperature gradient occurs from a "core" of a battery module to the frame element of the battery module. In particular, it is conceivable that battery cells in the core of the battery module have a higher temperature than battery cells in an edge region of the battery module, which edge region is delimited by the frame element of the battery module.

A maximum possible charging current is limited by a temperature gradient in the battery module and/or by temperature differences between the battery cells of a battery module. Battery cells of the battery module, for example, first heat up in the core of the battery module and only then in an edge region of the battery module.

For example, it is conceivable that battery cells in different portions arranged one inside the other each have an at least approximately identical temperature starting from a core of the battery module, which temperature increases from the core of the battery module to an edge region of the battery module.

It can therefore be favorable if the one or more temperature control elements, each of which is arranged between two adjacent battery modules, each comprise two or more than two temperature control zones in which different temperatures can be adjusted.

For example, it is conceivable that the one or more temperature control elements, each of which is arranged between two adjacent battery modules, comprise a radially inner temperature control zone and a radially outer temperature control zone, which surrounds the radially inner temperature control zone, the one or more temperature control elements in the radially outer tempering zone having a higher heat output per unit area than in the radially inner tempering zone.

The one or more temperature control elements preferably have a cross section taken perpendicularly to a stacking direction of the battery device, which cross section substantially corresponds to a cross section of a receiving space of the battery modules of the battery device taken perpendicularly to the stacking direction of the battery device.

As an alternative or in addition to this, it is conceivable that each individual battery cell of a battery module is assigned an individual temperature control element.

It can also be favorable if a temperature control element is assigned to a group of battery cells of a battery module, in particular to a group of battery cells arranged in certain portions.

Temperature control elements are, for example, heating films and comprise one or more resistance heating elements.

Preferably, selective heating of individual battery cells, in particular individual groups of battery cells, can be made possible by providing a temperature control element having a plurality of temperature control zones or by providing a plurality of temperature control elements. Temperatures of the battery cells of a battery module can preferably be equalized.

By equalizing the temperatures of the battery cells of a battery module, a higher maximum charging current and thus in particular a reduction in charging time can preferably be achieved.

In particular, a more uniform discharge of the battery cells of a battery module can also be implemented.

In one embodiment of the battery device, it is provided that the frame element and/or the base element is produced in particular in one piece from a metallic material, for example aluminum.

In particular, it is conceivable that the frame element and/or the base element are made of a metallic material having a high thermal conductivity, for example a metallic material having a thermal conductivity of at least approximately 130 W/m*K, preferably at least approximately 160 W/m*K.

It can be favorable, for example, if the frame element and the base element are a one-piece die-cast aluminum part.

As an alternative to this, it is conceivable that in each case one base element is integrally connected to a frame element, in particular welded, for example by means of friction stir welding.

By integrally connecting the base element and the frame element, thermal and/or mechanical coupling of the base element and the frame element can preferably be implemented.

In particular, metallic thermal conduction from the base element into the frame element can be implemented.

If the frame element is made of a metallic material, it can be provided that the frame element comprises one or more heat-conducting elements, in particular one or more cooling fins, which are arranged in particular on an outer surface of the frame element.

A ratio of an outer surface of the frame element to an inner surface of the frame element is preferably at least approximately 1.3:1, preferably at least approximately 1.5:1.

In one embodiment of the battery device, it is provided that the frame element is made of a plastic material and/or that the base element is made of a metallic material.

When the frame element is made of a plastic material, the frame element is preferably injection molded.

In particular, it can be favorable if the frame element is an injection-molded plastic component.

Heat can preferably be conducted away from the battery cells of a battery module by means of a metallic base element.

The base elements of the battery modules are preferably aluminum plates.

It can be favorable if the base elements of the battery modules comprise or are formed from an aluminum alloy having a thermal conductivity of at least approximately 130 W/m*K, preferably at least approximately 160 W/m*K.

The base elements of the battery modules preferably comprise AlMgSi0.5 or are formed therefrom.

In this case, it can be favorable in particular if the base elements have an average material thickness within the range of approximately 2 mm to approximately 6 mm, for example approximately 4 mm, parallel to a stacking direction of the battery device.

Preferably, a vibration resistance of the battery modules of the battery device can be increased. In particular, the temperatures of the battery cells of a respective battery module can be equalized.

In one embodiment of the battery device, it is provided that a respective battery module comprises electrical contacting elements, by means of which two adjacent battery modules can be connected to one another in series by stacking the battery modules along the stacking direction.

A respective battery module preferably comprises a first contacting element and a second contacting element, the first and the second contacting element being arranged on opposite sides of the battery module in the stacking direction.

In particular, it can be favorable if the first contacting element and the second contacting element of a respective battery module are arranged in such a way that the first contacting element of a first battery module of two adjacent battery modules and the second contacting element of a second battery module of the two adjacent battery modules make electrically conducting contact with one another.

In one embodiment of the battery device, it is provided that a respective battery module comprises one or more spacer elements, by means of which the base elements of the battery modules are arranged or can be arranged substantially parallel to one another.

The spacer elements preferably comprise or are formed from a metallic material.

It can be favorable, for example, if a spacer element of a respective battery module is formed by the frame element of the battery module, in particular if the frame element is made of a metallic material.

As an alternative to this, it is possible for a respective battery module to comprise a plurality of, preferably at least three, spacer elements that are inserted into a frame element of the battery module.

In one embodiment of the battery device, it is provided that a respective battery module comprises a detection device for detecting the cell voltages of the battery cells of the battery module and/or for detecting the temperatures of the battery cells of the battery module and/or that a respective battery module comprises a balancer for balancing the battery cells of the battery module.

It can be favorable if the frame element of a respective battery module comprises a plastic material or is formed therefrom.

A total mass of the battery device and/or the production costs of the battery device can preferably be reduced by frame elements that comprise or are formed from a plastic material.

In one embodiment of the battery device, it is provided that the frame element is an injection-molded component, in particular an injection-molded plastic component.

Preferably, the frame element is a one-piece injection-molded plastic component.

In one embodiment of the battery device, it is provided that the frame element comprises a double wall, in particular a double wall that is closed in a ring shape.

For example, it is conceivable that the frame element and/or the base element is produced from a metallic material, for example aluminum.

The frame element is produced, for example, by means of aluminum die casting.

The double wall preferably comprises an inner wall element and an outer wall element.

The inner wall element and/or the outer wall element are preferably closed in a ring shape.

By providing the outer wall element and/or the inner wall element, a closed casing can preferably be provided for the battery cells of a respective battery module, even if the outer wall element fails, for example in the event of a crash.

For example, it is conceivable that the inner wall element and/or the outer wall element are arranged substantially parallel to one another.

Opposing wall portions of the inner wall element and the outer wall element are connected to one another in particular by means of one or more connecting webs.

It can be favorable if the connecting webs run parallel to a stacking direction of the battery device.

The inner wall element and the outer wall element are preferably connected to one another by means of a plurality of connecting webs.

The connecting webs are arranged at regular distances from one another, for example.

The following advantages can preferably be achieved by providing a double wall through which a temperature control medium can flow:

fire protection by wetting the outer wall element and/or the inner wall element with a temperature control medium, improved propagation protection, increased electromagnetic compatibility (EMC); improved mechanical strength; temperature control of the battery cells of a battery module.

By wetting the outer wall element and/or the inner wall element with a temperature control medium, burning off or melting of the frame element can preferably be made more difficult, delayed and/or prevented.

For example, electromagnetic compatibility can be increased by an electrically conductive temperature control medium flowing through a double wall of a frame element of a respective battery module.

In order to increase electromagnetic compatibility, it can also be provided that the frame element of a respective battery module is coated, in particular vapor-deposited, with a metallic material.

In particular, an outer surface and/or an inner surface of the frame element can be coated, in particular vapor-deposited, with a metallic material.

It can be favorable if the temperature control space of a battery module is delimited in the stacking direction by the base element of the battery module and by a base element of an adjacent battery module.

The base element of a battery module preferably comprises one or more passage openings that open into the temperature control space of a battery module.

In one embodiment of the battery device, it is provided that a temperature control medium can flow through the double wall of the frame element, in particular parallel to a stacking direction of the battery device.

In one embodiment of the battery device, it is provided that the double wall of the frame element delimits a temperature control space of the respective battery module, preferably at least on two sides.

The temperature control space is preferably closed in a ring shape.

The temperature control space of a respective battery module preferably has a temperature control space contour in a cross section taken perpendicularly to a stacking direction of the battery device.

It can be favorable if the temperature control space is in part delimited by the base element of a respective battery module.

In particular, it can be provided that the temperature control space is delimited on two sides by the double wall of the frame element. Preferably, the temperature control space is also delimited by the base element of a respective battery module on a first side of the frame element in the stacking direction. It can also be favorable if the temperature control space is delimited by a base element of an adjacent battery module on a second side of the frame element in the stacking direction, which second side faces away from the first side of the frame element.

In particular, it can be favorable if the temperature control space, with the exception of the passage openings, is delimited by the base element of a respective battery module and by a base element of an adjacent battery module.

In one embodiment of the battery device, it is provided that the frame element comprises a frame element main body that is designed in multiple parts.

It can also be favorable if a base element of a respective battery module is designed in multiple parts.

A frame element main body comprises in particular a plurality of frame element main body parts.

The frame element main body parts are preferably die-cast aluminum parts.

It can be favorable if a frame element main body comprises a receiving groove for receiving a sealing element on its end faces arranged perpendicular to a stacking direction of the battery device.

It is conceivable, for example, for a frame element main body to have two receiving grooves for receiving a sealing element on its end faces arranged perpendicular to a stacking direction of the battery device, the two receiving grooves arranged on a respective end face being arranged substantially parallel to one another.

In one embodiment of the battery device, it is provided that the frame element main body parts of a frame element main body are or can be connected to one another in a form-fitting manner.

The frame element main body parts preferably each comprise one or more form-fitting elements, by means of which the frame element main body parts can be connected to one another in a form-fitting manner.

It can be favorable if the frame element main body parts can be connected to one another like a jigsaw puzzle.

The frame element main body parts can be connected to one another, in particular end-to-end.

A frame element main body part preferably comprises two or more than two form-fitting elements.

The frame element main body parts can be connected to one another in particular in a direction parallel to a stacking direction of the battery device.

It can be favorable if the frame element main body parts can be connected to one another in a form-fitting manner by means of a tongue and groove connection, for example by means of a dovetail connection.

For example, it is conceivable that form-fitting elements that can be connected to one another are designed as a connecting groove and as a connecting rib.

It can be favorable if a connecting groove and/or a connecting rib is arranged parallel to a stacking direction of the battery device and/or extends parallel to the stacking direction of the battery device.

In a cross section taken perpendicularly to a stacking direction, the connecting groove and/or the connecting rib are preferably formed substantially complementary to each other.

It can be favorable, for example, if the connecting groove and/or the connecting rib has a trapezoidal cross section perpendicular to a stacking direction of the battery device, in particular in the form of an isosceles trapezoid.

The frame element main body parts are in particular corner parts and/or side parts of a frame element main body.

For example, it is conceivable that a frame element main body comprises a plurality of, for example four, corner parts and/or that a frame element main body comprises a plurality of side parts, one or more side parts being arranged or arrangeable between two corner parts in each case.

A frame element main body part designed as a corner part preferably comprises two connecting ribs, a frame element main body part designed as a side part comprising one or two connecting grooves.

It can be favorable if the form-fitting elements of the frame element main body parts are each arranged on a connecting web of a frame element main body part or are formed thereon.

It can also be favorable if a frame element main body part of the frame element main body comprises one or more temperature control chambers.

In one embodiment of the battery device, it is provided that the base element of a respective battery module comprises one or more passage openings that, in particular, open into a temperature control space of the battery module.

It can be favorable if the temperature control spaces of adjacent battery modules are fluidly connected to one another, in particular by means of the passage openings of the base element.

For example, it is conceivable that the passage openings are circular.

In order to be able to improve the dissipation of heat from a base element of a battery module into a temperature control medium flowing through the temperature control space, it can be provided that the passage openings have an opening cross section in which a ratio of the surface area of a wall of a respective passage opening to the opening cross section of said passage opening is as large as possible.

For example, it is conceivable that the passage openings have a square or star-shaped cross section.

The base element of a respective battery module preferably comprises a plurality of passage openings that are arranged substantially along a line.

The passage openings are preferably arranged at regular distances from one another along the line.

In particular, it can be favorable if the passage openings of the base element are arranged along a line that runs along a temperature control space contour of the temperature control space of a respective battery module.

A sealing portion of a sealing element is preferably arranged radially inside a line along which the passage openings are arranged and radially outside of the line along which the passage openings are arranged.

The sealing portions of the sealing element are preferably closed in a ring shape and in particular run substantially parallel to the line along which the passage openings are arranged.

It can be favorable if the passage openings, which open into the temperature control space of a battery module, form temperature control medium inlets and/or temperature control medium outlets, by means of which temperature control medium can be introduced into and/or guided out of a temperature control space of a battery module.

In one embodiment of the battery device, it is provided that a respective battery module comprises two sealing elements, a first sealing element being arranged between the frame element and the base element of the battery module and/or a second sealing element being arranged between the frame element and a base element of an adjacent battery module.

It can be favorable if the sealing elements are injection molded onto the base element and/or onto the frame element of a respective battery module.

It can also be favorable if a sealing element is injection molded onto the frame element during the manufacture of the frame element.

As an alternative or in addition to this, it is possible that one or more sealing elements are injection molded onto the base element when a holding body is injection molded onto said base element.

For example, it is conceivable that a sealing element is injection molded onto the base element on opposing sides of the base element.

Furthermore, it is conceivable that a sealing element is produced independently of the frame element and/or independently of a holding body. A sealing element produced independently of the frame element and/or independently of the holding body is preferably placed in sealing element receiving grooves of the frame element.

A sealing element preferably comprises a first sealing portion and a second sealing portion.

The first sealing portion and/or the second sealing portion are preferably closed in a ring shape.

The first sealing portion and the second sealing portion of the sealing element preferably each comprise a sealing lip.

It can be favorable if the first sealing portion and the second sealing portion are connected to one another, for example by means of one or more web elements.

The sealing elements are preferably designed in one piece.

As an alternative to this, it is conceivable that the sealing elements are designed in multiple parts and the first sealing portion and the second sealing portion are not connected to one another.

In one embodiment of the battery device, it is provided that a respective battery module comprises one or more spacer elements, by means of which the base elements of the battery modules are arranged or can be arranged substantially parallel to one another.

It can be favorable if the one or more spacer elements of a battery module are designed to be pressure-stable.

The one or more spacer elements of a battery module have, in particular, higher pressure stability than the frame element of the battery module.

The spacer elements preferably comprise or are formed from a metallic material.

For example, it is conceivable that a respective battery module comprises a plurality of, preferably at least three, spacer elements, that are inserted into the frame element of the battery module.

For example, it is also conceivable that the frame element of a respective battery module comprises one or more receptacles, a spacer element preferably being arranged in each receptacle.

The spacer elements are preferably of substantially cylindrical design.

It can be favorable if the spacer elements of a respective battery module are arranged outside the double wall of the frame element of the battery module in a direction perpendicular to a stacking direction of the battery module.

Spacer elements of two adjacent battery modules are preferably aligned in a stacking direction of the battery device.

In one embodiment of the battery device, it is provided that the one or more spacer elements of a respective battery module each comprise two contact surfaces arranged on opposing sides of the spacer element, a respective spacer element contacting the base element of the battery module with a first contact surface and the spacer element contacting or being able to contact the base element of an adjacent battery module with a second contact surface.

A force can preferably be introduced from the spacer elements into the base elements.

In particular, a compressive force can be transferred from the spacer elements to the base elements contacting the contact surfaces of the spacer elements.

In one embodiment of the battery device, it is provided that the two contact surfaces of a spacer element of a respective battery module are at a distance from one another, which distance substantially corresponds to a height of a wall, in particular a double wall, of the battery module taken parallel to the stacking direction.

The frame elements of the battery modules, which comprise or are formed from a plastic material, can preferably be prevented from being compressed due to a clamping force acting on the battery modules parallel to a stacking direction of the battery device.

In one embodiment of the battery device, it is provided that the spacer elements of a respective battery module are bolt elements or sleeve elements.

For example, it is conceivable that the spacer elements of a respective battery module are substantially circular or annular in a cross section taken perpendicularly to a stacking direction of the battery module.

Spacer elements designed as sleeve elements are preferably designed as hollow cylinders.

It can be favorable if the spacer elements are designed to be rotationally symmetrical with respect to a longitudinal axis thereof.

For example, it is conceivable that the spacer elements comprise a spacer portion in which the spacer elements are in particular cylindrical, for example circular-cylindrical.

It can also be favorable if the spacer elements also comprise an insertion portion in which the spacer elements are in particular cylindrical, for example circular-cylindrical.

An insertion portion of a spacer element is preferably insertable into a spacer portion of an adjacent spacer element in a stacking direction of the battery device.

In one embodiment of the battery device, it is provided that the battery modules of the battery device are clamped together by means of the spacer elements or that the battery modules of the battery device are clamped by means of clamping elements passed through the spacer elements.

For example, it is conceivable that the spacer elements each comprise screw elements, it being possible for spacer elements that are adjacent in a stacking direction of the battery device to be screwed together by means of the screw elements.

For example, it is conceivable that an insertion portion of a spacer element comprises an external thread and/or that a spacer portion of a spacer element comprises an internal thread.

Alternatively, it is conceivable that clamping elements of the battery device are guided through spacer elements designed as sleeve elements.

It can be favorable if the battery modules of the battery device are clamped or can be clamped between two end bodies by means of one or more clamping elements.

The battery modules of the battery device are preferably pressed together before being clamped, in particular in a stacking direction of the battery device.

It can be favorable here if sealing elements of the battery modules are deformed, in particular compressed, between a frame element and a base element during the pressing of the battery modules.

In one embodiment of the battery device, it is provided that the frame element of a respective battery module comprises one or more stacking projections projecting away from the frame element parallel to a stacking direction of the battery device and/or one or more stacking recesses, in which stacking recesses stacking projections of a frame element of an adjacent battery module can be received.

Stacking of the battery modules of the battery device can preferably be facilitated by means of the stacking projections and/or by means of the stacking recesses.

The stacking projections and the stacking recesses of the frame element of a respective battery module are preferably arranged on opposing sides of the frame element.

In particular, it can be provided that all stacking projections of the frame element of a respective battery module are arranged on a first side of the frame element and that all stacking recesses are arranged on a second side of the frame element, which second side faces away from the first side.

In one embodiment of the battery device, it is provided that the frame element of a respective battery module is or can be connected, for example clipped, to the base element of the battery module in a force-fitting and/or form-fitting manner.

The frame element of a respective battery module preferably comprises one or more latching projections.

It can be favorable here if the base element of a respective battery module comprises one or more latching recesses into which the latching projections of the frame element can be inserted.

The one or more latching projections of a frame element of a respective battery module preferably each comprise two latching elements.

In particular, it is conceivable that a latching element of a latching projection in each case comprises a latching hook.

The latching hooks of the two latching elements of a latching projection preferably engage behind the base element of a respective battery module when the frame element is connected, in particular clipped, to the base element in a force-fitting and/or form-fitting manner.

In one embodiment of the battery device, it is provided that the frame element of a respective battery module comprises a stiffening structure, for example a stiffening rib structure, on a circumferential surface of the frame element.

A stiffness of an injection-molded frame element can preferably be increased by means of the stiffening structure.

In particular, it is conceivable that a stiffening rib structure of the frame element comprises a plurality of rib elements.

In one embodiment of the battery device, it is provided that one or more, in particular all, battery modules of the battery device are of identical design.

In particular, it can be favorable if the frame elements and/or the base elements of all battery modules of the battery device are of identical design.

It can be favorable if the base element of a respective battery module comprises or is formed from a metallic material and forms part of an outer surface of the battery device.

In particular, it can be favorable if the base element forms a part of an outer surface of the battery device that is closed in a ring shape.

Heat can preferably be dissipated to the outer surface of the battery device by means of the base element of a respective battery module.

Passive temperature control of the battery device can preferably be implemented by means of the base elements.

Within the scope of this description and the appended claims, passive temperature control is understood to mean, in particular, temperature control that is substantially based on thermal conduction.

The base elements of the battery modules in each case form, in particular, surface portions closed in a ring shape of an outer surface of the battery device.

The surface portions closed in a ring shape and formed by the base elements of the battery modules are preferably separated from one another in the stacking direction by the frame elements of the battery modules.

Preferably, because the base element of a respective battery module forms part of an outer surface of the battery device, heat can be dissipated to an outer surface of the battery device by means of the base element.

Perpendicular to a stacking direction of the battery device, an outer surface is preferably formed by surface portions closed in a ring shape and formed by the base elements of the battery modules as well as by the frame elements of the battery modules.

The base element preferably has a thermal conductivity of at least approximately 100 W/m*K, for example at least approximately 150 W/m*K.

For example, it can be favorable if the base element has a thermal conductivity of approximately 186 W/m*K.

The base element comprises, in particular, aluminum or is formed therefrom, for example AlMgSi0.5.

The battery modules of the battery device are preferably arranged or can be arranged along a stacking direction.

In particular, it is conceivable that the base element of a respective battery module forms part of the outer surface of the battery module in a direction perpendicular to the stacking direction.

In one embodiment of the battery device, it is provided that the base elements of the battery modules protrude beyond the frame elements of the battery modules at least in portions, for example closed in a ring shape, perpendicular to a stacking direction of the battery device.

In one embodiment of the battery device, it is provided that the battery device comprises a heat sink and/or a temperature control element, which are thermally coupled to one or more, preferably to all, base elements of the battery device.

The heat sink and/or the temperature control element are preferably arranged on the outer surface of the battery device.

The heat sink preferably comprises one or more cooling fins.

It can be favorable if the heat sink is in direct material contact with one or more, preferably with all, base elements of the battery device, in particular on the part of the outer surface of the battery device that is formed by the respective base elements of the battery modules.

In one embodiment of the battery device, it is provided that a respective battery module also comprises a holding body for holding the battery cells of the respective battery module, which holding body is connected, in particular integrally, to the base element of the battery module.

In one embodiment of the battery device, it is provided that the holding body of a respective battery module comprises a plurality of receiving openings, in each of which a battery cell of the battery module is received.

For example, it is conceivable that the holding body of a respective battery module comprises approximately 200 to approximately 600 receiving openings, for example approximately 400 receiving openings.

In one embodiment of the battery device, it is provided that the holding body of a respective battery module comprises a honeycomb structure or is formed by a honeycomb structure.

It can be favorable if a honeycomb structure of the holding body comprises a plurality of holding elements, in particular polygonal holding elements, that delimit the receiving openings.

The holding elements are, for example, regular hexagons.

For example, it is conceivable that the holding elements are each arranged adjacent to a plurality of further holding elements.

In particular, it is conceivable that holding elements of the honeycomb structure are each arranged adjacent to six further holding elements.

A receiving opening of a holding element is preferably delimited by a plurality of holding element webs, for example by six holding element webs in each case.

It can be favorable if a plurality of holding element webs of adjacent holding elements are connected to one another at a node.

It can be favorable, for example, if three holding elements of three adjacent holding elements are connected to one another at the node.

In one embodiment of the battery device, it is provided that the holding body of a respective battery module is injection molded onto the base element of the battery module.

The holding body preferably comprises connection regions arranged at a plurality of nodes, at which connection regions the holding body is connected, for example integrally, to the base element.

It can be favorable, for example, if the holding body is injection molded onto the base element at the connection regions.

It can be favorable, for example, if a connection region is arranged at approximately 50% of the nodes of the holding body.

In one embodiment of the battery device, it is provided that the holding body is designed in one piece.

The holding body is preferably an injection-molded component, in particular a one-piece injection-molded component.

The holding body preferably comprises or is formed from a plastic material.

In one embodiment of the battery device, it is provided that a respective battery module also comprises a sealing element, in particular two sealing elements, that are connected, in particular integrally, to the base element of the battery module.

It can be favorable if the sealing element, in particular the two sealing elements, are injection molded onto the base element.

It can be favorable if the sealing element, in particular the two sealing elements, are each designed to be closed in a ring shape.

A sealing contour of the sealing element preferably corresponds to a contour of the frame element of a respective battery module, in particular in a cross section taken perpendicularly to a stacking direction of the battery module.

In one embodiment of the battery device, it is provided that the two sealing elements are arranged on two opposing sides of the base element of a respective battery module, in particular injection molded onto the base element.

In one embodiment of the battery device, it is provided that the sealing element comprises a first sealing portion and a second sealing portion.

A first sealing portion and a second sealing portion are preferably each designed to be closed in a ring shape.

It can be favorable if the first sealing portion and the second sealing portion of the sealing element are arranged substantially parallel to one another.

In one embodiment of the battery device, it is provided that the battery cells of a respective battery module are thermally coupled to the base element of the battery module.

It can be favorable, for example, if the battery cells of a respective battery module are thermally coupled to the base element of the battery module by means of a thermally conductive paste and/or by means of a casting compound.

In one embodiment of the battery device, it is provided that the base element of a respective battery module comprises one or more temperature control channels, for example a temperature control channel structure.

A temperature control channel, in particular a temperature control channel structure, of the base element can preferably be flowed through by means of a temperature control medium.

For example, it is conceivable that the base element of a respective battery module is of multi-layer design and delimits a temperature control channel, in particular a temperature control channel structure.

A temperature control channel, in particular a temperature control channel structure, of the base element of a respective battery module is produced, for example, by means of roll bonding.

It can be favorable if active temperature control of the battery device can be implemented by means of the base element by providing a temperature control channel in the base element of a respective battery module.

In one embodiment of the battery device, it is provided that the base element of a respective battery module is a hybrid component, in particular a metal-elastomer hybrid component.

The present invention is based on the further object of providing a method for fixing battery cells, by means of which method a battery device is simple and economical to produce.

This object is achieved by a method for fixing battery cells in accordance with the independent method claim.

The method according to the invention for fixing battery cells preferably has one or more of the features and/or advantages described in connection with the battery device according to the invention.

The method for fixing battery cells preferably comprises the following:

providing a layer element;

providing a plurality of battery cells;

fixing the battery cells in the layer element by means of, in particular, plastic deformation of the layer element.

It can be favorable if the layer element, which is in particular plastically deformed, forms a holding body of a battery module.

Preferably, the layer element is a thermoformable layer element.

The battery cells are in particular round cells.

The layer element preferably comprises or is formed from a plastic material.

For example, it can be favorable if the layer element comprises or is formed from a polyolefin, for example polyethylene (PE) or polypropylene (PP).

The layer element preferably comprises a low-density polyethylene (LDPE).

The layer element is in particular a shrink film.

It can be favorable if the layer element comprises or is formed from an electrically insulating material.

It is also conceivable, for example, for the layer element to comprise or be formed from polymethylmethacrylate (PMMA) or polycarbonate (PC).

In one embodiment of the method, it is provided that the battery cells are fixed in the layer element by heating the layer element and/or by subsequently cooling the layer element.

It can be favorable if the layer element rests on a lateral surface and/or on a base surface of a respective battery cell after the battery cells have been fixed in the layer element.

In particular, it can be provided that the layer element rests to an extent of at most approximately 50% against a lateral surface of a respective battery cell.

The layer element preferably rests to an extent of at least approximately 10%, for example to an extent of at least approximately 20%, preferably to an extent of at least approximately 30%, against a lateral surface of a respective battery cell.

Furthermore, it can be favorable if the layer element rests completely against the entire base surface of a respective battery cell.

After the battery cells have been fixed, the layer element preferably rests on the battery cells in a pot-shaped manner.

In one embodiment of the method it is provided that the layer element is plastically deformed by heating or that the layer element is heated and the heated layer element is then plastically deformed.

For example, it is conceivable that the in particular thermoformable layer element can only be formed after it has been heated.

In one embodiment of the method it is provided that the layer element is cooled after being heated.

Preferably, the layer element solidifies upon being cooled.

The cooled layer element is preferably substantially rigid.

In one embodiment of the method, it is provided that the layer element is shrunk onto the battery cells.

The layer element is preferably only shrunk onto a partial region of the battery cells.

In particular, the battery cells are not completely surrounded by the layer element.

It can be favorable, for example, if the layer element is only shrunk onto the first side of the battery cells in the direction of the longitudinal axes of the battery cells.

For example, it can be provided that the layer element is shrunk onto the battery cells over at most approximately 50% of a length of a respective battery cell.

Within the scope of this description and the appended claims, a length of the battery cells is understood to mean, in particular, a length of the battery cells in a direction parallel to a longitudinal axis of the battery cells.

The layer element is in each case preferably shrunk onto the battery cells over at least approximately 10%, in particular at least approximately 20%, for example at least approximately 30%, of a length of a respective battery cell.

In one embodiment of the method, it is provided that the battery cells are aligned relative to one another before they are fixed in the layer element, in particular by means of a tool.

The battery cells are preferably arranged parallel to one another before they are fixed in the layer element.

In particular, the battery cells are arranged in such a way that the longitudinal axes of the battery cells are arranged parallel to one another.

It can also be favorable if the battery cells are arranged in a predetermined pattern before they are fixed in the layer element.

In particular, it is conceivable that the battery cells are arranged in a plurality of rows and a plurality of columns in the predetermined pattern.

It can be favorable, for example, if the battery cells are each at an identical first distance from one another in a row direction of the predetermined pattern.

Furthermore, it is preferably conceivable that the battery cells are each at an identical second distance from one another in a column direction of the predetermined pattern.

It is conceivable that the first distance in the row direction is smaller or larger than the second distance in the column direction.

In one embodiment of the method, it is provided that the battery cells are initially aligned parallel to one another and/or in a predetermined pattern.

The battery cells are preferably arranged parallel to one another and/or in the predetermined pattern by means of a tool.

In particular, the mold comprises a first mold half having a negative mold, in which the battery cells can be received at least in part.

The first mold half is in particular a die element.

In particular, the first mold half forms a shaping element.

In particular, the first mold half has a negative mold of the predetermined pattern.

It can be favorable, for example, if the first mold half comprises a plurality of positioning openings, in each of which a battery cell can be received for aligning the battery cells.

The first mold half preferably comprises a plurality of lines and a plurality of rows of positioning openings, a line and/or a row in each case comprising a plurality of positioning openings.

For example, it is conceivable that the battery cells are arranged in the positioning openings of the first mold half by means of a positioning device, for example by means of an industrial robot.

The layer element is preferably deformed by positioning the layer element between the battery cells and the first mold half and then arranging the battery cells in the positioning openings of the first mold half.

The layer element is preferably clamped in the positioning openings of the first mold half by means of the battery cells and deformed in the process.

In particular, the layer element is clamped in each case between a positioning opening wall and a battery cell.

The mold preferably comprises a second mold half having a negative mold, in which the battery cells can be received at least in part.

The first and second mold halves are preferably movable relative to one another.

The second mold half preferably has a negative mold of the predetermined pattern.

The second mold half preferably also comprises a plurality of positioning openings, in each of which a battery cell can be received for aligning the battery cells.

It can be favorable if the positioning openings of the first mold half and/or the second mold half are each substantially cylindrical, in particular substantially circular-cylindrical.

An inside diameter of the positioning openings in the first mold half is preferably larger than an outside diameter of the battery cells.

It can be favorable, for example, if an inside diameter of the positioning openings in the first mold half is substantially the same size or smaller than the sum of an outside diameter of the battery cells and twice the material thickness of the layer element.

The layer element and a respective battery cell can preferably be clamped within the positioning openings of the first mold half.

It can also be favorable if an inside diameter of the positioning openings in the second mold half substantially corresponds to an outside diameter of the battery cells.

In one embodiment of the method, it is provided that one or more battery cells are moved parallel to a longitudinal axis of the battery cells after the parallel alignment and/or after the alignment in a predetermined pattern.

The battery cells are preferably moved against a stop that is preferably arranged perpendicular to a longitudinal axis of the battery cells.

In particular, it can be favorable for the battery cells to be moved against a stop in such a way that the base surfaces of all battery cells are arranged in a single plane after the movement.

In one embodiment of the method, it is provided that one or more battery cells are moved parallel to a longitudinal axis of the battery cells to such an extent that base surfaces of all battery cells are arranged substantially in a single plane.

For example, it is conceivable that all battery cells are moved against a stop.

It can be provided in particular that the first mold half and the second mold half are moved toward one another.

The positioning openings in the first mold half and/or the positioning openings in the second mold half preferably comprise a stop.

Alternatively, it is conceivable that the first or second mold half comprises a stop and that the second or first mold half comprises a movement device for moving one or more battery cells, by means of which movement device the battery cells can be moved against the stop.

It can be favorable, for example, if the movement device comprises one or more pistons that can be displaced in positioning openings in the first or the second mold half.

As an alternative to this, it is conceivable that the movement device comprises one or more nozzle elements that open into the positioning openings of the first or the second mold half.

The layer element and/or the battery cell arranged in a respective positioning opening of the first mold half are preferably moved by pressurizing a pressure chamber delimited by the layer element and the positioning opening.

The present invention also relates to a battery device comprising one or more battery modules, a respective battery module comprising:

a frame element;

a base element; and a plurality of battery cells, the battery cells being fixed in a layer element by means of the method according to the invention for fixing battery cells and the layer element and the battery cells fixed in the layer element being fixed to the base element of the battery module.

In particular, it can be favorable if the layer element in which the battery cells are fixed is integrally connected to the base element of a battery module, in particular by means of a thermally conductive paste.

After the layer element has been deformed, in particular after the deformed layer element has cooled, the deformed layer element preferably forms a holding body by means of which the battery cells are held.

The present invention also relates to a method for producing a battery device, in particular a battery device according to the invention.

The method for producing a battery device preferably comprises the following:

providing two or more than two battery modules;

stacking the battery modules along a stacking direction.

It can be favorable if the battery modules of the battery device are clamped together and/or between two end bodies.

For example, it is conceivable that two adjacent battery modules are connected to one another in layers and/or clamped together.

The method according to the invention for producing a battery device, in particular for producing a battery device according to the invention, preferably has one or more of the features and/or advantages described in connection with the battery device according to the invention.

Further features and/or advantages of the invention are the subject matter of the following description and the drawings illustrating embodiments.

BRIEF DESCRIPTION OF THE DRAWINGS

Figure 6:
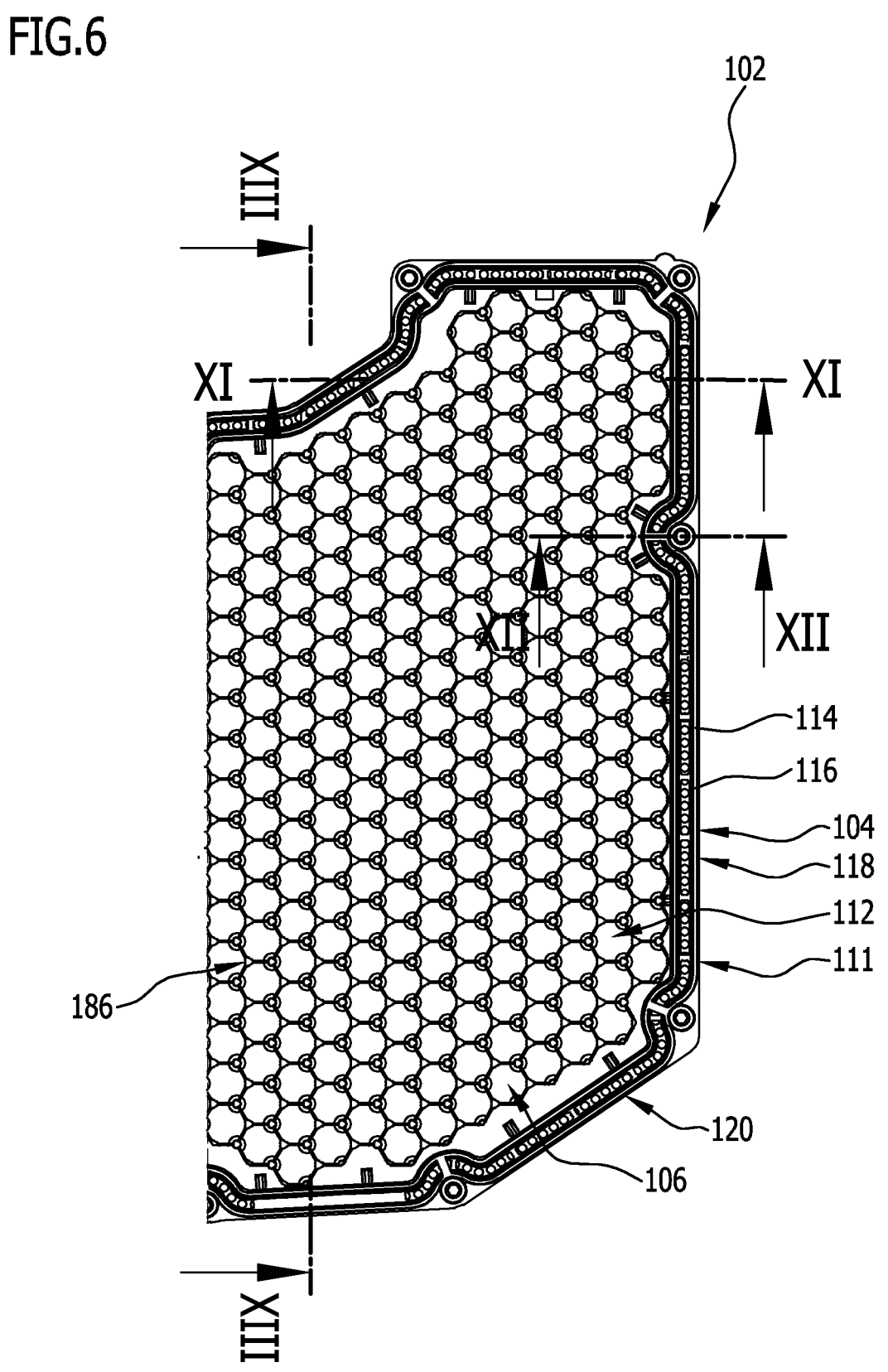

FIG. 6 is a schematic plan view of a section of a battery module of the battery device from FIG. 1;

Figure 1:
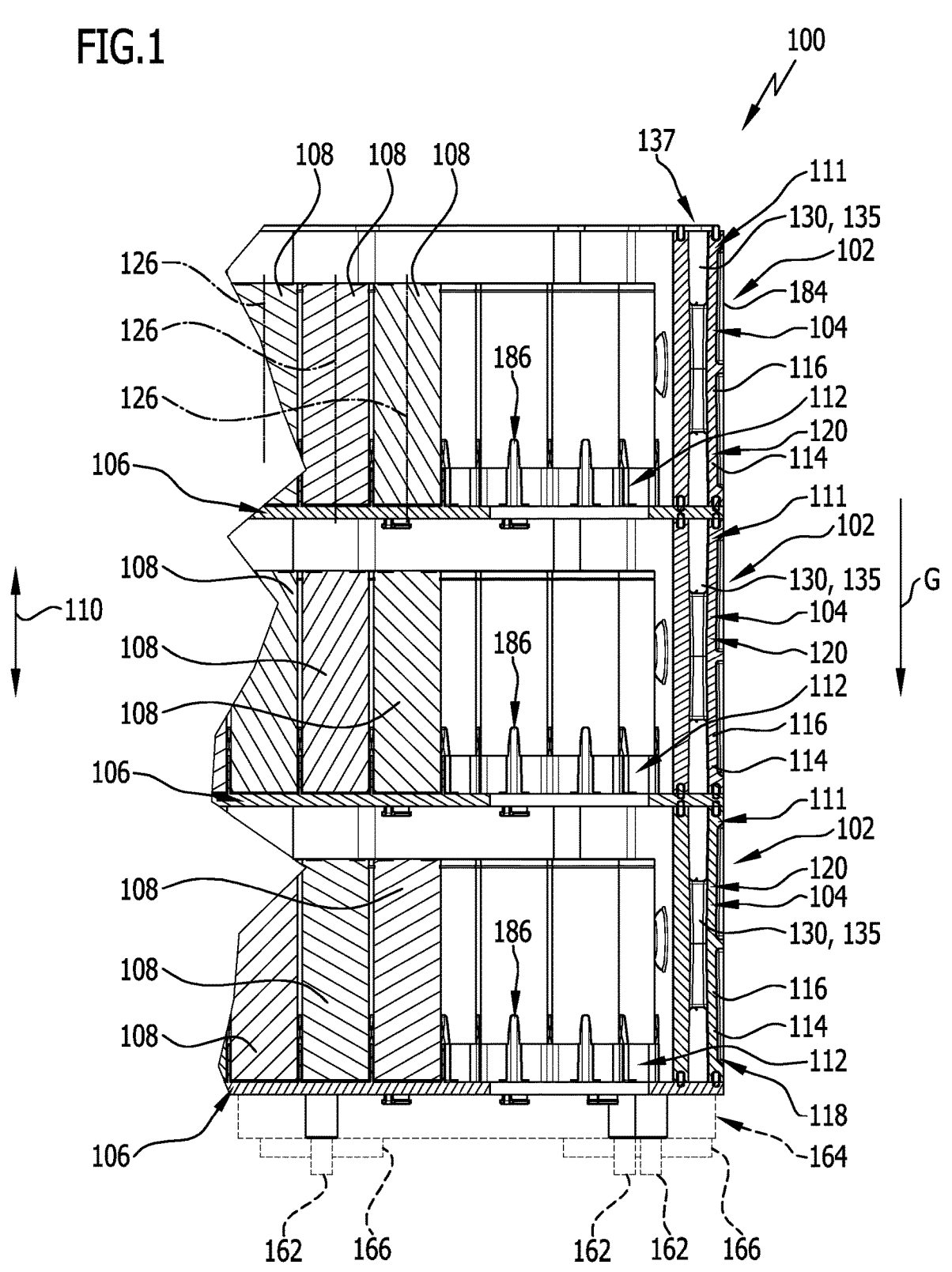
FIG. 1 is a schematic longitudinal section through an embodiment of a battery device comprising a plurality of battery modules.
Figure 2:
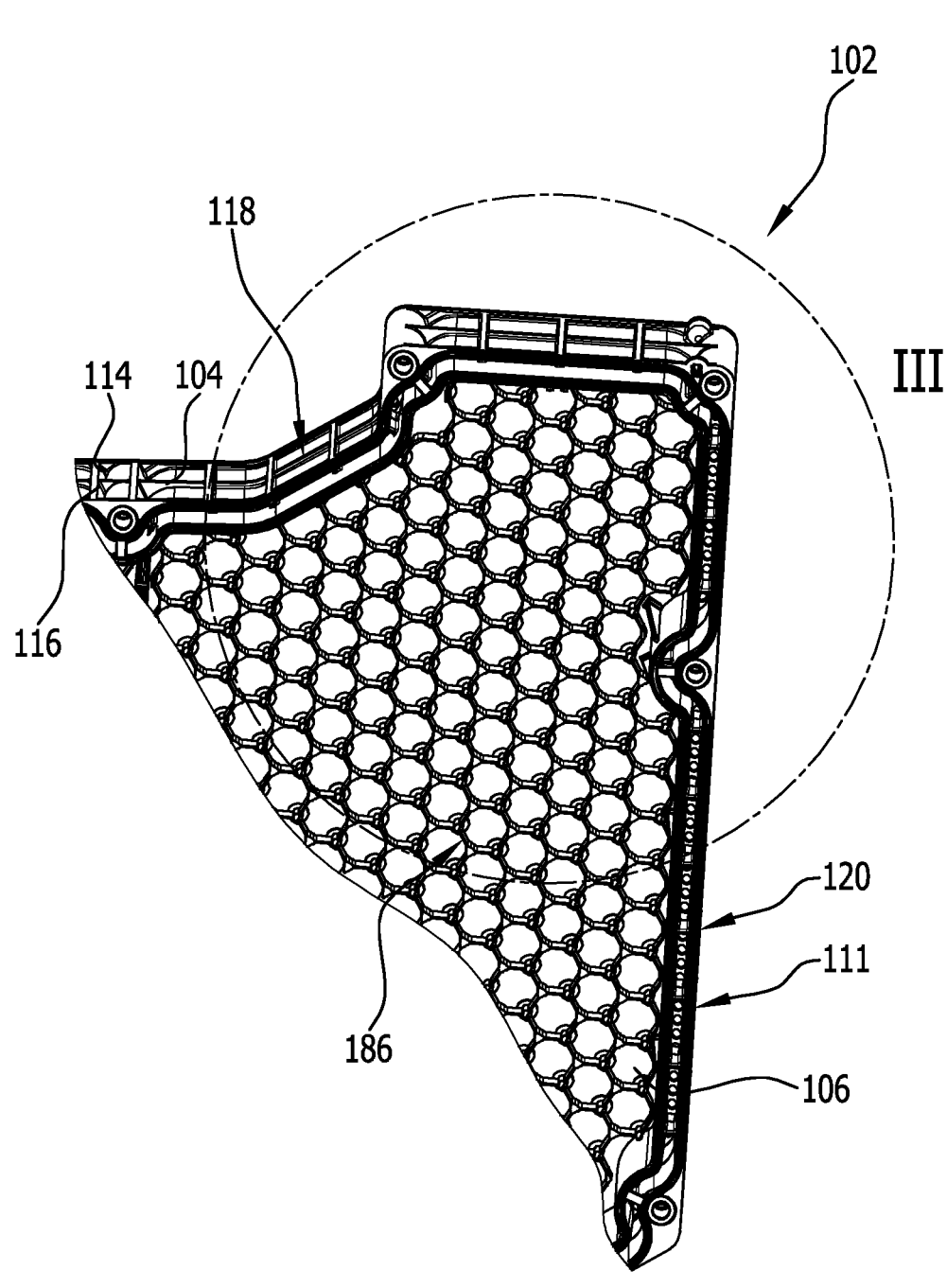
FIG. 2 is a schematic perspective view of a section of a battery module of the battery device from FIG. 1.

The same or functionally equivalent elements are provided with the same reference signs in all figures.

DETAILED DESCRIPTION OF THE DRAWINGS

FIGS. 1 to 16 show an embodiment of a battery device designated as a whole as 100.

The battery device 100 preferably comprises a plurality of battery modules 102.

It can be favorable if the battery modules 102 of the battery device 100 are self-supporting.

Each battery module 102 preferably comprises a frame element 104, a base element 106 and a plurality of battery cells 108.

One or more, in particular all, battery modules 102 of the battery device 100 are preferably of identical design.

In particular, it is conceivable that the frame elements 104 and/or the base elements 106 of all battery modules 102 of the battery device 100 are of identical design.

The frame elements 104 are preferably made of a plastic material, in particular injection molded.

Preferably, the frame elements 104 are injection-molded plastic components.

It can be favorable if the base elements 106 are made of a metallic material.

The base elements 106 of the battery modules 102 are preferably aluminum plates. In particular, it can be favorable if the base elements 106 of the battery modules comprise AlMgSi0.5 or are formed therefrom.

Heat can preferably be conducted away from the battery cells 108 of a respective battery module 102 by means of a metallic base element 106.

The battery cells 108 are preferably galvanic cells, in particular what are referred to as secondary cells, which are preferably rechargeable.

It can be favorable if the battery modules 102 of the battery device 100 are arranged or can be arranged along a stacking direction 110.

The battery modules 102 preferably comprise electrical contacting elements (not shown in the drawings), by means of which two adjacent battery modules 102 can be connected to one another in series by stacking the battery modules 102 along the stacking direction 110.

It can be favorable if a respective battery module 102 of the battery device 100 comprises a detection device (not shown in the drawings) for detecting the cell voltages of the battery cells 108 of the battery module 102 and/or for detecting the temperatures of the battery cells 108 of the battery module 102.

It can also be favorable if a respective battery module 102 of the battery device 100 comprises a balancer (not shown in the drawings) for balancing the battery cells 108 of the battery module 102.

For example, it is conceivable that a respective battery module 102 comprises a first contacting element and a second contacting element, the first and the second contacting element being arranged in the stacking direction 110 on opposing sides of the battery module 102.

The first contacting element and the second contacting element of a respective battery module 102 are preferably arranged in such a way that the first contacting element of a first battery module 102 of two adjacent battery modules 102 and the second contacting element of a second battery module 102 of two adjacent battery modules 102 make electrically conducting contact with one another.

Figure 11:
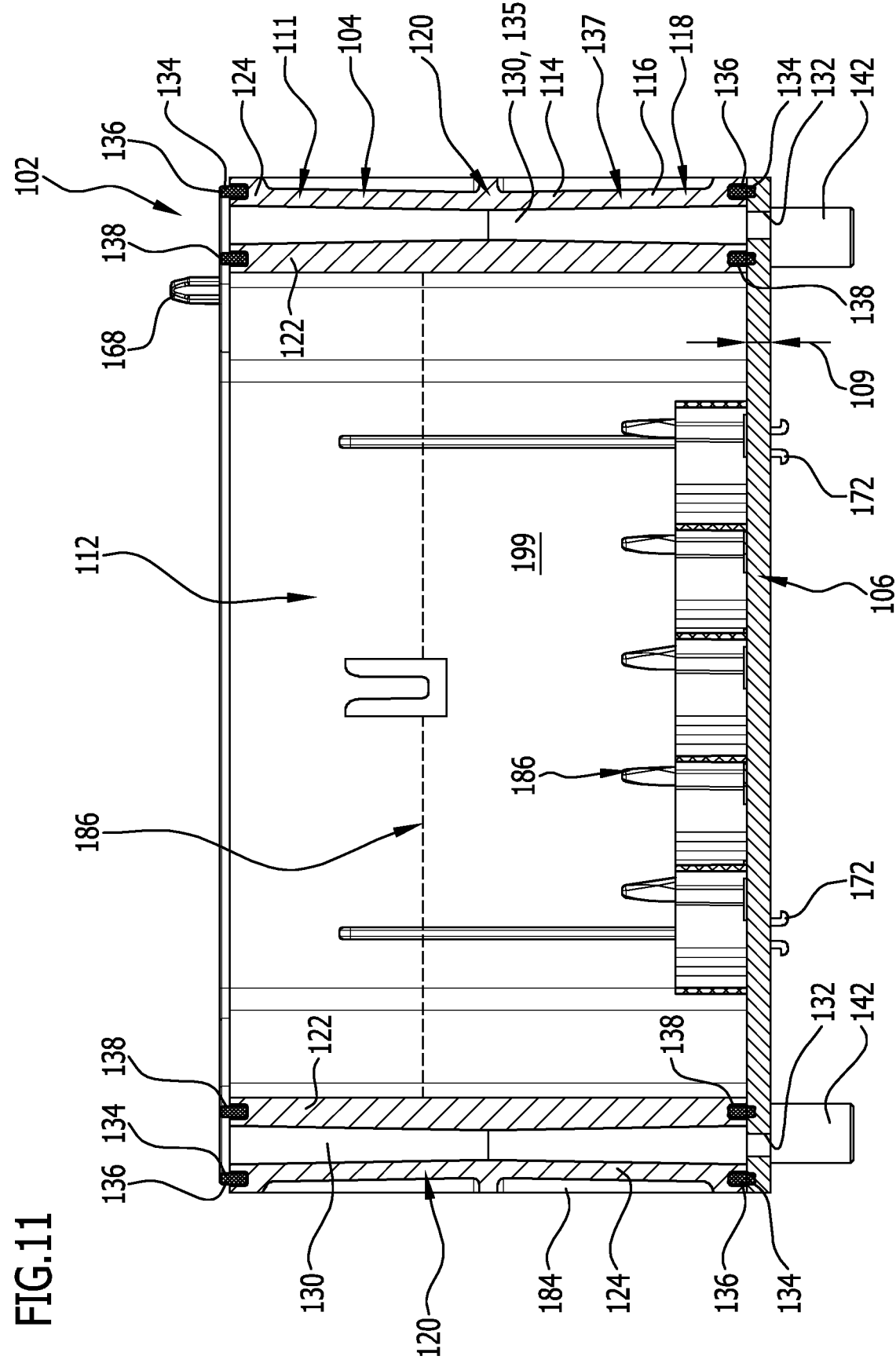
FIG. 11 is a schematic section through a battery module of the battery device of FIG. 1 along the line XI-XI in FIG. 6.
Figure 12:
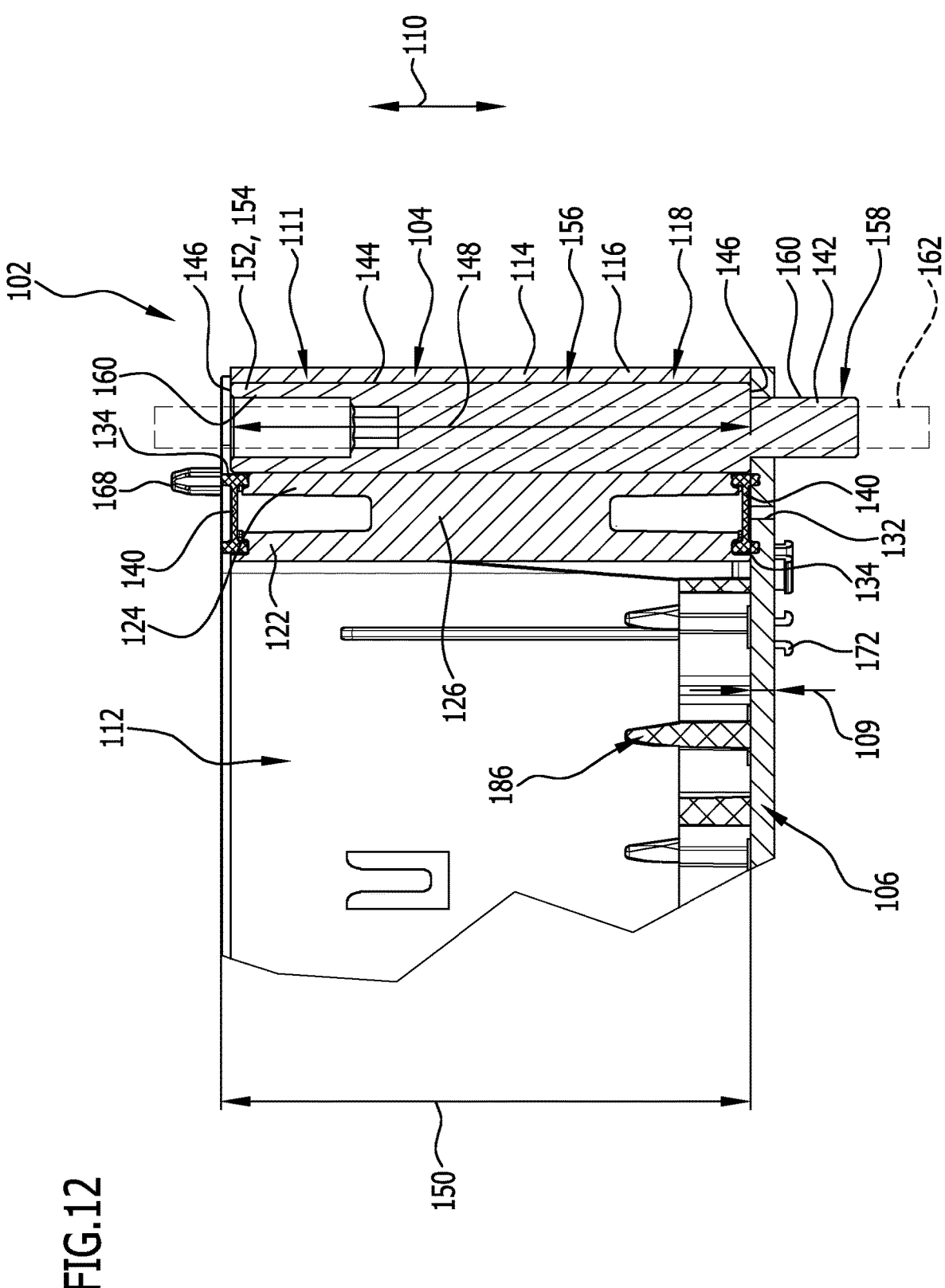
FIG. 12 is a schematic section through a battery module of the battery device of FIG. 1 along the line XII-XII in FIG. 6.

Preferably, the base elements 106 have an average material thickness 109 parallel to the stacking direction 110 within the range of approximately 2 mm to approximately 6 mm, for example approximately 4 mm (cf. FIGS. 11 and 12).

The battery device 100 can preferably be arranged in such a way that the stacking direction 110 of the battery modules 102 runs parallel to the direction of gravity G. The battery device 100 is in particular arranged "vertically" (cf. FIG. 1).

Alternatively, it is conceivable that the battery device 100 can be arranged in such a way that the stacking direction 110 of the battery modules 102 runs substantially perpendicular to the direction of gravity G. The battery device 100 is in particular arranged "horizontally."

A battery module 102 preferably comprises at least approximately 50 battery cells 108.

For example, it is conceivable that a battery module 102 comprises approximately 200 to approximately 600 battery cells 108, for example approximately 400 battery cells 108.

Preferably, the frame elements 104 of the battery modules 102 are closed in a ring shape.

The frame elements 104 of the battery modules 102 preferably comprise a wall 111 that is closed in a ring shape. The frame element 104 comprises, for example, a connecting web (not shown in the drawings) that is arranged between two opposing wall portions of the wall 111 of the frame element 104 and connects them to one another.

It can be favorable here if the frame element 104 and the base element 106 of a respective battery module 102 define an in particular pot-shaped receiving space 112 in which the battery cells 108 of the respective battery module 102 are received.

The receiving space 112 of a battery module 102 is preferably delimited by the frame element 104 and by the base element 106 of the battery module 102 as well as by the base element 106 of an adjacent battery module 102.

The frame element 104 of a respective battery module 102 preferably surrounds all of the battery cells 108 of the battery module 102, in particular in a direction perpendicular to the stacking direction 110.

The frame elements 104 of the battery modules 102 preferably form housing portions 114 of the battery device 100.

The frame elements 104 of the battery modules 102 together form, in particular, an outer skin 116 of the battery device 100.

It can be provided in particular that a surface of the wall 111 of the respective frame element 104 forms part of a surface of a housing 118 of the battery device 100.

The frame elements 104 of the battery modules 102 of the battery device 100 are therefore preferably not delimited by an additional enclosure in a radial direction perpendicular to the stacking direction 110.

The production costs of the battery device 100 can preferably be reduced by eliminating an additional enclosure.

It can be favorable if the surface of the wall 111 of the frame element 104 of a respective battery module 102 is coated, in particular vapor-deposited, with a metallic material. The electromagnetic compatibility of the battery device 100 can preferably be increased in this case.

In the embodiment of the battery device 100 illustrated in FIGS. 1 to 16, a respective frame element 104 comprises, in particular, a double wall 120 that comprises an inner wall element 122 and an outer wall element 124.

It can be favorable if the longitudinal axes 126 of the battery cells 108 of the battery modules 102 are arranged substantially parallel to the stacking direction 110 of the battery modules 102.

By arranging the longitudinal axes 126 of the battery cells 108 of the battery modules 102 parallel to the stacking direction 110 of the battery modules 102, an outer contour of the frame elements 104 of the battery modules 102 can preferably be optimally adapted to an available installation space, for example in a vehicle.

In particular, the available installation space, for example in a vehicle, can be optimally utilized.

It can be favorable in this case if the degree of filling of the receiving space 112 of the battery modules 102 of the battery device 100 can be increased by arranging the longitudinal axes 126 of the battery cells 108 parallel to the stacking direction 110 of the battery modules 102.

An energy storage capacity of the battery modules 102 and in particular of the battery device 100 can preferably be increased by increasing the degree of filling.

In order to increase the degree of filling, it can be provided that the battery cells 108 are round cells. In this case, the battery cells 108 are in particular at least approximately rotationally symmetrically with respect to the longitudinal axis 126.

By using round cells, the receiving space 112 of the battery modules 102 can preferably be filled at least approximately completely.

The inner wall element 112 and/or the outer wall element 124 of the double wall 120 are preferably closed in a ring shape.

By providing the outer wall element 124 and/or the inner wall element 122, a closed casing can preferably be provided for the battery cells 108 of a respective battery module 102, even if the outer wall element 124 fails, for example in the event of a crash.

The inner wall element 122 and/or the outer wall element 124 are preferably arranged substantially parallel to one another.

Figure 3:
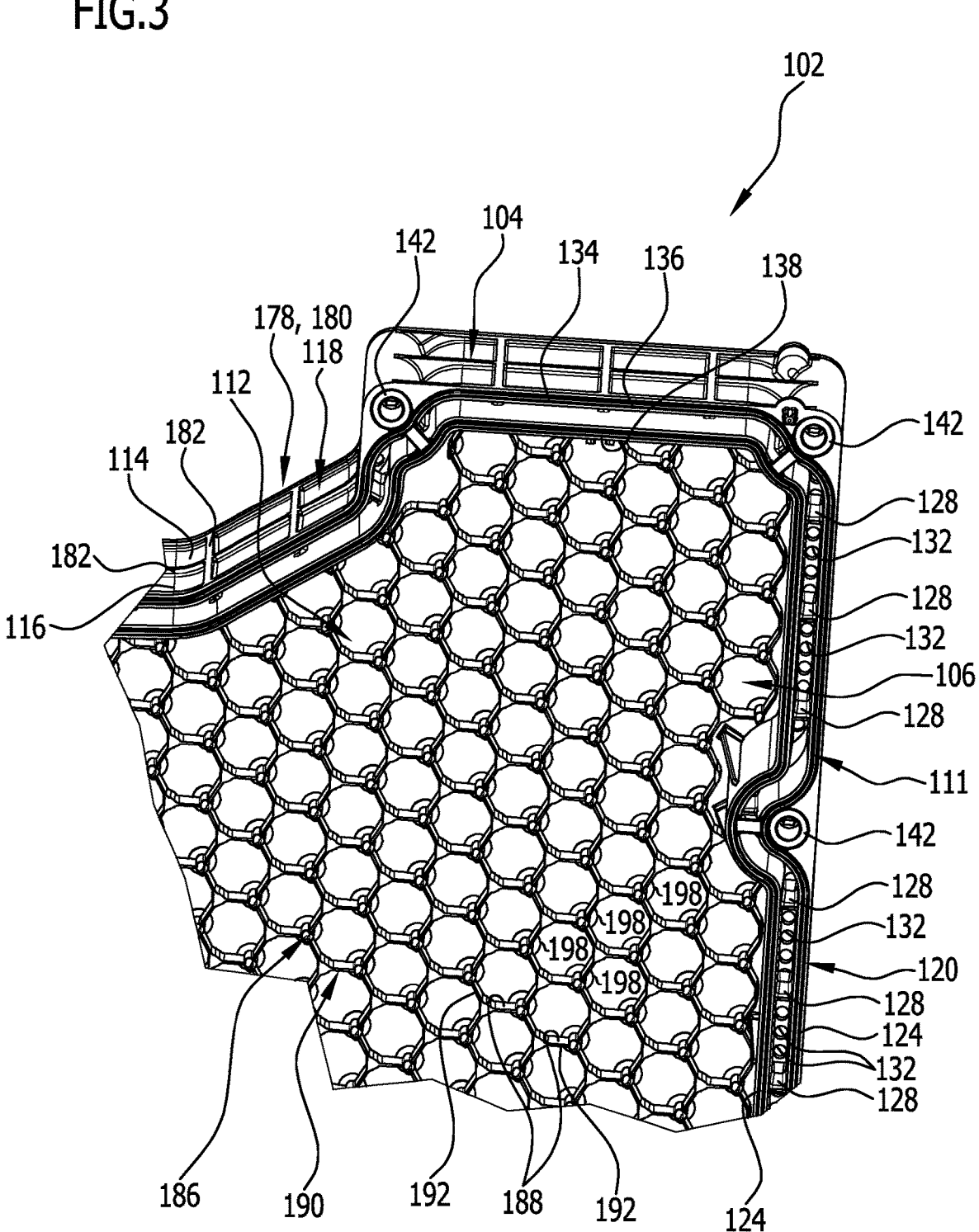
FIG. 3 is an enlarged representation of the region III in FIG. 2.
Figure 4:
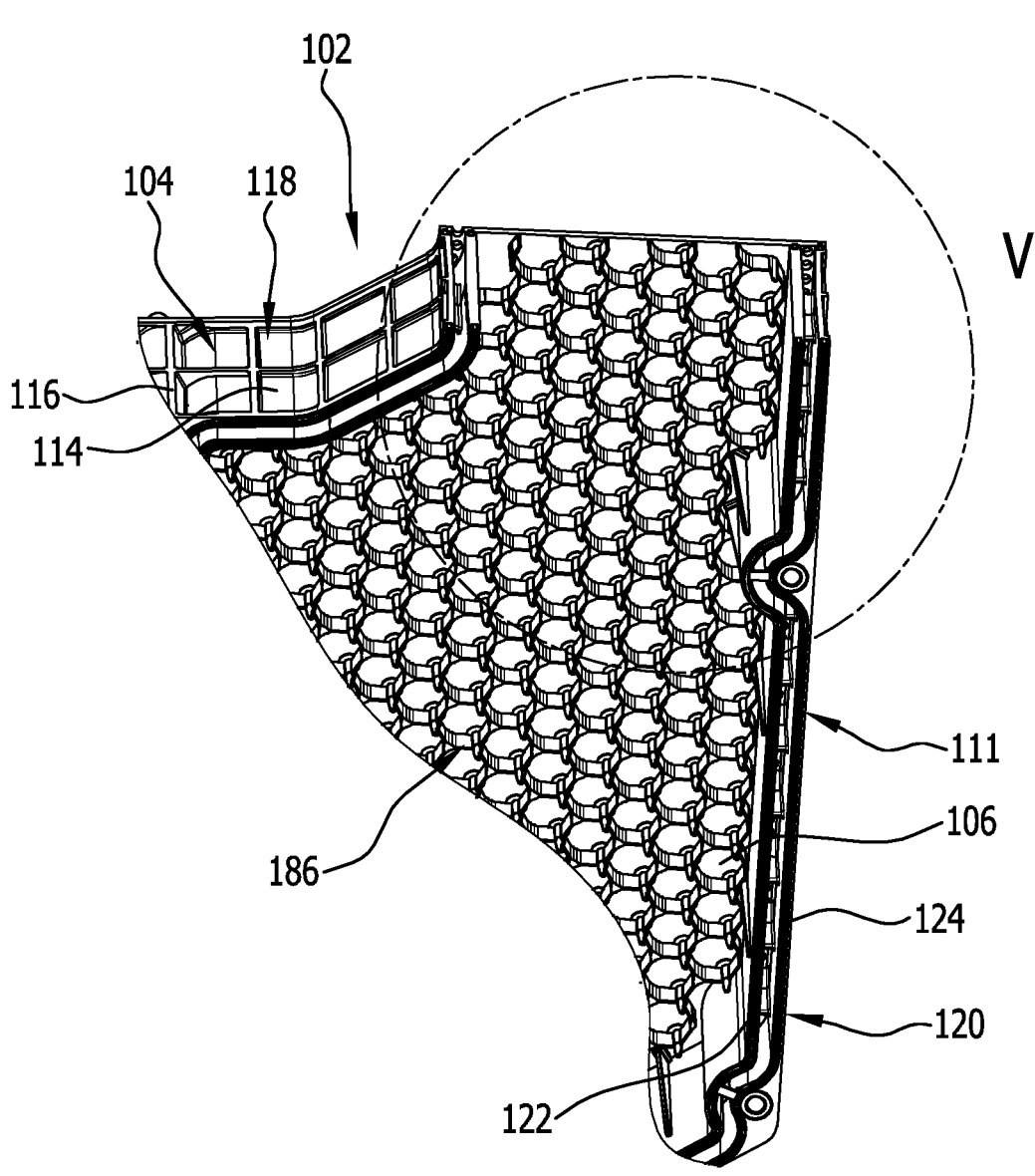
FIG. 4 is a schematic perspective view of a partial section of a battery module of the battery device from FIG. 1.
Figure 5:
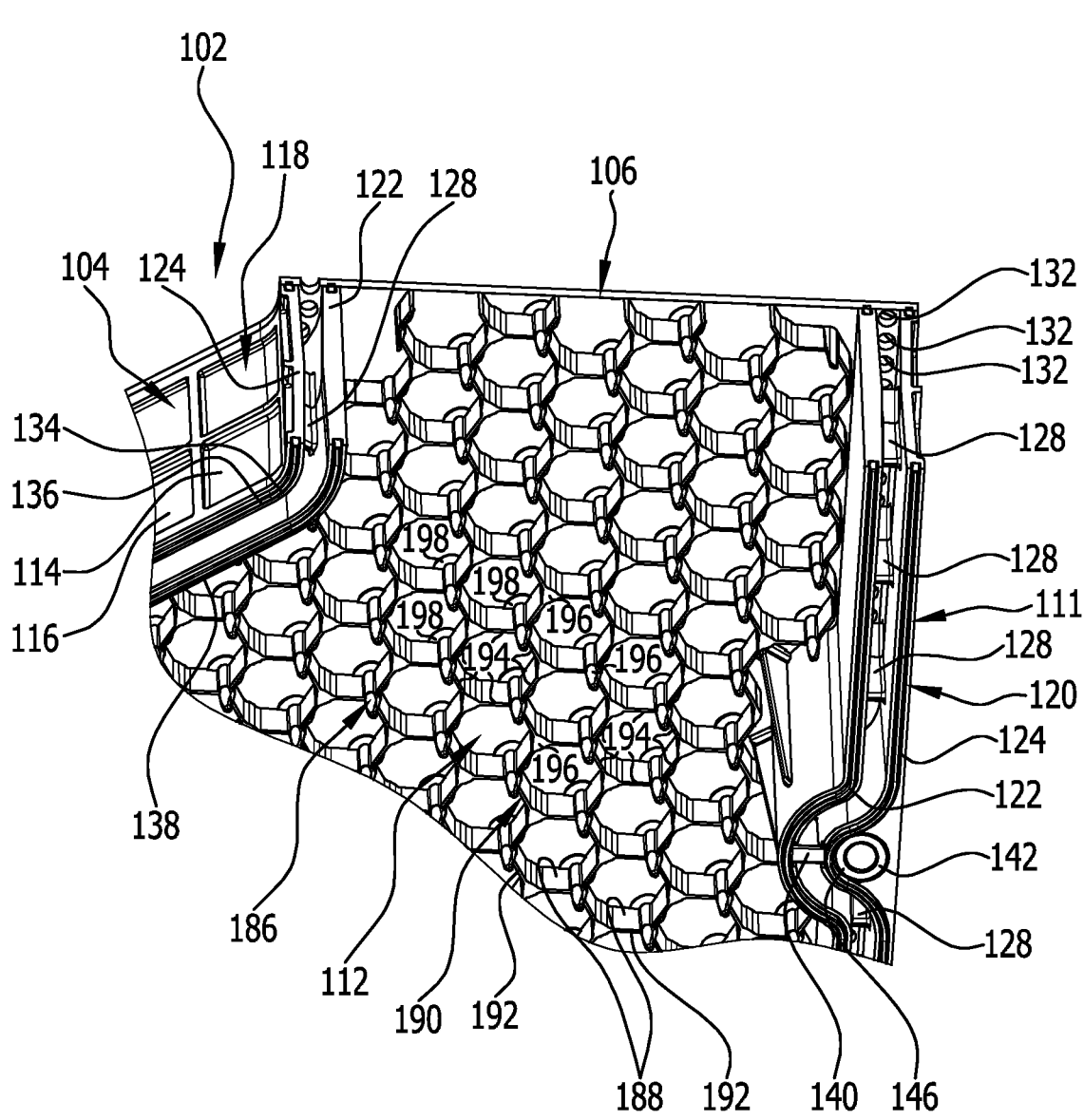
FIG. 5 is an enlarged representation of the region V in FIG. 4.
Figure 7:
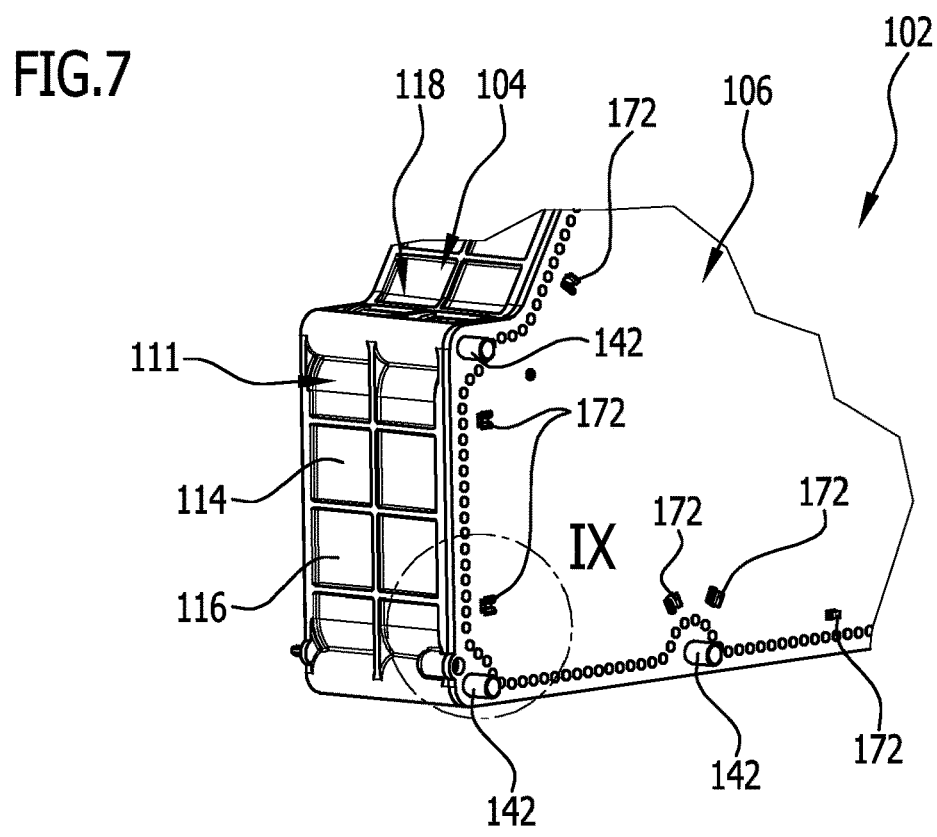
FIG. 7 is a schematic perspective view of a section of a battery module of the battery device from FIG. 1 from below.
Figure 8:
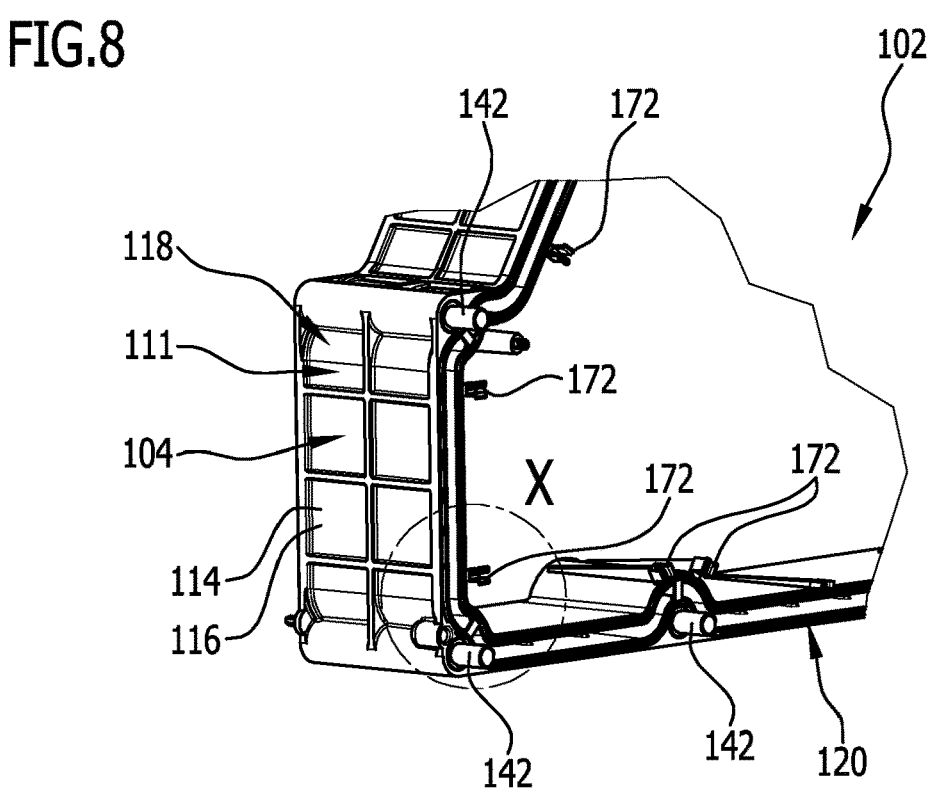
FIG. 8 is a schematic perspective view of a section of a battery module of the battery device from FIG. 1 from above.

Opposing wall portions of the inner wall element 122 and the outer wall element 124 are connected to one another in particular by means of a plurality of connecting webs 128 (cf. FIGS. 3 and 5).

The connecting webs 128 preferably run parallel to the stacking direction 110 of the battery device 100.

It can be favorable if the connecting webs 128 are arranged at regular distances from one another, for example.

A temperature control medium can preferably flow through the double wall 120 of the battery modules 102, in particular parallel to the stacking direction 110 of the battery device 100.

Battery cells 108 of the battery modules 102 can preferably be temperature-controlled by passing a temperature control medium through the double wall 120.

By providing the double wall 120, through which a temperature control medium can flow, fire protection and/or improved propagation protection of the battery device 100 can preferably be implemented, in particular by wetting the outer wall element 124 and/or the inner wall element 122 with a temperature control medium.

By wetting the outer wall element 124 and/or the inner wall element 122 with a temperature control medium, burning off or melting of the frame element 104 can in particular be made more difficult, delayed and/or prevented.

By providing the double wall 120, through which a temperature control medium can flow, the electromagnetic compatibility (EMC) of the battery device 100 can preferably also be increased, in particular if an electrically conductive temperature control medium is passed through the double wall 120.

It can also be favorable if increased mechanical strength of the frame element 104 can be provided by means of the double wall 120.

The double wall 120 of the frame element 104 preferably delimits a temperature control space 130 of the respective battery module 102, preferably at least on two sides (cf. FIG. 11). The temperature control space 130 is preferably closed in a ring shape.

The temperature control space 130 of a respective battery module 102 is preferably also delimited in the stacking direction 110 by the base element 106 of the battery module 102 and by a base element 106 of an adjacent battery module 102 (cf. FIG. 1).

The base element 106 of a battery module 102 preferably comprises one or more passage openings 132 that open into the temperature control space 130 of the battery module 102.

The passage openings 132 are circular, for example.

For the sake of clarity, only some of the passage openings 132 are identified with a reference sign in FIGS. 3 and 5.

With the exception of the passage openings 132, the temperature control space 130 is preferably completely delimited by the inner wall element 122, by the outer wall element 124, by the base element 106 of the respective battery module 102 and by a base element 106 of an adjacent battery module 102.

The temperature control space 130 of a respective battery module 102 preferably has a temperature control space contour in a cross section taken perpendicularly to the stacking direction 110 of the battery device 100.

The temperature control spaces 130 of adjacent battery modules 102 are preferably fluidically connected to one another, in particular by means of the passage openings 132 in the base element 106 of the battery module 102.

The passage openings 132 in particular form temperature control medium inlets and/or temperature control medium outlets, by means of which a temperature control medium can be introduced into and/or guided out of the temperature control space 130 of a respective battery module 102.

A temperature control space 130 forms, in particular, a temperature control channel 135 of a temperature control device 137 of a respective battery module 102.

It can be favorable if the passage openings 132 are arranged substantially along a line. The passage openings 132 are preferably arranged at regular distances from one another along the line. It can be provided in particular that the passage openings 132 of the base element 106 are arranged along a line that runs along the temperature control space contour of the temperature control space 130 of a respective battery module 102.

Each battery module 102 of battery device 100 preferably comprises two sealing elements 134.

By means of the sealing elements 134 of the battery modules 102, a sealing effect in accordance with protection class IP 6K9K can be achieved, for example.

A first sealing element 134 is preferably arranged between the frame element 104 and the base element 106 of a battery module 102.

It can be favorable if a second sealing element 134 is arranged between the frame element 104 and a base element 106 of an adjacent battery module 102.

It can be favorable, for example, if a sealing element 134 is injection molded onto the frame element 104 when the frame element 104 is produced.

As an alternative or in addition to this, it is possible for one or more sealing elements 134 to be injection molded onto the base element 106 while a holding body, which is yet to be described, is injection molded onto the base element 106.

For example, it is conceivable that a sealing element 134 is injection molded onto the base element 106 on opposing sides of the base element 106.

As an alternative to this, it is conceivable that a sealing element 134 is produced independently of the frame element 104 and/or independently of the holding body that is yet to be described. A sealing element 134 produced independently of the frame element 104 and/or independently of the holding body is preferably placed in sealing element receiving grooves of the frame element 104.

The sealing elements of a battery module 102 preferably comprise a first sealing portion 136 and a second sealing portion 138 (cf. FIGS. 3, 5, 10 and 11).

The first sealing portion 136 and/or the second sealing portion 138 are preferably closed in a ring shape.

The first sealing portion 136 and the second sealing portion 138 of the sealing elements 134 preferably each comprise a sealing lip that, for the sake of clarity, is not identified by a reference sign in the figures.

Figure 10:
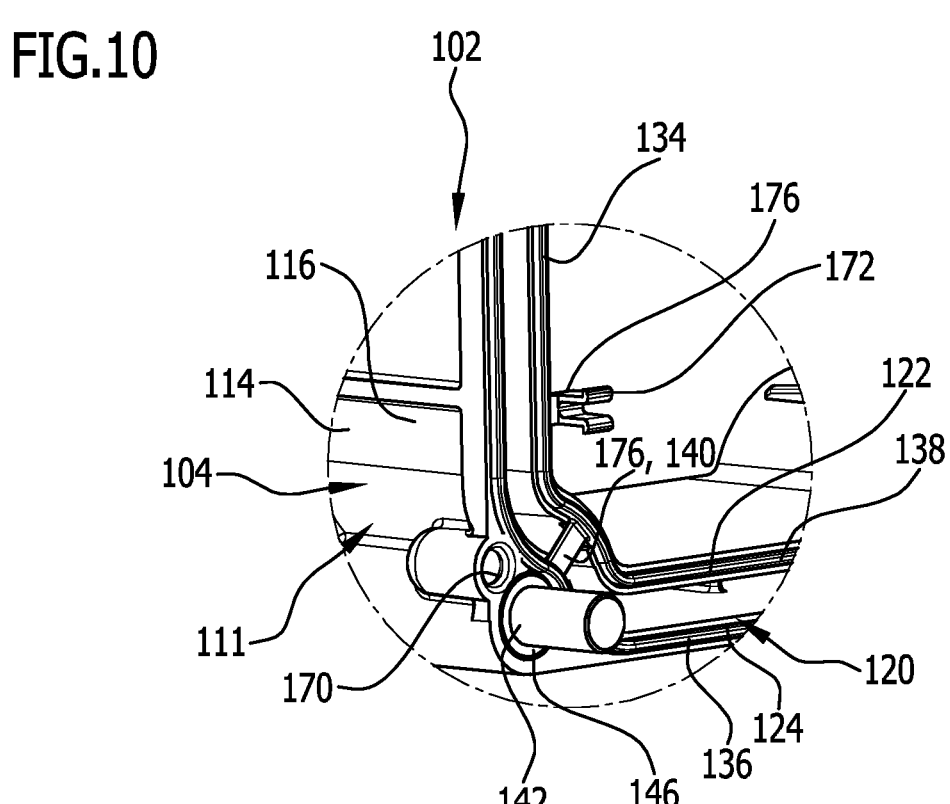
FIG. 10 is an enlarged representation of the region X in FIG. 8.

The first sealing portion 136 and the second sealing portion 138 are connected to one another, for example, by means of one or more web elements 140 (cf. FIGS. 5, 10 and 12).

The sealing elements 134 are preferably designed in one piece.

It can be favorable if a sealing portion 136, 138 of a sealing element 134 is arranged radially inside the line along which the passage openings 132 are arranged and radially outside of the line along which the passage openings 132 are arranged.

The sealing portions 136, 138 of the sealing elements 134 are preferably closed in a ring shape and in particular run substantially parallel to the line along which the passage openings 132 are arranged.

Figure 14:
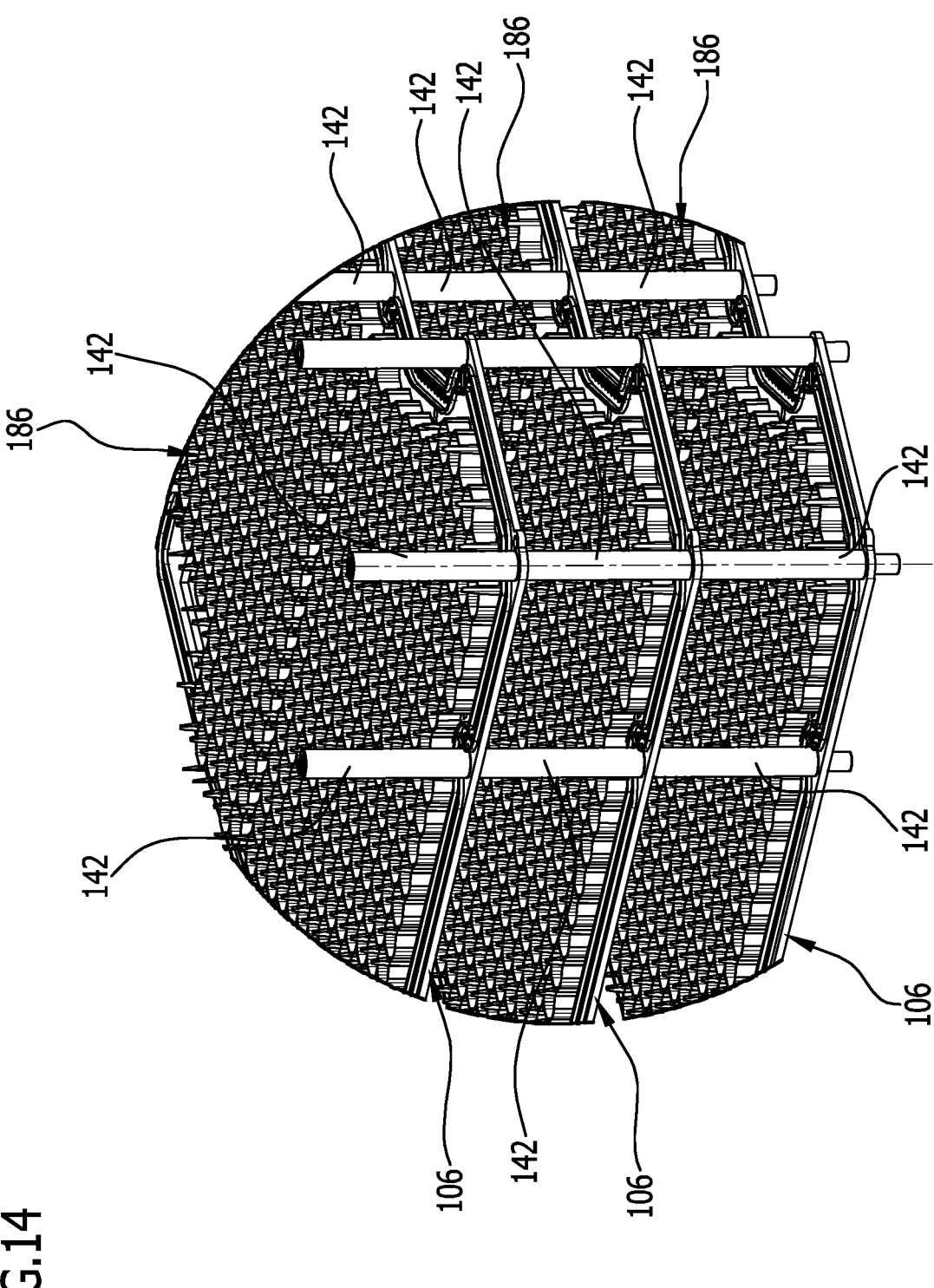
FIG. 14 is a schematic perspective view of a section of stacked base elements and spacer elements of a battery device from FIG. 1.
Figure 15:
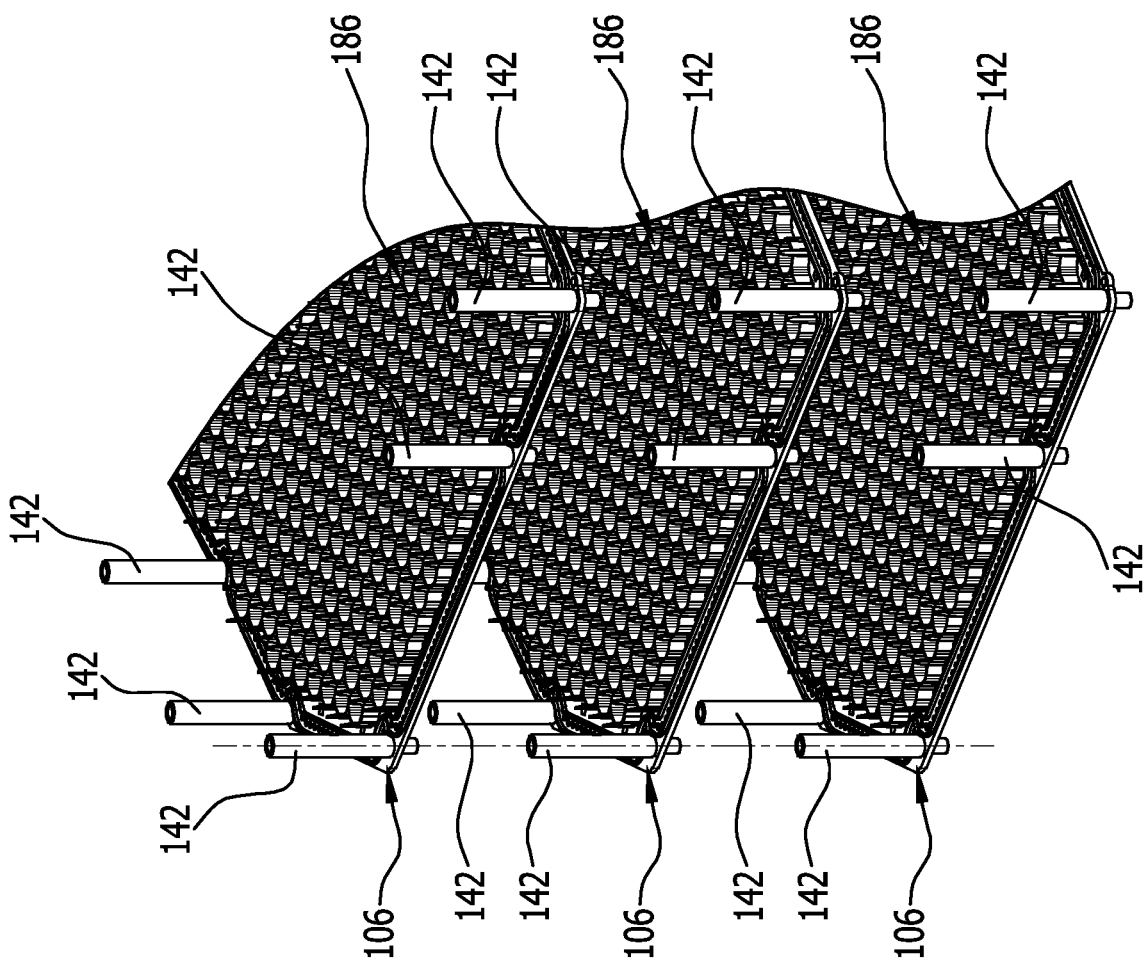
FIG. 15 is an exploded schematic perspective view of a section of the base elements and the spacer elements from FIG. 14.

Each battery module 102 of the battery device 100 preferably comprises one or more spacer elements 142, by means of which the base elements 106 of the battery modules 102 are arranged or can be arranged substantially parallel to one another (cf. FIGS. 14 and 15).

It can be favorable if the spacer elements 142 of a battery module 102 are designed to be pressure-stable.

The spacer elements 142 of a battery module 102 preferably have a higher pressure stability than the frame element 104 of the battery module 102, in particular in a direction parallel to the stacking direction 110 of the battery device 100.

The spacer elements 142 preferably comprise or are formed from a metallic material.

The spacer elements 142 are used in particular in the frame element 104 of a respective battery module 102.

The frame element 104 of a respective battery module 102 preferably comprises a plurality of receptacles 144, a spacer element 142 preferably being arranged in each receptacle 144 (cf. FIG. 12).

It can be favorable if the spacer elements 142 are of a substantially cylindrical design.

The spacer elements 142 of a respective battery module 100 are preferably arranged outside of the double wall 120 of the frame element 104 of a battery module 102 in a direction perpendicular to the stacking direction 110 of the battery device 100.

It can be favorable if the spacer elements 142 of two adjacent battery modules 102 are aligned in the stacking direction 110 of the battery device 100 (cf. FIGS. 14 and 15).

The spacer elements 142 preferably each comprise two contact surfaces 146 arranged on opposing sides of the spacer element 142 (cf. FIGS. 5, 10 and 12).

A respective spacer element 142 preferably contacts the base element 106 of the respective battery module 102 with a first contact surface 146 and contacts the base element 106 of an adjacent battery module 102 with a second contact surface 146 or can contact said base element.

A force can preferably be introduced from the spacer elements 142 into the base elements 106, in particular parallel to the stacking direction 110.

In particular, a compressive force can be transferred from the spacer elements 142 to the base elements 106 contacting the contact surfaces 146 of the spacer elements 142.

It can be favorable if the two contact surfaces 146 of a spacer element 142 are at a distance 148 from one another, which distance substantially corresponds to a height 150 of the wall 111, in particular the double wall 120, of the frame element 104 of a battery module 102 taken parallel to the stacking direction 110 (cf. FIG. 12).

The frame elements 104 of the battery modules 102, which comprise or are formed from a plastic material, can preferably be prevented from being compressed due to a clamping force acting on the battery modules 102 parallel to the stacking direction 110 of the battery device 100.

The spacer elements 142 of a respective battery module 102 are preferably bolt elements 152 or sleeve elements 154.

Spacer elements 142 designed as sleeve elements 154 are preferably designed as hollow cylinders.

In particular, it is conceivable that the spacer elements 142 of a respective battery module 102 are substantially circular or annular in a cross section taken perpendicularly to the stacking direction 110 of the battery device 100.

The spacer elements 142 are in particular rotationally symmetrical with respect to a longitudinal axis thereof.

The spacer elements 142 comprise, for example, a spacer portion 156 in which the spacer elements 142 are in particular cylindrical, for example circular-cylindrical.

The spacer portion 156 preferably runs between the contact surfaces 146 of a spacer element 142.

It can also be favorable if the spacer elements 142 also comprise an insertion portion 158 in which the spacer elements 142 are in particular cylindrical, for example circular-cylindrical.

The insertion portion 158 of a spacer element 142 can preferably be inserted into the spacer portion 156 of a spacer element 142 that is adjacent to the battery device 100 in the stacking direction 110.

In the embodiment of the battery device 100 illustrated in FIGS. 1 to 15, the battery modules 102 of the battery device 100 are clamped together, for example by means of the spacer elements 142.

The spacer elements 142 preferably each comprise screw elements 160, it being possible to screw together spacer elements 142 that are adjacent in the stacking direction 110 of the battery device 100 (cf. FIG. 12).

For example, it is conceivable that the insertion portion 158 of a spacer element 142 comprises an external thread and/or that the spacer portion 156 of a spacer element 142 comprises an internal thread.

It can be favorable if two adjacent battery modules 102 are clamped and/or screwed together.

As an alternative to this, it is conceivable that the battery modules 102 of the battery device 100 are clamped by means of clamping elements 162 that are guided through the spacer elements 142 and illustrated using dashed lines in FIGS. 1 and 12.

The clamping elements 162 of the battery device 100 are preferably guided through spacer elements 142 designed as sleeve elements 154.

In this case, it can be provided that the battery modules 102 of the battery device 100 are clamped or can be clamped between two end bodies 164 by means of the clamping elements 162.

The two end bodies 164, for example, comprise or are formed from a metallic material, in particular steel or aluminum.

It can be favorable if the two end bodies 164 comprise fastening elements (not shown in the drawings) by means of which the battery device 100 can be fixed to a supporting structure, for example to a supporting structure of a vehicle. It can therefore be favorable if the battery device 100 can only be fixed to a supporting structure by means of the end bodies 164.

As an alternative or in addition to this, it is conceivable that the battery modules 102 of the battery device 100 also in each case comprise one or more further fastening elements, by means of which the battery device 100 can be fixed to a supporting structure.

By clamping the battery modules 102, preferably substantially no force is exerted on battery cells 108 of battery modules 102, in particular parallel to stacking direction 110 and/or parallel to a longitudinal axis 126 of battery cells 108 of a respective battery module 102.

It can be favorable if the clamping elements 162 are what are referred to as tie rods.

The clamping elements 162, for example, comprise or are formed from a metallic material, in particular steel or aluminum.

Tie rods designed as clamping elements 162 each comprise, for example, a metallic rod having a thread that is not illustrated in the figures.

The bar is preferably arranged parallel to the stacking direction 110 for clamping the battery modules 102.

For example, to clamp the battery modules 102 between the two end bodies 164, a screw element 166, in particular a nut element, is screwed onto a respective clamping element 162.

In this case, it can be favorable if the battery modules 102 are clamped in the stacking direction 110 with a clamping force corresponding to a tension of at most approximately 30%, for example at most approximately 50%, of an upper yield point of a material of the clamping elements 162.

The battery modules 102 of the battery device 100 are preferably pressed together before being clamped, in particular in the stacking direction 110 of the battery device 100.

It can be favorable here if sealing elements 134 of the battery modules 102 are deformed, in particular compressed, between a frame element 104 and a base element 106 during the pressing of the battery modules 102.

Figure 13:
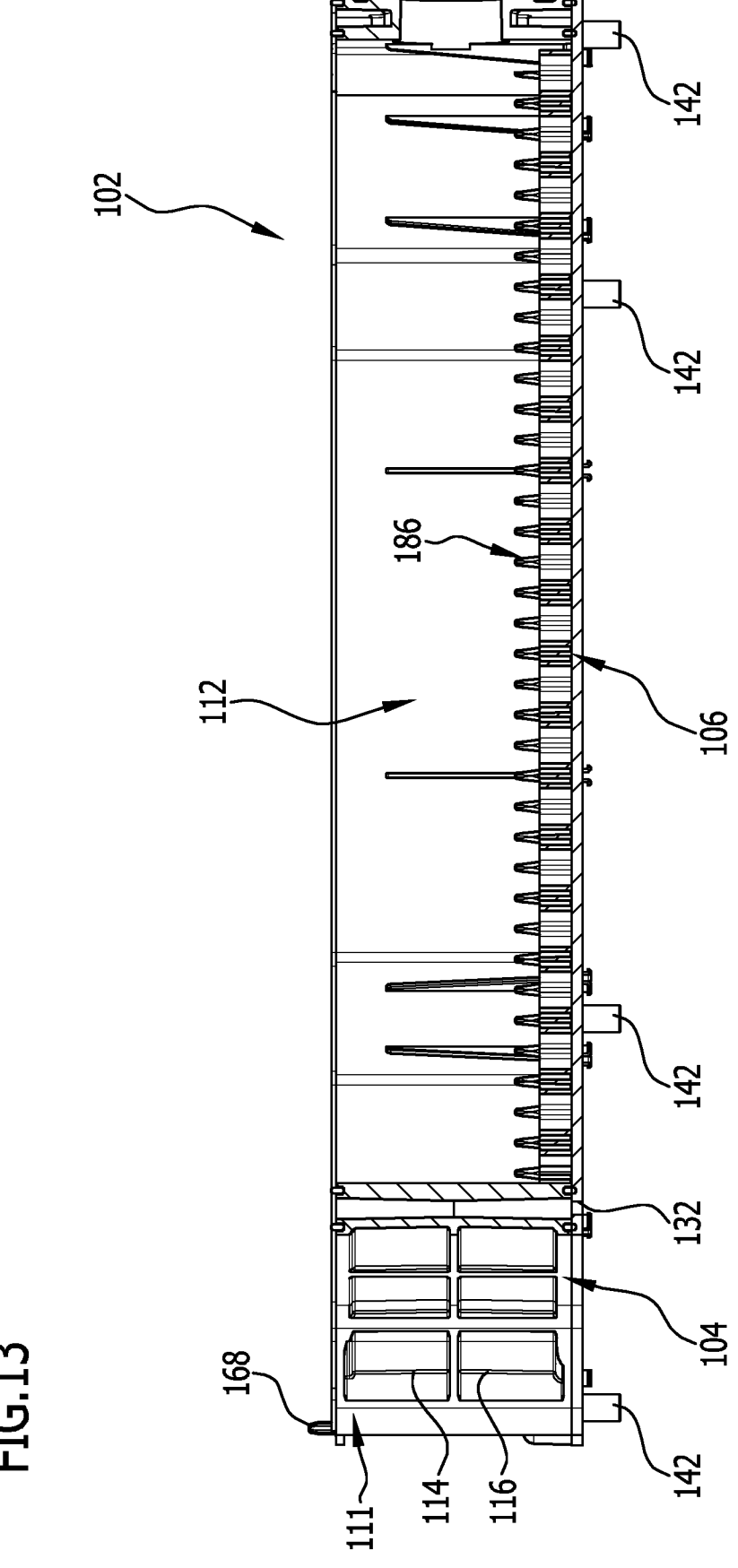
FIG. 13 is a schematic section through a battery module of the battery device from FIG. 1 along the line XIII-XIII in FIG. 6.

The frame elements 104 of the battery modules 102 preferably comprise one or more stacking projections 168 projecting away from the frame element 104 parallel to the stacking direction 110 of the battery device 100 (cf. FIGS. 11 to 13).

It can also be favorable if the frame elements 104 of the battery modules 102 comprise one or more stacking recesses 170, in each of which a stacking projection 168 of a frame element 104 of an adjacent battery module 102 can be received.

Figure 9:
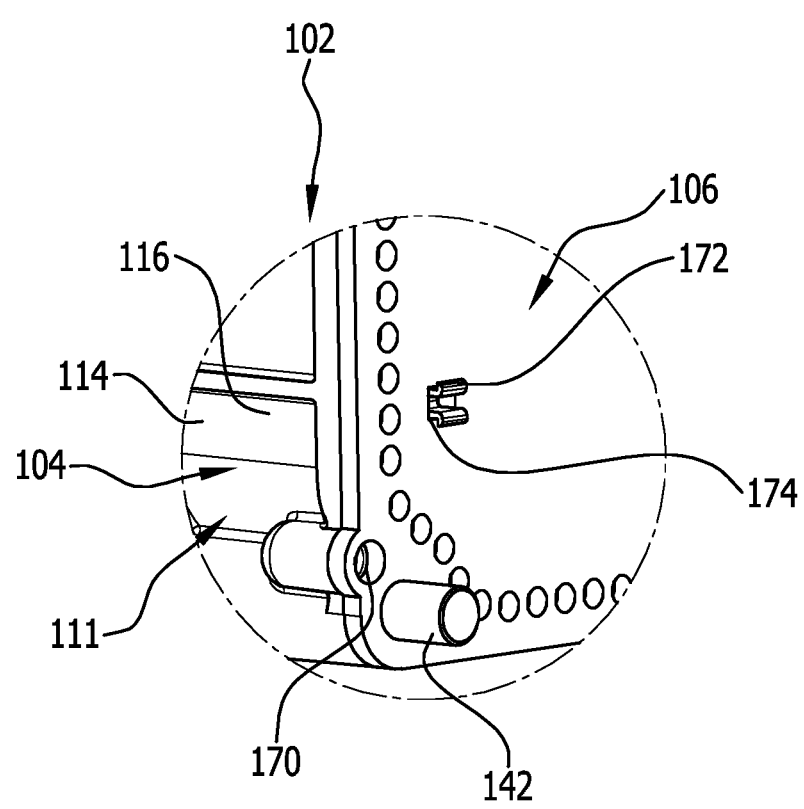
FIG. 9 is an enlarged representation of the region IX in FIG. 7.

The stacking projections 168 and the stacking recesses 170 of a respective frame element 104 are preferably arranged on opposing sides of the frame element 104 (cf. FIGS. 9 and 10).

Stacking of the battery modules 102 of the battery device 100 in the stacking direction 110 can preferably be facilitated by means of the stacking projections 168 and/or by means of the stacking recesses 170.

It can also be favorable if the frame element 104 of a respective battery module 102 is connected or can be connected, for example clipped, to the base element 106 of the battery module 102 in a force-fitting and/or form-fitting manner.

The frame element 104 of a respective battery module 102 preferably comprises one or more latching projections 172.

The base element 106 of a respective battery module 102 preferably also comprises one or more latching recesses 174, into which the latching projections 172 of the frame element 104 can be inserted (cf. FIGS. 7 to 12).

The latching projections 172 of a frame element 104 preferably each comprise two latching elements 176. A latching element 176 of a latching projection 172 preferably in each case comprises a latching hook. For the sake of clarity, the latching hooks are not identified with a reference sign in the figures.

In FIGS. 7 to 12, the latching projections 172 and the latching recesses 174 are arranged radially inside a frame element 104 of a respective battery module 102.

As an alternative to this, it is conceivable that the latching projections 172 are arranged radially outside the wall 111, in particular radially outside the double wall 120, of the frame element 104 of a respective battery module 102.

In particular, it can be favorable if the part of the base element 106 of the respective battery module 102 that delimits the receiving space 112 of a respective battery module 102 has no latching recesses 174 and thus in particular no passage openings.

For example, at least partial filling of the receiving space 112 with casting compound and/or fixing of the battery cells 108 on the base element 106 by means of casting compound can be facilitated.

The latching hooks of the two latching elements 176 of a latching projection 172 preferably engage behind the base element 106 of a respective battery module 102 when the frame element 104 is connected, in particular clipped, to the base element 106 in a force-fitting and/or form-fitting manner.

The frame elements 104 preferably also comprise a stiffening structure 178, for example a stiffening rib structure 180, on a circumferential surface.

The stiffness of a frame element 104, for example an injection-molded frame element, can preferably be increased by means of the stiffening structure 178.

The stiffening rib structure 178 of the frame elements preferably comprises a plurality of rib elements 182.

The base elements 106 of the battery modules 102, which preferably comprise or are formed from a metallic material, preferably form part of an outer surface 184 of the battery device 100 (cf. FIGS. 1 and 11), in particular in a direction perpendicular to the stacking direction 110 of the battery device 100.

The base elements 106 form, in particular, a part of the outer surface 184 of the battery device 100 that is closed in a ring shape. In particular, the base elements 106 of the battery modules 102 each form surface portions closed in a ring shape of the outer surface 184 of the battery device 100.

The surface portions closed in a ring shape and formed by the base elements 106 of the battery modules 102 are preferably separated from one another in the stacking direction 110 of the battery device 100 by the frame elements 104 of the battery modules 102.

If the base elements 106 of the battery modules 102 extend as far as the outer surface 184 of the battery device 100, heat can preferably be dissipated to the outer surface 184 of the battery device 100 by means of the base elements 106.

The battery cells 108 of a respective battery module 102 are preferably thermally coupled to the base element 106 of the battery module 102.

For example, it is conceivable that the battery cells 108 of a respective battery module 102 are thermally coupled to the base element 106 of the battery module 102 by means of a thermally conductive paste and/or by means of a casting compound.

The battery cells 108 of a respective battery module 102 are preferably fixed to the base element 106 of the battery module 102.

In particular, the battery cells 108 and the base element 106 are not in direct material contact.

In particular, passive temperature control of the battery device 100 can be implemented by means of the base elements 106.

In particular, because the base elements 106 form part of the outer surface 184 of the battery device 100, heat can be dissipated to the outer surface 184 of the battery device 100 by means of the base elements 106.

In particular, the battery cells 108 of a respective battery module 102 can be cooled by means of the base elements 106.

It can be favorable if the base elements 106 have a thermal conductivity of at least approximately 100 W/m*K, for example at least approximately 150 W/m*K.

If the base elements 106 comprise or are formed from aluminum, in particular AlMgSi0.5, they preferably have a thermal conductivity of approximately 186 W/m*K.

In one embodiment of the battery device 100 (not shown in the drawings), it is conceivable for the base elements 106 of the battery modules 102 to protrude beyond the frame elements 104 of the battery modules 102 at least in portions, for example closed in a ring shape, perpendicular to the stacking direction 110 of the battery device 100.

It can be provided that the battery device 100 comprises a heat sink and/or a temperature control element, which are thermally coupled to one or more, preferably to all, base elements 106 of the battery device 100.

The heat sink preferably comprises one or more cooling fins.

The heat sink and/or the temperature control element are in particular arranged on the outer surface 184 of the battery device 100.

The heat sink is preferably in direct material contact with one or more, preferably with all, base elements 106 of the battery device 100, in particular on the part of the outer surface 184 of the battery device 100 that is formed by the respective base elements 106 of the battery modules 102.

It can also be favorable if the base elements 106 comprise one or more temperature control channels, for example a temperature control channel structure (not shown in the drawings).

A temperature control channel, in particular a temperature control channel structure, of the base elements 106 can preferably be flowed through by means of a temperature control medium.

For example, it is conceivable that the base elements 106 are of multi-layer design and delimit a temperature control channel, in particular a temperature control channel structure.

A temperature control channel structure of the base elements 106 is produced, for example, by means of roll bonding.

It can be favorable if active temperature control of the battery device 100 can be implemented by means of the base elements 106 by providing a temperature control channel in the base elements 106.

The battery modules 102 preferably also comprise a holding body 186 for holding the battery cells 108 of the respective battery module 102.

The holding bodies 186 are preferably connected, in particular integrally, to the base element 106 of a respective battery module 102.

The holding bodies 186 are in particular designed in one piece.

Preferably, the holding bodies 186 comprise or are formed from a plastic material. The holding bodies 186 are in particular injection-molded components, in particular one-piece injection-molded components.

The holding body 186 preferably comprises a plurality of receiving openings 188, in each of which a battery cell 108 of the battery module 102 is received.

For reasons of clarity, only some of the receiving openings 188 are identified with a reference sign in FIGS. 3 and 5.

For example, it is conceivable that the holding body 186 comprises approximately 200 to approximately 600 receiving openings 188, for example approximately 400 receiving openings 188.

A number of receiving openings 188 in the holding body preferably substantially corresponds to a number of battery cells 108 in a battery module 102.

The holding bodies 186 of the battery modules 102 preferably comprise a honeycomb structure 190 or are formed by a honeycomb structure 190.

The honeycomb structure 190 of the holding bodies 186 preferably comprises a plurality of holding elements 192, in particular polygonal holding elements, that delimit the receiving openings 188.

The holding elements 192 are, for example, regular hexagons.

The holding elements 192 are preferably each arranged adjacent to a plurality of further holding elements 192.

For example, it is conceivable that holding elements 192 of the honeycomb structure 190 are each arranged adjacent to six further holding elements 192.

The receiving openings 188 of a holding element 192 are preferably delimited by a plurality of holding element webs 194, for example by six holding element webs 194.

A plurality of holding element webs 194 of adjacent retaining elements 192 are preferably connected to one another at a node 196.

In particular, it can be favorable if three holding element webs 194 of three adjacent holding elements 192 are connected to one another at the node 196.

The holding bodies 186 are preferably each injection molded onto the base element 106 of a battery module 102.

It can be favorable here if the holding bodies 186 comprise connection regions 198 arranged at a plurality of nodes 196, at which nodes the holding bodies 186 are each connected, for example integrally, to the base element 106.

The holding bodies 186 are preferably injection molded onto the base elements 106 in the connection regions 198.

For example, it is conceivable that a connection region 198 is arranged at approximately 50% of the nodes 196 of the holding body 186.

As an alternative to the holding body 186 shown in FIGS. 1 to 6 and 11 to 15, a respective battery module 102 can comprise a holding body 186, shown only using dashed lines in FIG. 11, to hold the battery cells 108.

The battery cells 108 of a respective battery module 102 are preferably integrally connected to the base element 106 of the battery module 102 by means of a casting compound 199.

The casting compound 199 comprises, for example, polyurethane, silicone and/or an epoxy resin.

The battery cells 108 are in particular embedded in the casting compound 199.

The casting compound 199 in particular forms the holding body 186 shown using dashed lines in FIG. 11.

It can be favorable if the battery cells 108 are embedded in the casting compound 199 in part or in full.

For example, it is conceivable that at least approximately 30%, for example at least approximately 50%, of a respective battery cell 108 is embedded in a casting compound 199 based on a length of said battery cell measured parallel to a longitudinal axis 126 of the battery cell 108.

The battery cells 108 of a respective battery module 102 are preferably thermally coupled to and/or electrically insulated from the base element 106 by means of the casting compound 199.

It can be favorable if the battery cells 108 are arranged at a distance from the base element 106 within the range of approximately 0.2 mm to approximately 1.5 mm, preferably within the range of approximately 0.3 mm to approximately 1 mm, by means of the casting compound 199.

The two sealing elements 134 of a respective battery module 102 are preferably connected, in particular integrally, to the base element 106 of the battery module 102.

The sealing elements 134 are preferably each injection molded onto the base element 106.

The two sealing elements 134 of a battery module 102 are preferably injection molded onto the base element 106 on two opposing sides of the base element 106.

The base elements 106 are preferably hybrid components, in particular metal-elastomer hybrid components.

Preferably, one, a plurality of or all of the battery modules 102 of the battery device 100 each comprise a degassing element (not shown in the drawings) for degassing the receiving space 112 of the respective battery module 102.

In particular, it can be favorable if each individual battery module 102 comprises a degassing element.

The degassing element of a respective battery module 102 is preferably arranged on the frame element 104 of the battery module 102.

For example, it is conceivable that the degassing element comprises or is formed by a bursting element and/or a pressure equalization element.

If all battery modules 102 of the battery device 100 each comprise a degassing element, a particularly short degassing path can preferably be implemented, such that hot gases can be routed as directly as possible into an area surrounding the battery device 100.

A propagation of a thermal runaway of battery cells 108 of a battery module 102 to further battery cells 108 of said battery module 102 and/or to battery cells 108 of adjacent battery modules 102 can preferably be prevented.

It can also be favorable if the battery modules 102 of the battery device 100 each comprise a propagation protection element (not shown in the drawings).

The propagation protection elements of a respective battery module 102 preferably comprise a heat-resistant and/or thermally insulating material, for example mineral wool fleece and/or glass fiber fleece.

The propagation protection elements are, for example, connected, for example bonded, to the base elements 106 of the battery modules.

It can be favorable if a propagation protection element of a battery module 102 is arranged on a side of the base element 106 that faces away from the receiving space 112 of the battery module 102.

The propagation protection element of a battery module 102 preferably delimits the receiving space 112 of an adjacent battery module 102.

By providing a propagation protection element, a propagation of a thermal runaway of battery cells 108 of a battery module 102 to battery cells 108 of an adjacent battery module 102 can preferably be prevented.

The battery device 100 shown in FIGS. 1 to 16 also comprises, for example, one or more temperature control elements 200, which are each arranged between two adjacent battery modules 102.

Figure 16:
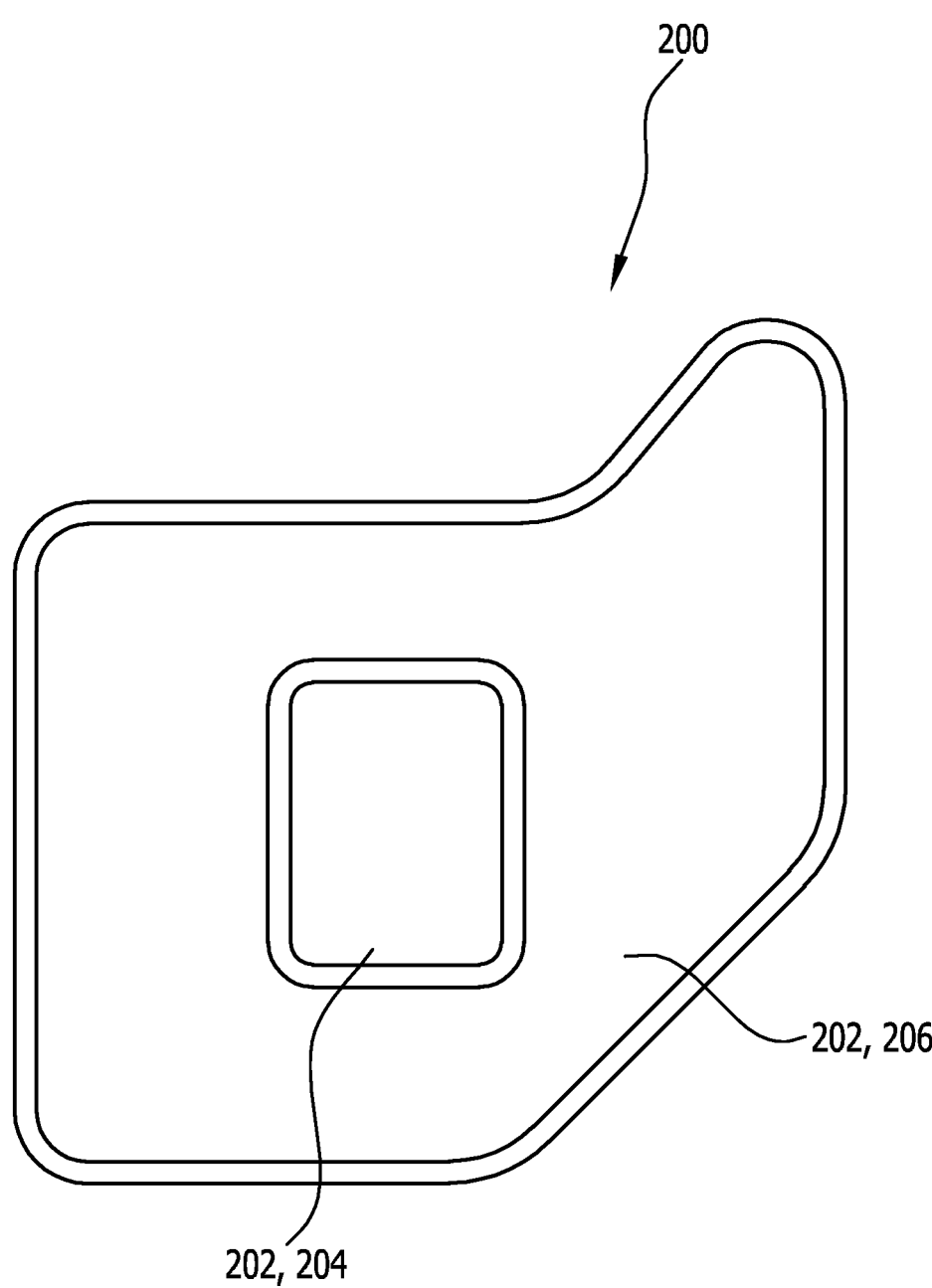
FIG. 16 is a schematic plan view of a temperature control element of a battery device from FIG. 1.

Such a temperature control element 200 is shown in FIG. 16, for example.

The temperature control elements 200 preferably have a cross section taken perpendicularly to stacking direction 110 of battery device 100, which cross section substantially corresponds to a cross section of a receiving space 112 of battery modules 102 of battery device 100 taken perpendicularly to stacking direction 110 of battery device 100.

It can be favorable, for example, if the temperature control elements 200 comprise or are formed by electrical resistance heating elements.

A temperature control element 200, which comprises or is formed by an electrical resistance heating element, preferably forms a propagation protection element.

A temperature control element 200, which comprises or is formed by an electrical resistance heating element, preferably comprises a heat-resistant material.

Alternatively or additionally, it is conceivable that the temperature control elements 200, each of which is arranged between two adjacent battery modules 102, comprise one or more temperature control channels through which a temperature control medium, for example a cooling or heating liquid, can be conveyed.

It can be favorable if the temperature control elements 200 are produced by means of a roll-bonding process.

The temperature control elements 200 preferably each comprise two or more than two temperature control zones 202 in which different temperatures can be adjusted.

In particular, the temperature control elements 200 in the temperature control zones 202 have different heat outputs.

For example, it is conceivable that the temperature control elements 202 comprise a radially inner temperature control zone 204 and a radially outer temperature control zone 206.

The radially outer temperature control zone 206 preferably surrounds the radially inner temperature control zone 204.

It can be favorable if the temperature control elements 200 in the radially outer temperature control zone 206 have a higher heat output per unit area than in the radially inner temperature control zone 204.

Preferably, selective heating of individual groups of battery cells 108 can be made possible by providing a temperature control element 200 having a plurality of temperature control zones 204. In particular, the temperatures of the battery cells 108 of a battery module 102 can be equalized.

By equalizing the temperatures of the battery cells 108 of a battery module 102, a higher maximum charging current and thus in particular a reduction in charging time can preferably be achieved.

In particular, a more uniform discharge of the battery cells 108 of a battery module 102 can also be implemented.

Figure 17:
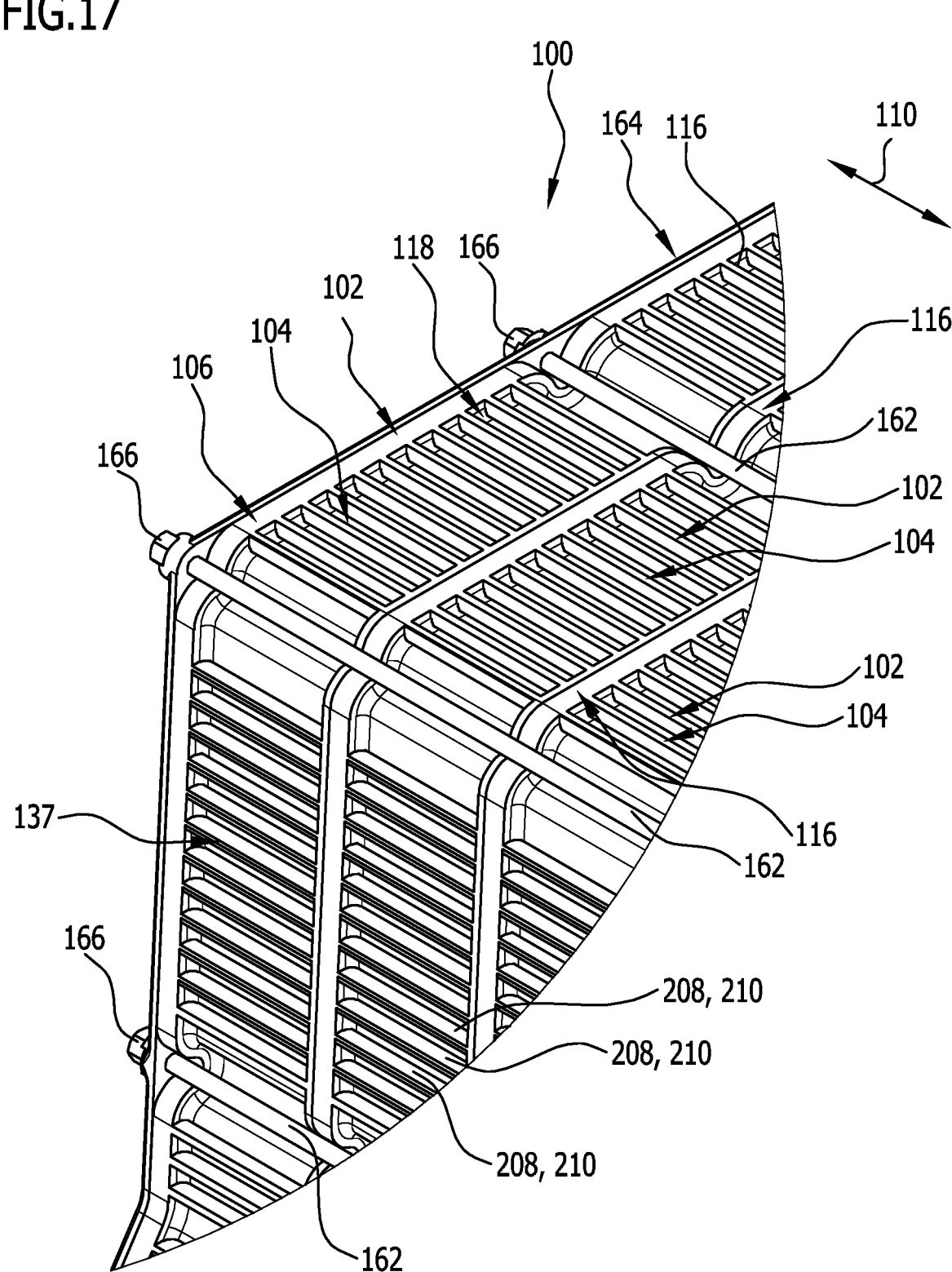
FIG. 17 is a schematic perspective view of a section of a further embodiment of a battery device.

An embodiment of a battery device 100 shown in FIG. 17 differs from the embodiment of a battery device 100 shown in FIGS. 1 to 16 substantially in that the frame element 104 and the base element 106 are made of a metallic material.

Frame element 104 preferably forms a spacer element 142.

It can be favorable if the frame element 104 and/or the base element 106 are produced in one piece from a metallic material, for example aluminum.

For example, it is conceivable that the frame element 104 and the base element 106 are a one-piece die-cast aluminum part.

As an alternative to this, it is conceivable that one base element 106 is integrally connected to a frame element 104, in particular welded, for example by means of friction stir welding.

By integrally connecting the base element 106 and the frame element 104, thermal and/or mechanical coupling of the base element 106 and the frame element 104 can preferably be implemented.

In particular, metallic thermal conduction from the base element 106 into the frame element 104 can be implemented.

The frame element 104 preferably comprises one or more heat-conducting elements 208, in particular one or more cooling fins 210, which are arranged in particular on the outer surface 184 of the frame element 104.

For example, it is conceivable that the cooling fins 210 are arranged parallel to the stacking direction 110.

In particular, the temperature control device 137 comprises the one or more heat-conducting elements 208, in particular the cooling fins 210.

The outer surface 184 of the frame element 104 can preferably be enlarged by means of the heat-conducting elements 208, in particular by means of the cooling fins 210.

A ratio of the outer surface 184 of the frame element 104 to an inner surface of the frame element 104 is preferably at least approximately 1.3:1, preferably at least approximately 1.5:1.

It can also be favorable if, in addition to the heat-conducting elements 208, the temperature control device 137 comprises a blower (not shown in the drawings) by means of which the heat-conducting elements 208 can be blown on to dissipate heat from them.

As an alternative or in addition to this, it is conceivable that the heat-conducting elements 208 can be blown on by the relative wind when a vehicle is moving in order to dissipate heat therefrom.

Otherwise, the embodiment of a battery device 100 shown in FIG. 17 corresponds in terms of structure and function to the embodiment of a battery device 100 shown in FIGS. 1 to 16, such that reference is made to the above description thereof.

Figure 18:
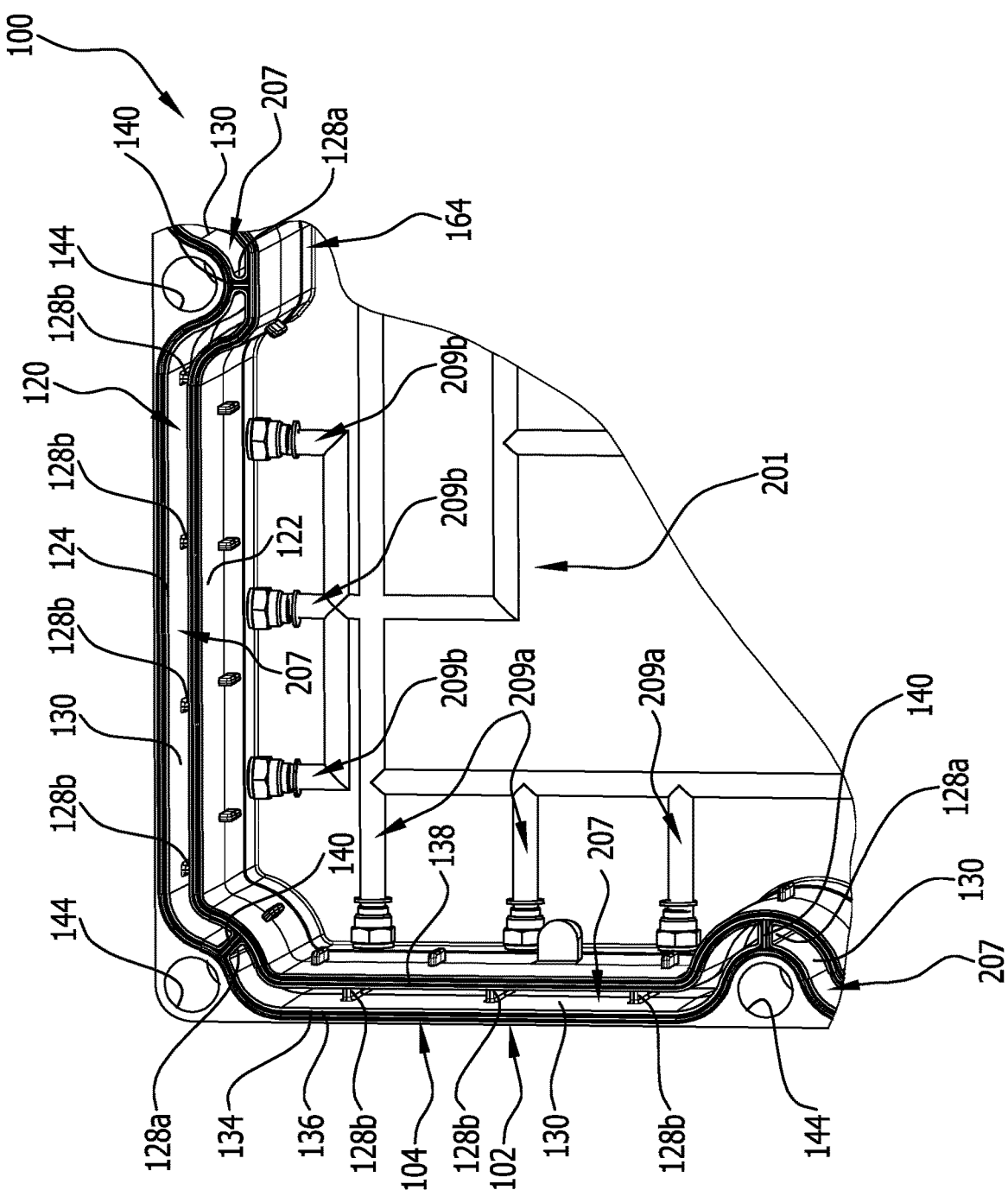
FIG. 18 shows a section of a schematic perspective view of a further embodiment of a battery device.
Figure 19:
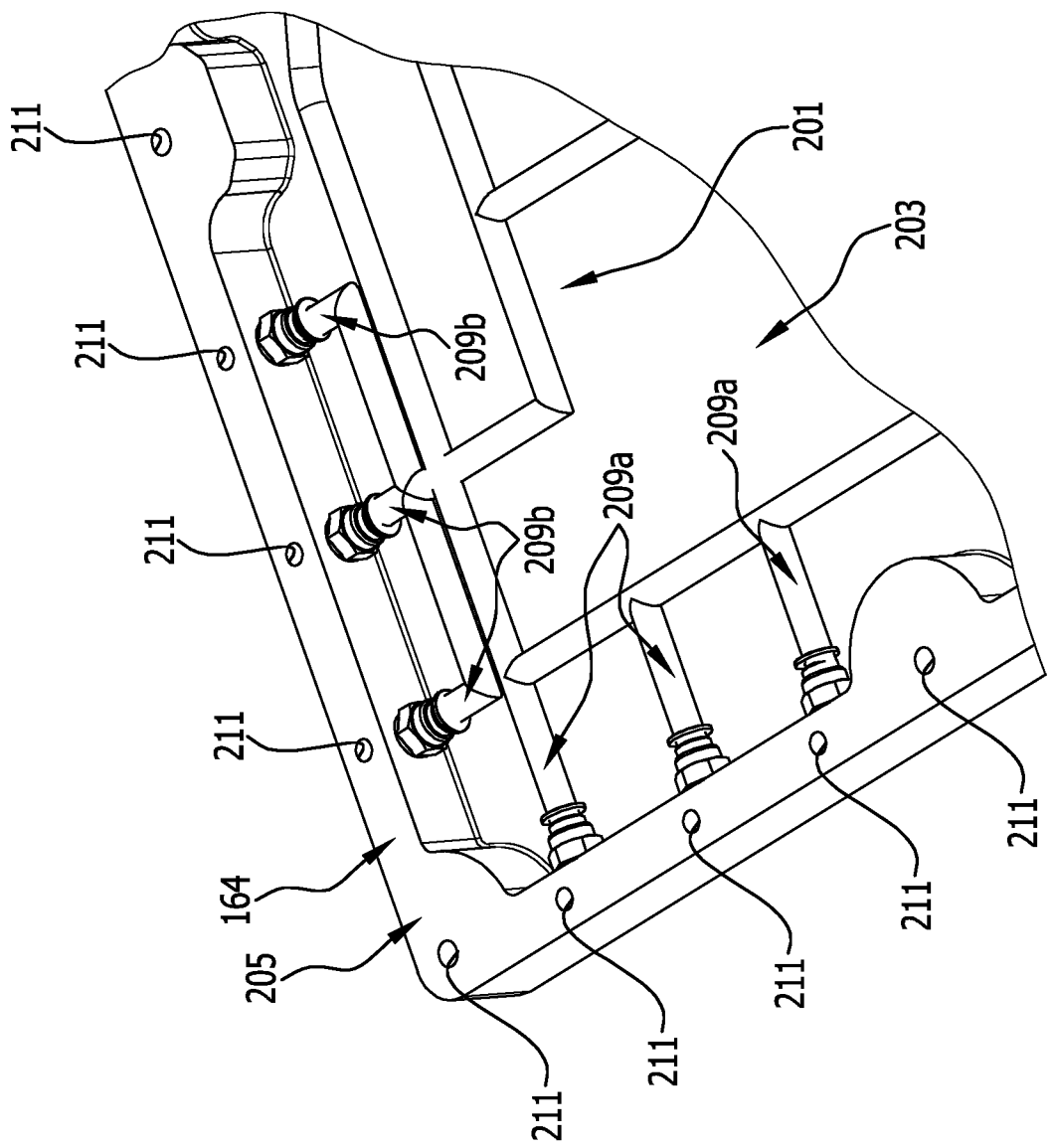
FIG. 19 shows a section of a schematic perspective view of an end body of the battery device from FIG. 18.

An embodiment of a battery device 100 shown in FIGS. 18 and 19 differs from the embodiment of a battery device 100 shown in FIGS. 1 to 16 substantially in that one or both end bodies 164 of the battery device 100 comprise a distributor structure 201 for distributing a temperature control medium in the temperature control channels 135 of the battery modules 102.

It can be favorable if the temperature control medium can be conveyed by means of the distributor structure 201 into the double wall 120, in particular into the temperature control space 130 of a battery module 102, which is arranged adjacent to an end body 164.

The end bodies 164 comprise, for example, a cover element 203 and an edge element 205, which is closed in particular in a ring shape.

The edge element 205 preferably projects beyond the cover element 203 parallel to the stacking direction 110 and has a mechanically stabilizing effect, for example.

In the embodiment of a battery device 100 illustrated in FIGS. 18 and 19, individual connecting webs 128a have a height parallel to the stacking direction 110 of the battery device 100 that substantially corresponds to the height of the frame element 104 of a battery module 102.

Due to the connecting webs 128a, temperature control chambers 207 are formed in the double wall 120, in particular in the temperature control space 130 of the battery modules 102, which temperature control chambers are in particular fluidically separated from one another.

It can be favorable if the web elements 140 of a sealing element 134 contact the connecting webs 128a.

The temperature control chambers 207 can preferably be sealed by means of the sealing element 134, in particular by means of the web elements 140 of the sealing element 134.

Connecting webs 128b arranged within a respective temperature control chamber 207 preferably do not completely fluidically separate the respective temperature control chamber 207.

For example, it is possible for the connecting webs 128b arranged within a respective temperature control chamber 207 to have a height parallel to the stacking direction 110 of the battery device 100 that is smaller than the height of the frame element 104 of a battery module 102.

In order to be able to conduct a temperature control medium into the temperature control chambers 207 of the double wall 120 of the frame element 104, one or both end bodies 164 comprise, in particular, a plurality of distributor channels 209 of the distributor structure 201.

In this case, the distributor channels 209 comprise, for example, inlet channels 209a and/or return channels 209b.

It can be favorable if a respective distributor channel 209 comprises a deflection (not shown in the drawings) and is arranged in the edge element 205.

The temperature control medium can preferably be deflected by approximately 90° by means of the deflection.

The distributor channels 209, in particular the inlet channels 209a and/or the return channels 209b, each preferably open out at a distributor opening 211 on an end face of the edge element 165 that is arranged perpendicular to the stacking direction 110.

It can be favorable, for example, if three distributor openings 211 each are directed into one temperature control chamber 207 in each case.

It is in particular conceivable that only distributor openings 211 of inlet channels 209a and/or only distributor openings 211 of return channels 209b are directed into a temperature control chamber 207.

In particular, it can be favorable if only distributor openings 211 of inlet channels 209a and/or only distributor openings 211 of return channels 209b are alternately directed into adjacent temperature control chambers 207.

Preferably, an at least approximately constant temperature of the frame element 104 can be adjusted.

Otherwise, the embodiment of a battery device 100 shown in FIGS. 18 and 19 corresponds in terms of structure and function to the embodiment of a battery device 100 shown in FIGS. 1 to 16, such that reference is made to the above description thereof.

Figure 20:
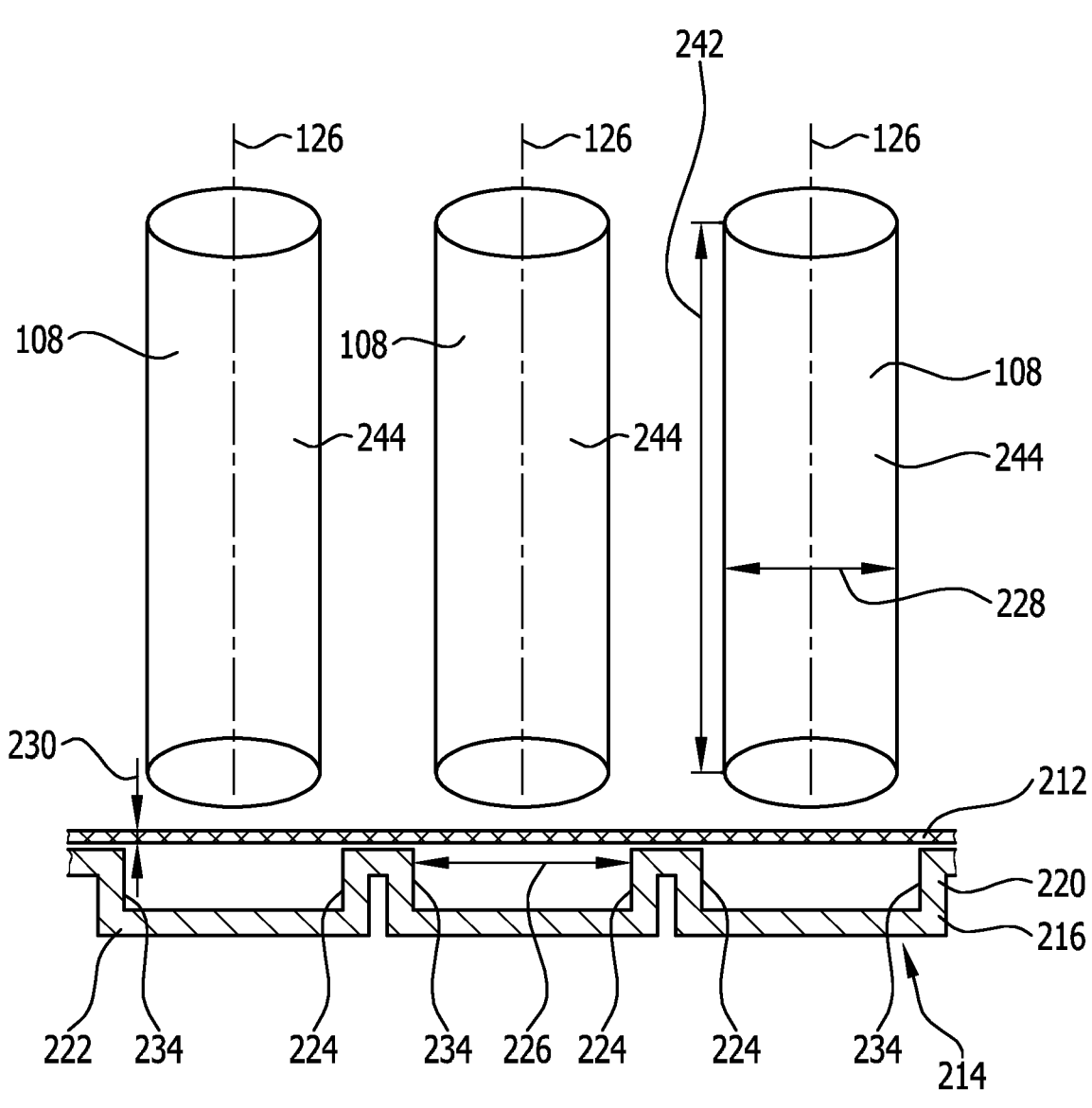
FIG. 20 is a schematic representation of a first method step of an embodiment of a method for fixing battery cells.
Figure 21:
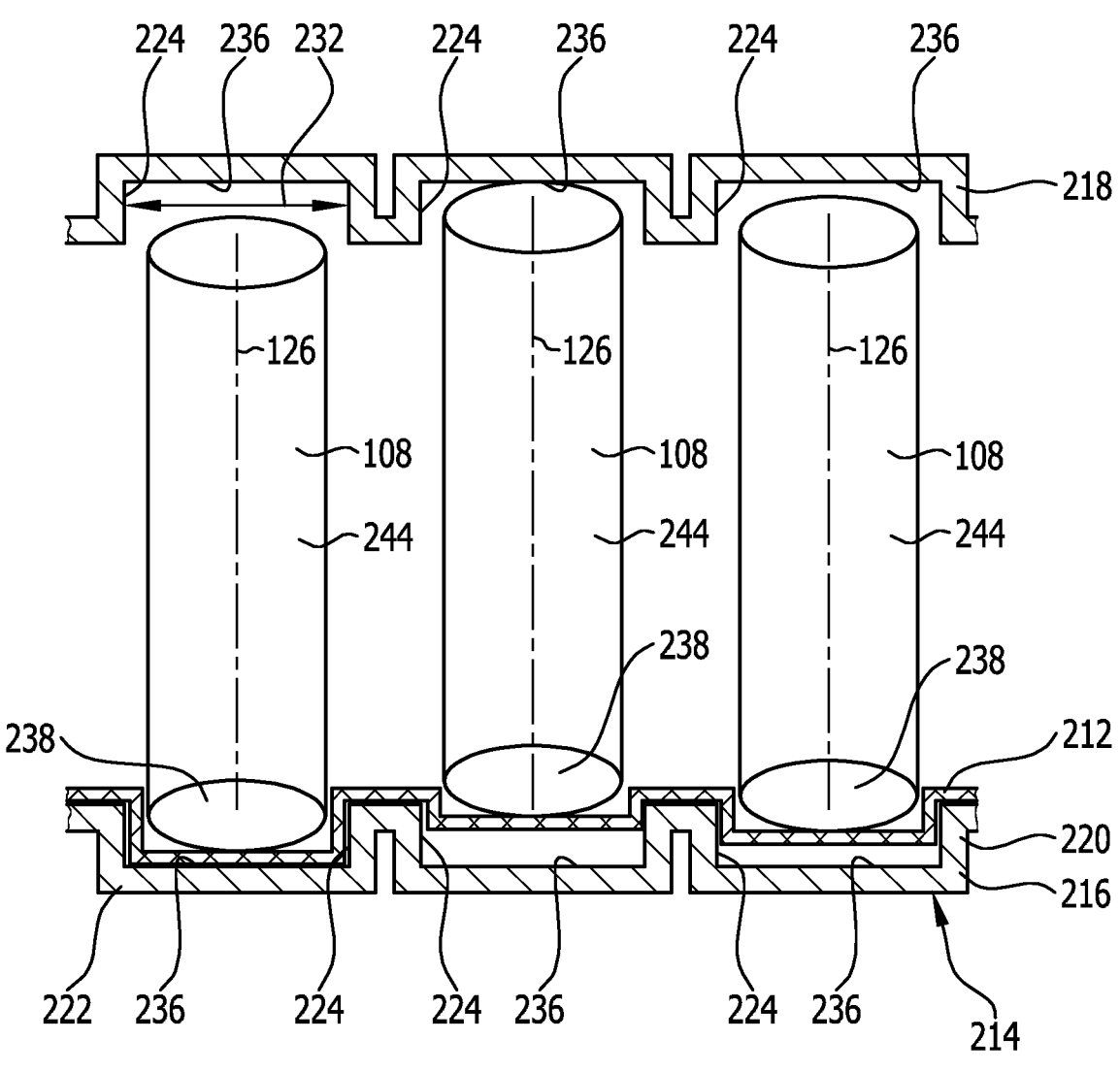
FIG. 21 is a schematic representation of a second method step, subsequent to the first method step from FIG. 20, of the embodiment of a method for fixing battery cells.
Figure 22:
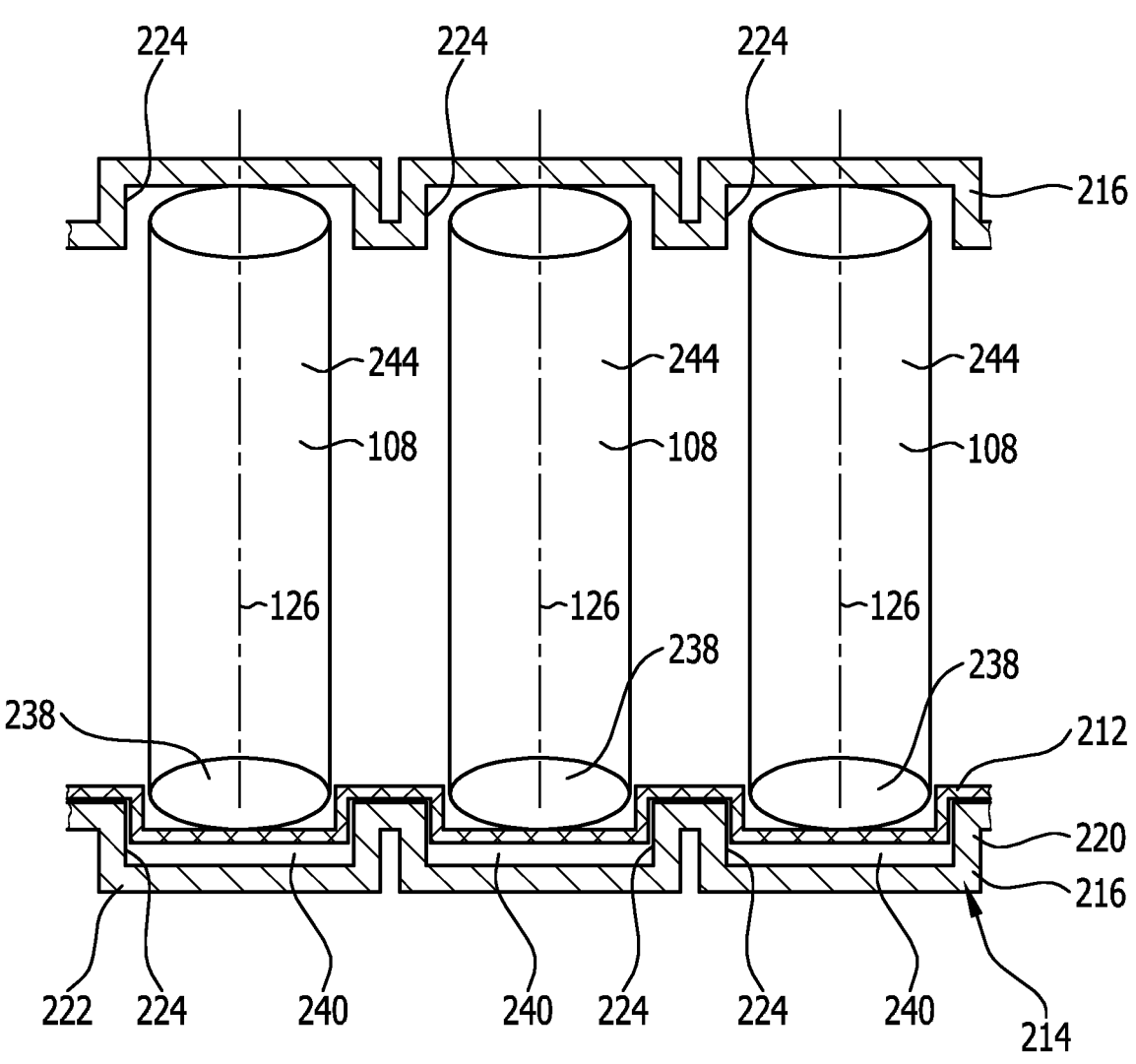
FIG. 22 is a schematic representation of a third method step, subsequent to the second method step from FIG. 21, of the embodiment of a method for fixing battery cells.

FIGS. 20 to 22 show various method steps of an embodiment of a method for fixing battery cells 108.

In the method, the battery cells 108, in particular round cells, are fixed in a layer element 212, in particular by means of plastic deformation of the layer element 212.

The layer element 212 is, for example, a thermoformable layer element 212.

The layer element 212 preferably comprises or is formed from a plastic material.

The layer element 212 in particular comprises or is formed from an electrically insulating material.

For example, it can be favorable if the layer element 212 comprises or is formed from a polyolefin, for example polyethylene (PE) or polypropylene (PP).

The layer element 212 preferably comprises a low-density polyethylene (LDPE).

The layer element 212 is, for example, a shrink film.

It is also conceivable, for example, for the layer element to comprise or be formed from polymethylmethacrylate (PMMA) or polycarbonate (PC).

Before they are fixed in the layer element 212, the battery cells 108 are preferably aligned relative to one another, in particular by means of a mold 214.

In particular, the mold 214 comprises a first mold half 216 having a negative mold, in which the battery cells 108 can be received at least in part.

In particular, the first mold half 216 has a negative mold of the predetermined pattern.

The mold 214 preferably comprises a second mold half 218 having a negative mold, in which the battery cells 108 can be received at least in part.

The first and second mold halves 216, 218 are preferably movable relative to one another. The first mold half 216 is in particular a die element 220.

In particular, the first mold half 216 forms a shaping element 222.

The first mold half 216 preferably comprises a plurality of positioning openings 224, in each of which a battery cell 108 can be received for aligning the battery cells 108.

In particular, it is conceivable that the first mold half 216 comprises a plurality of lines and a plurality of rows of positioning openings 224, a line and/or a row in each case comprising a plurality of positioning openings 224.

The second mold half 218 preferably also has a negative mold of the predetermined pattern.

The second mold half 218 preferably also comprises a plurality of positioning openings 224, in each of which a battery cell 108 can be received for aligning the battery cells 108.

It can be favorable if the positioning openings 224 of the first mold half 216 and/or the second mold half 218 are each substantially cylindrical, in particular substantially circular-cylindrical.

An inside diameter 226 of the positioning openings 224 in the first mold half 216 is preferably larger than an outside diameter 228 of the battery cells 108.

It can be favorable, for example, if an inside diameter 226 of the positioning openings 224 in the first mold half 216 is substantially the same size or smaller than the sum of the outside diameter 228 of the battery cells 108 and twice the material thickness 230 of the layer element 212.

It can also be favorable if an inside diameter 232 of the positioning openings in the second mold half substantially corresponds to the outside diameter 228 of the battery cells 108.

The battery cells 108 are preferably arranged in the positioning openings 224 of the first mold half 216.

It can be favorable if a positioning device (not shown in the drawings) is used, for example an industrial robot.

The battery cells 108 are preferably arranged in a plurality of rows and a plurality of columns in the predetermined pattern.

For example, it is conceivable that the battery cells 108 are each at an identical first distance from one another in a row direction of the predetermined pattern.

It can also be favorable if the battery cells 108 are each at an identical second distance from one another in a column direction of the predetermined pattern.

In this case, it can be provided that the first distance in the row direction is smaller or larger than the second distance in the column direction.

The layer element 212 is preferably deformed by positioning the layer element 212 between the battery cells 108 and the first mold half 216 and then arranging the battery cells 108 in the positioning openings 224 of the first mold half 216.

The layer element 212 and a respective battery cell 108 are preferably clamped within the positioning openings 224 of the first mold half 216 and deformed in the process.

The layer element 212 is in particular clamped between a positioning opening wall 234 and a battery cell 108 in each case.

Before the battery cells 108 are fixed in the layer element 212, they are preferably initially aligned parallel to one another and/or in the predetermined pattern by means of the mold 214 (cf. FIG. 21).

The battery cells 108 are arranged in particular in such a way that the longitudinal axes 126 of the battery cells 108 are arranged parallel to one another.

After the parallel alignment and/or after the alignment in a predetermined pattern, one or more battery cells 108 are preferably moved parallel to the longitudinal axes 126 of the battery cells 108 (cf. FIG. 22).

In this case, the battery cells 108 are preferably moved against a stop 236 that is preferably arranged perpendicular to the longitudinal axes 126 of the battery cells 108.

The battery cells 108 are preferably moved against the stop 236 in such a way that the base surfaces 238 of all the battery cells 108 are arranged in a single plane after the movement.

It can be favorable if the first mold half 216 and the second mold half 218 are moved toward one another in order to arrange the base surfaces 238 of the battery cells 108 in one plane.

For example, it is conceivable that the positioning openings 224 in the first mold half 216 and/or the positioning openings 224 in the second mold half 218 comprise or form a stop 236.

Alternatively, it is conceivable that the second mold half 218 comprises a stop 236 and that the first mold half 216 comprises a movement device (not shown in the drawings) for moving one or more battery cells 108, by means of which movement device the battery cells can be moved against the stop 236 of the second mold half 218.

For example, it is conceivable that the movement device comprises one or more pistons that can be displaced in positioning openings 224 in the first mold half 216.

As an alternative to this, it is conceivable that the movement device comprises one or more nozzle elements that open into the positioning openings 224 of the first mold half 216.

The layer element 212 and/or the battery cell 108 arranged in a respective positioning opening 224 are preferably moved by pressurizing a pressure chamber 240 delimited by the layer element 212 and the positioning opening 224.

In particular, the layer element 212 and the battery cell 108 arranged in a respective positioning opening 224 of the first mold half 216 are moved in the positioning opening 224.

The battery cells 108 are preferably fixed in the layer element 212 by heating the layer element 212 and/or by subsequently cooling the layer element 212.

The layer element 212 is preferably shrunk onto the battery cells 108.

The layer element 212 is in particular only shrunk onto a partial region of the battery cells 108.

The battery cells 108 are preferably not completely surrounded by the layer element 212.

It can be favorable, for example, if the layer element 212 is only shrunk onto the first side of the battery cells 108 in the direction of the longitudinal axes 126 of the battery cells 108.

For example, it can be provided that the layer element 212 is shrunk onto the battery cells 108 over at most approximately 50% of a length 242 of a respective battery cell 108.

The layer element 212 is in each case preferably shrunk onto the battery cells 108 over at least approximately 10%, in particular at least approximately 20%, for example at least approximately 30%, of the length 242 of a respective battery cell 108.

After the battery cells 108 have been fixed, the layer element 212 preferably rests on the battery cells 108 in a pot-shaped manner.

In particular, it can be provided that the layer element 212 rests to an extent of at most approximately 50% against a lateral surface 244 of a respective battery cell 108.

The layer element 212 preferably rests to an extent of at least approximately 10%, for example to an extent of at least approximately 20%, preferably to an extent of at least approximately 30%, against a lateral surface 244 of a respective battery cell 108.

It can also be favorable if the layer element rests completely against the base surface 238 of a respective battery cell 108 after the battery cells 108 have been fixed in place.

The cooled layer element 212 is preferably substantially rigid.

Figure 23:
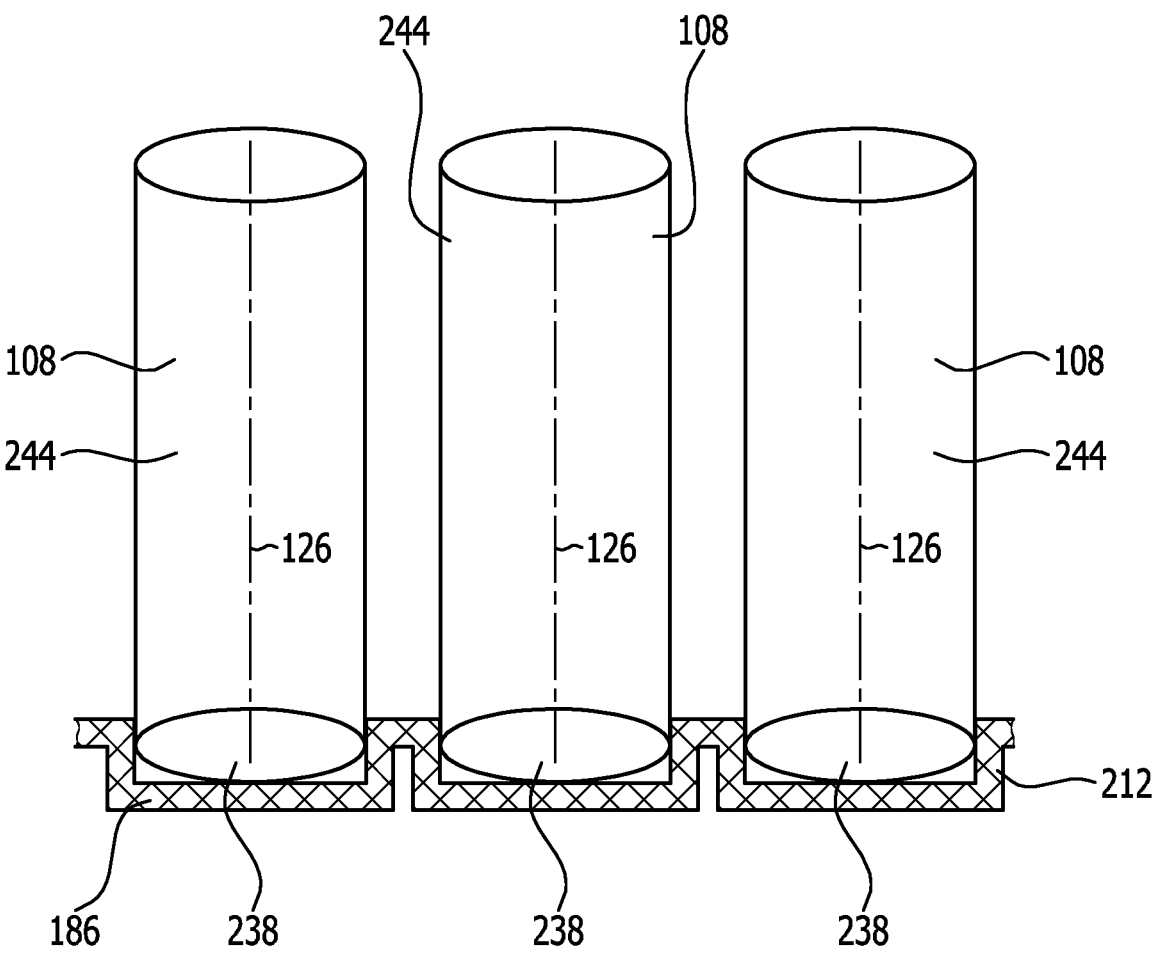
FIG. 23 is a schematic representation of battery cells fixed in a deformed layer element.
Figure 24:
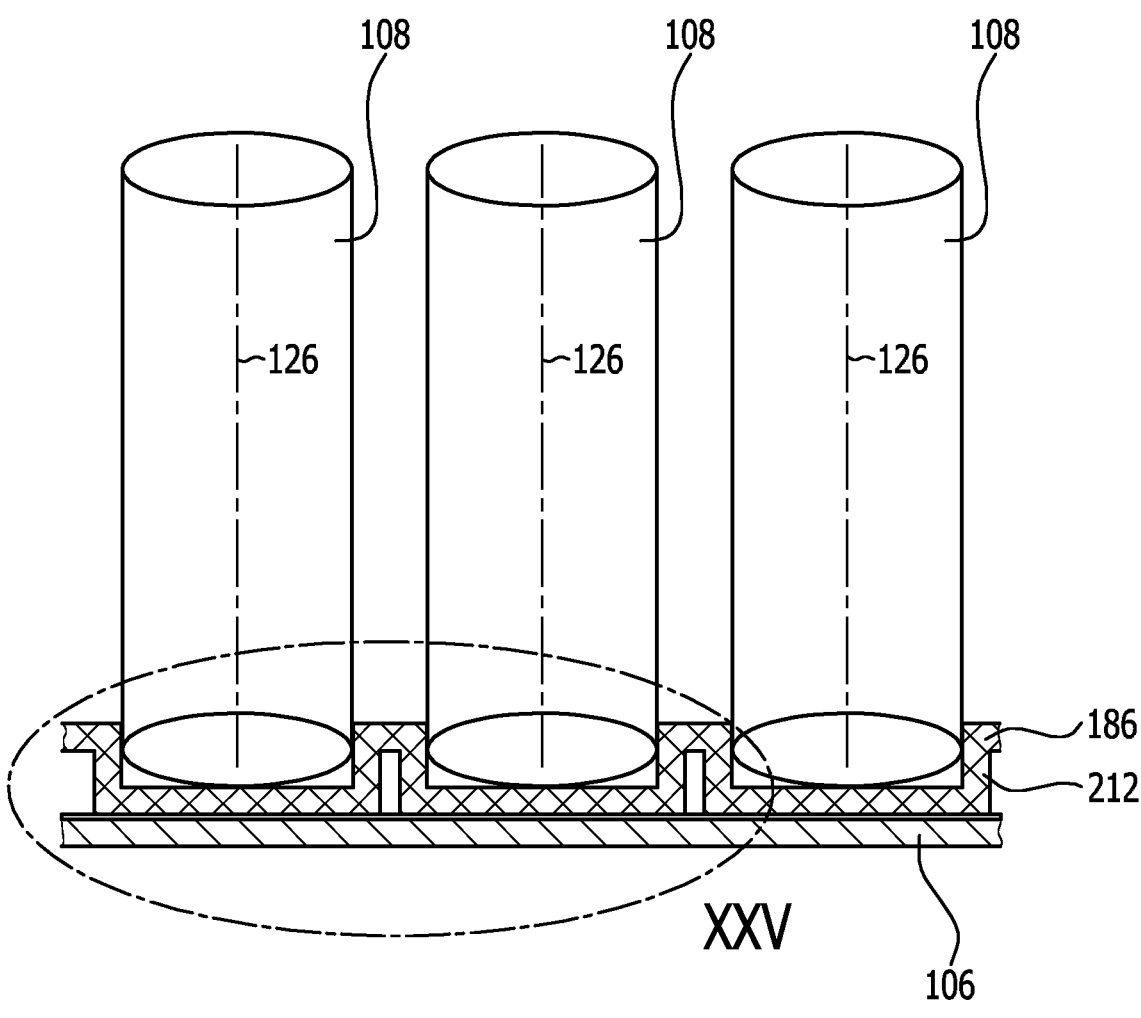
FIG. 24 is a schematic representation of the battery cells fixed in the deformed layer element, the deformed layer element forming a holding body and the holding body being connected to a base element of a battery module of a battery device.
Figure 25:
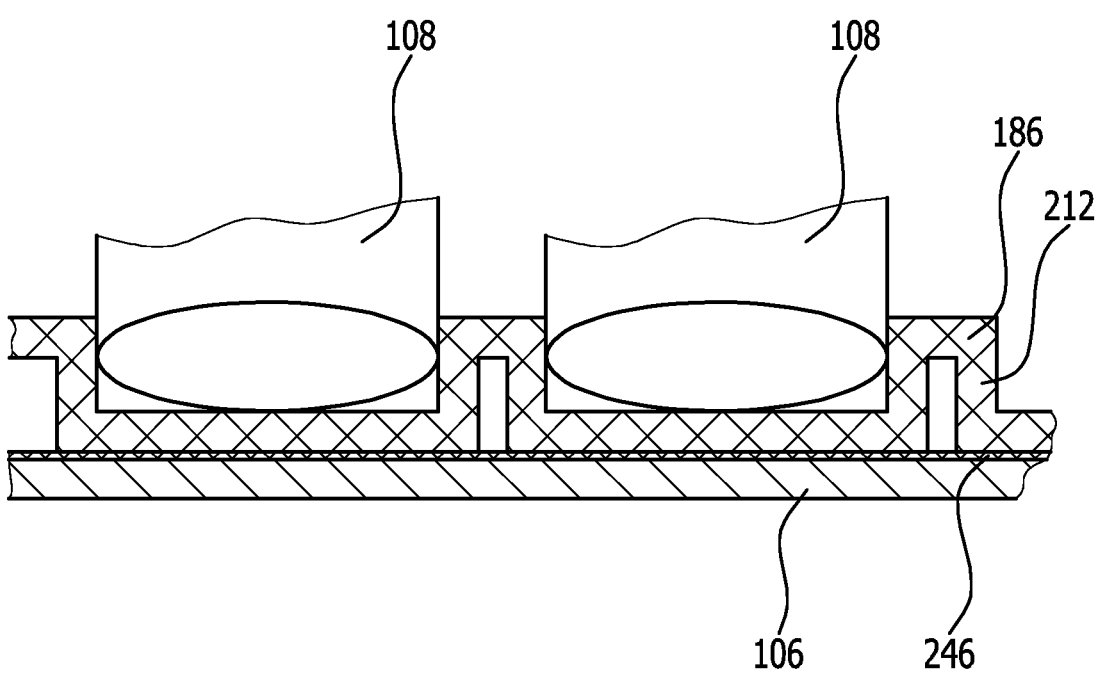
FIG. 25 is an enlarged representation of the region XXV in FIG. 24.
Figure 26:
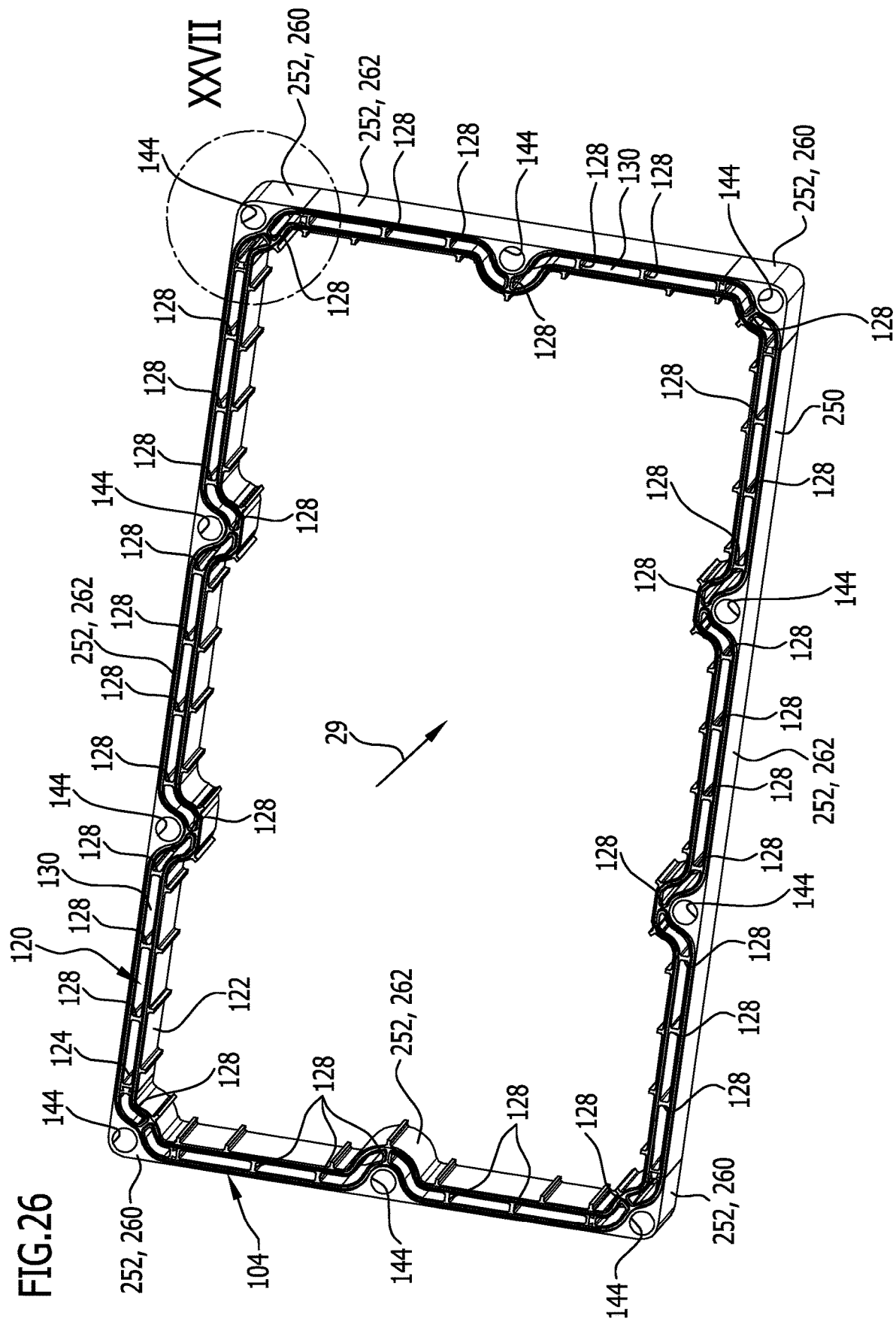
FIG. 26 is a schematic perspective view of a frame element of a battery module of a further embodiment of a battery device.
Figure 27:
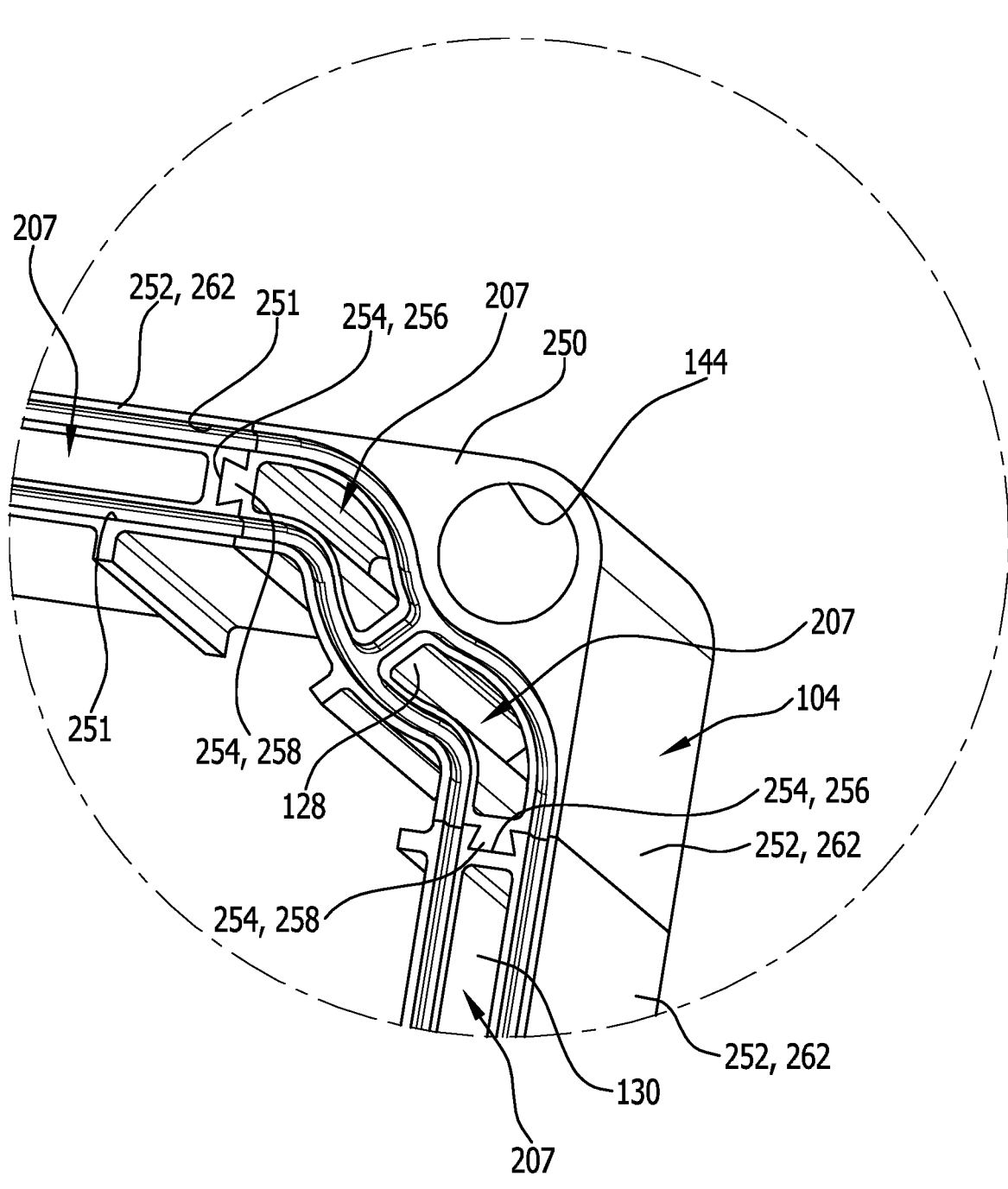
FIG. 27 is an enlarged representation of the region XXVII in FIG. 26.
Figure 28:
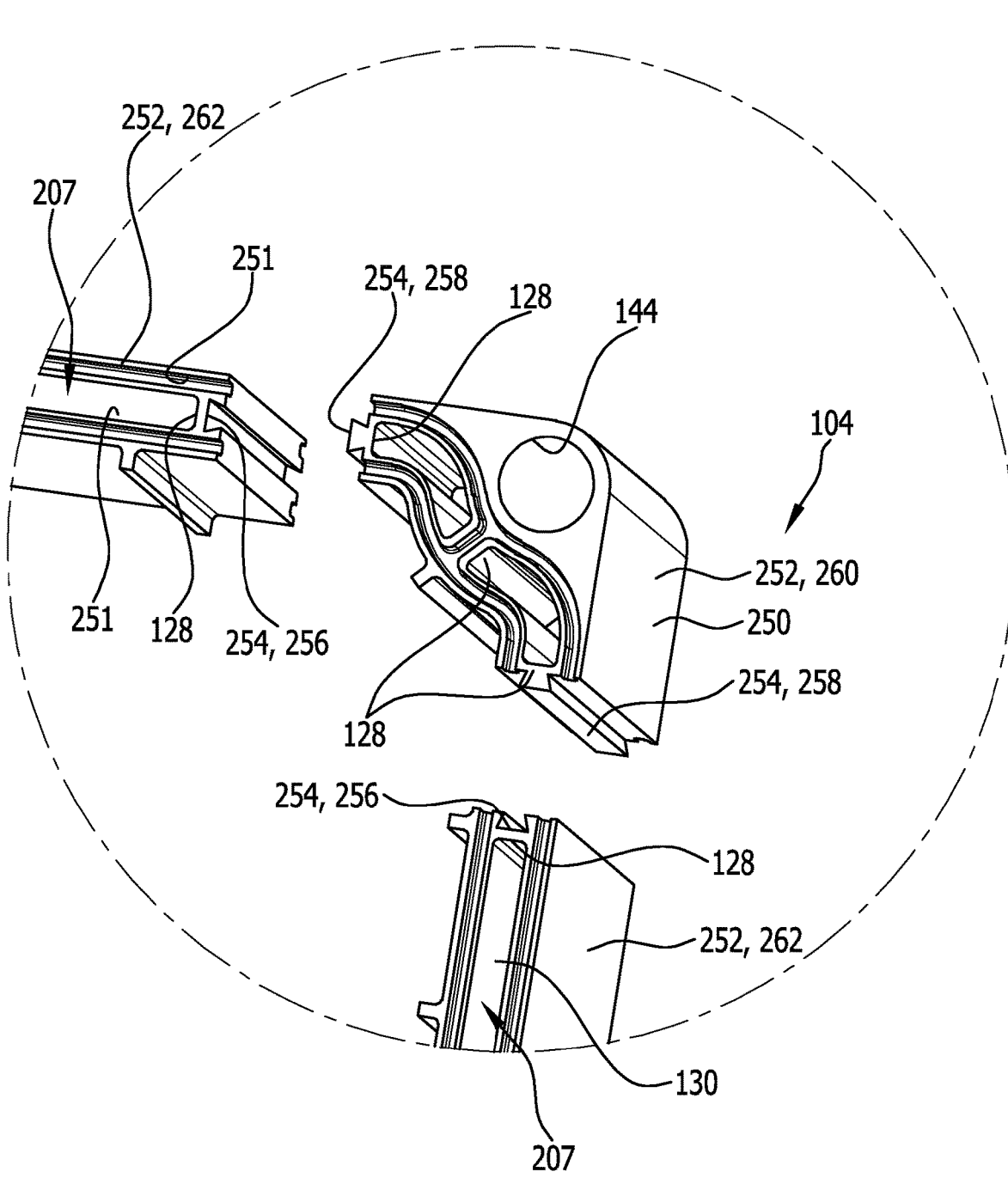
FIG. 28 a representation corresponding to the representation from FIG. 27 in an exploded view.
Figure 29:
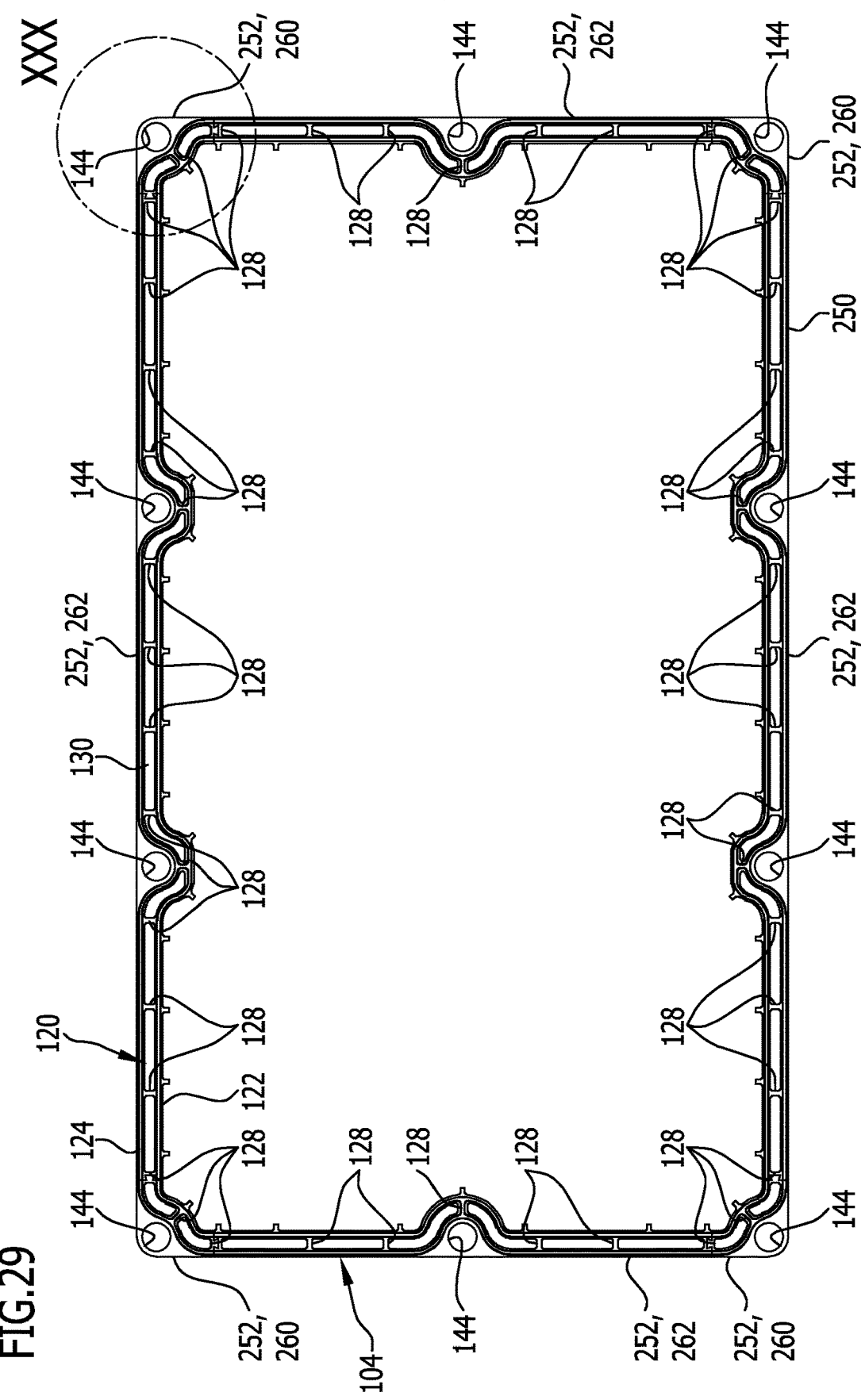
FIG. 29 is a schematic plan view of the frame element of FIG. 26 when viewed in the direction of arrow 29 in FIG. 26.
Figure 30:
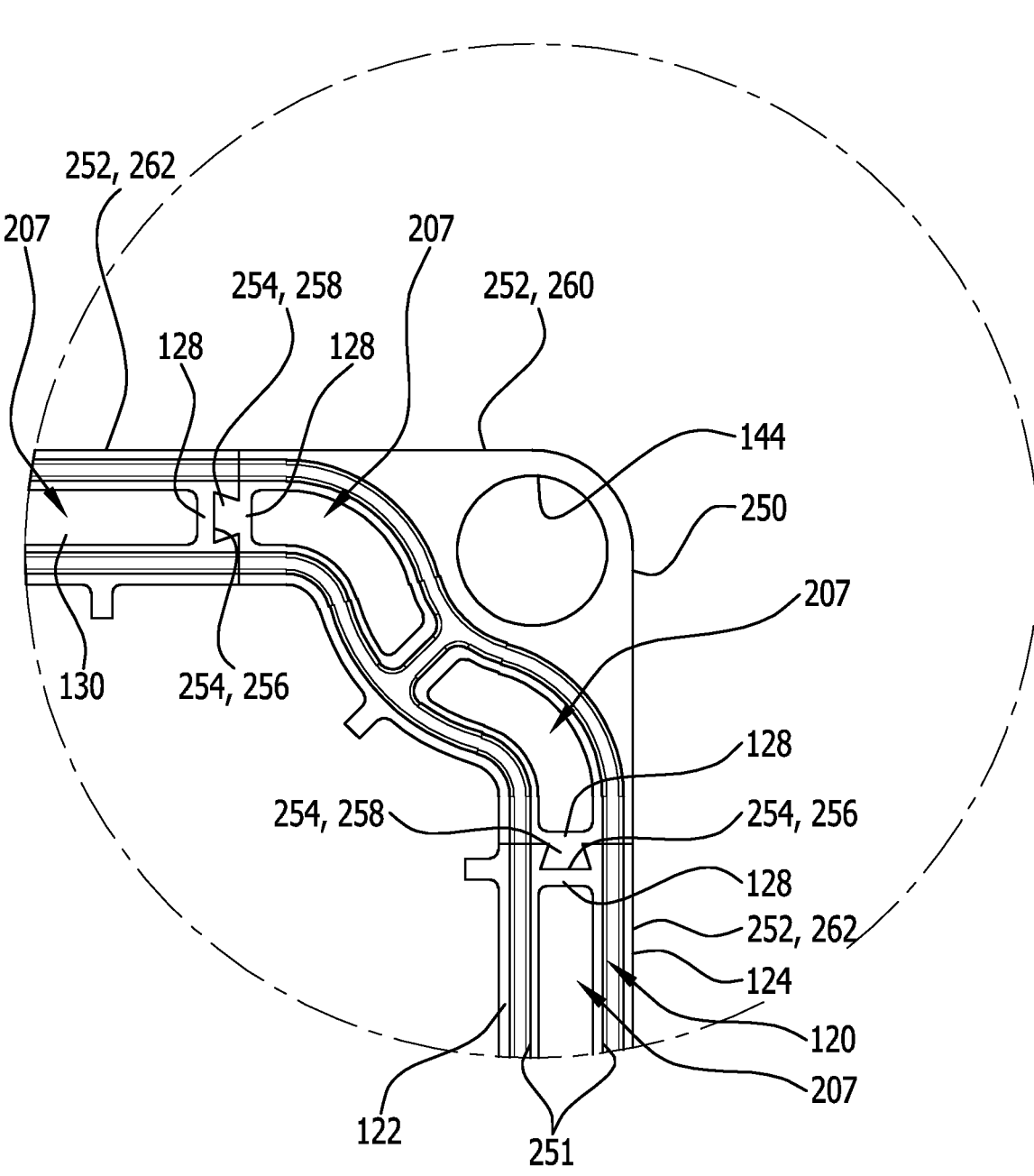
FIG. 30 is an enlarged representation of the region XXX in FIG. 29.

The plastically deformed layer element 212 preferably forms a holding body 186 of a battery module 102 (cf. FIGS. 23 to 25).

FIGS. 24 and 25 show a base element 106 of a battery module 102, the layer element 212 and the battery cells 108 fixed in the layer element 212 being fixed to the base element 106 of the battery module 102.

The layer element 212 is preferably integrally connected to the base element 106, in particular by means of a thermally conductive paste 246 (cf. FIG. 25).

An embodiment of a frame element 104 of a battery module 102 of a battery device 100 shown in FIGS. 26 to 30 differs from the embodiment of the frame element 104 of a battery module 102 of a battery device 100 shown in FIG. 18 substantially in that the frame element 104 comprises a frame element main body 250, which is designed in multiple parts.

It can be favorable if the frame element main body 250 comprises a receiving groove 251 for receiving a sealing element 134 on its end faces arranged perpendicular to the stacking direction 110 of the battery device 100.

It is conceivable, for example, for the frame element main body 250 to have two receiving grooves 251 for receiving a sealing element 134 on its end faces arranged perpendicular to the stacking direction 110 of the battery device 100, the two receiving grooves 251 arranged on a respective end face being arranged substantially parallel to one another.

The frame element 104 is preferably produced from a metallic material, such as aluminum.

It can be favorable if the frame element 104 is produced by means of aluminum die casting.

The frame element main body 250 comprises in particular a plurality of frame element main body parts 252.

The frame element main body parts 252 are preferably die-cast aluminum parts.

It can be favorable if the frame element main body parts 252 are or can be connected to one another in a form-fitting manner.

In particular, it can be favorable if a plurality of frame element main body parts 252 connected to one another in a form-fitting manner form a frame element main body 250 of a frame element 104 closed in a ring shape.

The frame element main body parts 252 preferably each comprise form-fitting elements 254, by means of which the frame element main body parts 252 can be connected to one another in a form-fitting manner.

It can be favorable if the frame element main body parts 252 can be connected to one another like a jigsaw puzzle.

The frame element main body parts 252 can be connected to one another, in particular end-to-end.

A frame element main body part 252 preferably comprises two or more than two form-fitting elements 254.

The frame element main body parts 252 can be connected to one another in particular in a direction parallel to the stacking direction 110 of the battery device 100.

It can be favorable if the frame element main body parts 252 can be connected to one another in a form-fitting manner by means of a tongue and groove connection, for example by means of a dovetail connection.

For example, it is conceivable that form-fitting elements 254 that can be connected to one another are designed as a connecting groove 256 and as a connecting rib 258.

It can be favorable if a connecting groove 256 and/or a connecting rib 258 is arranged parallel to the stacking direction 110 of the battery device 100 and/or extends parallel to the stacking direction 110 of the battery device 100.

In a cross section taken perpendicularly to the stacking direction 110, the connecting groove 256 and/or the connecting rib 258 are preferably formed substantially complementary to each other.

It can be favorable, for example, if the connecting groove 256 and/or the connecting rib 258 has a trapezoidal cross section perpendicular to the stacking direction 110 of the battery device 100, in particular in the form of an isosceles trapezoid.

The frame element main body parts 252 are in particular corner parts 260 and/or side parts 262 of the frame element main body 250.

For example, it is conceivable that the frame element main body 250 comprises a plurality of, for example four, corner parts 260 and/or that the frame element main body

250 comprises a plurality of side parts 262, one or more side parts 262 being arranged or arrangeable between two corner parts 260 in each case.

For example, it is conceivable that a frame element main body part 252 designed as a corner part 260 comprises two connecting ribs 258, a frame element main body part 252 designed as a side part 262 comprising one or two connecting grooves 256.

It can be favorable if the form-fitting elements 254 of the frame element main body parts 252 are each arranged on a connecting web 128 of a frame element main body part 252 or are formed thereon.

It can be favorable if a frame element main body part 252 of the frame element main body 250 comprises one or more temperature control chambers 207.

All connecting webs 128 preferably have a height parallel to the stacking direction 110 of the battery device 100, which height substantially corresponds to the height of the frame element 104 of a battery module 102.

In particular, a temperature control medium can be guided parallel to the stacking direction 110 of a battery device 110 by means of the connecting webs 128.

Otherwise, the embodiment of a frame element 104 of a battery module 102 of a battery device 100 shown in FIGS. 26 to 30 corresponds in terms of structure and function to the embodiment of the frame element 104 of a battery module 102 of a battery device 100 shown in FIG. 18, such that reference is made to the above description thereof.

The following are particular embodiments:

Embodiment 1

A battery device (100), the battery device (100) comprising one or more battery modules (102),
a respective battery module (102) comprising:
a frame element (104);
a base element (106); and
a plurality of battery cells (108).

Embodiment 2

The battery device (100) according to embodiment 1, characterized in that the battery modules (102) are arranged or arrangeable along a stacking direction (110).

Embodiment 3

The battery device according to embodiment 2, characterized in that the frame elements (104) of the respective battery modules (102) form housing portions of the battery device (100).

Embodiment 4

The battery device according to embodiment 2 or 3, characterized in that the longitudinal axes (126) of the battery cells (108) of a respective battery module (102) are arranged substantially parallel to the stacking direction (110) of the battery modules (102).

Embodiment 5

The battery device according to any of embodiments 2 to 4, characterized in that the battery cells (108) are round cells.

Embodiment 6

The battery device according to any of embodiments 2 to 5, characterized in that the battery device (100) comprises two end bodies (164), the battery modules (102) of the battery device (100) preferably being arranged between the two end bodies (164).

Embodiment 7

The battery device according to embodiment 6, characterized in that the two end bodies (164) comprise fastening elements, by means of which the battery device (100) can be fixed to a supporting structure, for example to a supporting structure of a vehicle.

Embodiment 8

The battery device according to any of embodiments 2 to 7, characterized in that the battery modules (102) of the battery device (100) are clamped or can be clamped together.

Embodiment 9

The battery device according to any of embodiments 2 to 8, characterized in that a respective battery module (102) comprises a sealing element (134).

Embodiment 10

The battery device according to any of embodiments 2 to 9, characterized in that the battery cells (108) of a respective battery module (102) are fixed to the base element (106) of the battery module (102).

Embodiment 11

The battery device according to any of embodiments 2 to 10, characterized in that the frame element (104) of a respective battery module (102) comprises or forms a temperature control device (137).

Embodiment 12

The battery device according to any of embodiments 2 to 11, characterized in that one, a plurality of or all battery modules (102) of the battery device (100) each have a degassing element for degassing a receiving space (112) of the respective battery module (102).

Embodiment 13

The battery device according to any of embodiments 2 to 12, characterized in that all battery modules (102) of the battery device (100) or more than 50% of the battery modules (102) of the battery device (100) are of identical design.

Embodiment 14

The battery device according to any of embodiments 2 to 13, characterized in that a respective battery module (102) comprises a propagation protection element.

Embodiment 15

The battery device according to any of embodiments 2 to 14, characterized in that the battery device (100) comprises one or more temperature control elements (200), which are each arranged between two adjacent battery modules (102).

Embodiment 16

The battery device according to any of embodiments 2 to 15, characterized in that the frame element (104) and/or the base element (106) are produced in particular in one piece from a metallic material, for example aluminum.

Embodiment 17

The battery device according to any of embodiments 2 to 16, characterized in that the frame element (104) is made of a plastic material and/or in that the base element (106) is made of a metallic material.

Embodiment 18

The battery device according to any of embodiments 2 to 17, characterized in that a respective battery module (102) comprises electrical contacting elements, by means of which two adjacent battery modules (102) can be connected to one another in series by stacking the battery modules (102) along the stacking direction (110).

Embodiment 19

The battery device according to any of embodiments 2 to 18, characterized in that a respective battery module (102) comprises one or more spacer elements (142), by means of which the base elements (106) of the battery modules (102) are arranged or can be arranged substantially parallel to one another.

Embodiment 20

The battery device according to any of embodiments 2 to 19, characterized in that a respective battery module (102) comprises a detection device for detecting the cell voltages of the battery cells (108) of the battery module (102) and/or for detecting the temperatures of the battery cells (108) of the battery module (102) and/or in that a respective battery module (102) comprises a balancer for balancing the battery cells (108) of the battery module (102).

Embodiment 21

The battery device according to any of embodiments 1 to 20, characterized in that the frame element (104) of a respective battery module (102) comprises or is formed from a plastic material.

Embodiment 22

The battery device according to embodiment 21, characterized in that the frame element (104) is an injection-molded component, in particular a plastic injection-molded component.

Embodiment 23

The battery device according to any of embodiments 1 to 22, characterized in that the frame element (104) comprises a double wall (120), in particular a double wall (120) closed in a ring shape.

Embodiment 24

The battery device according to embodiment 23, characterized in that the double wall (120) of the frame element (104) comprises an inner wall element (122) and an outer wall element (124).

Embodiment 25

The battery device according to embodiment 23 or 24, characterized in that a temperature control medium can flow through the double wall (120) of the frame element (104), in particular parallel to a stacking direction (110) of the battery device (100).

Embodiment 26

The battery device according to any of embodiments 23 to 25, characterized in that the double wall (120) of the frame element (104) delimits a temperature control space (130) of the respective battery module (102), preferably at least on two sides.

Embodiment 27

The battery device according to any of embodiments 1 to 26, characterized in that the frame element (104) comprises a frame element main body (250) that is designed in multiple parts, the frame element main body (250) in particular comprising a plurality of frame element main body parts (252).

Embodiment 28

The battery device according to embodiment 27, characterized in that the frame element main body parts (252) of the frame element main body (250) are or can be connected to one another in a form-fitting manner, the frame element main body parts (252) preferably each comprising one or more form-fitting elements (254), by means of which the frame element main body parts (252) are connected to each other in a form-fitting manner.

Embodiment 29

The battery device according to any of embodiments 21 to 25, characterized in that the base element (106) of a respective battery module (102) comprises one or more passage openings (132) that in particular open into a temperature control space (130) of the battery module (102).

Embodiment 30

The battery device according to any of embodiments 1 to 29, characterized in that a respective battery module (102) comprises two sealing elements (134), a first sealing element (134) being arranged between the frame element (104) and the base element (106) of the battery module (102) and/or a second sealing element (134) being arranged between the frame element (104) and the base element (106) of an adjacent battery module (102).

Embodiment 31

The battery device according to any of embodiments 1 to 30, characterized in that a respective battery module (102) comprises one or more spacer elements (142), by means of which the base elements (106) of the battery modules (102) are arranged or can be arranged substantially parallel to one another.

Embodiment 32

The battery device according to embodiment 31, characterized in that the one or more spacer elements (142) of a respective battery module (102) each comprise two contact surfaces (146) arranged on opposing sides of the spacer element (142), a respective spacer element (142) contacting the base element (106) of the battery module (102) with a first contact surface (146) and the spacer element (142) contacting or being able to contact the base element (106) of an adjacent battery module (102) with a second contact surface (146).

Embodiment 33

The battery device according to embodiment 32, characterized in that the two contact surfaces (146) of a spacer element (142) of a respective battery module (102) are at a distance (148) from one another, which distance substantially corresponds to a height (150) of a wall (111), in particular a double wall (120), of the battery module (102) taken parallel to the stacking direction (110).

Embodiment 34

The battery device according to any of embodiments 31 to 33, characterized in that the spacer elements (142) of a respective battery module (102) are bolt elements (152) or sleeve elements (154).

Embodiment 35

The battery device according to any of embodiments 31 to 33, characterized in that a spacer element of a respective battery module (102) is formed by the frame element (104) of the battery module (102).

Embodiment 36

The battery device according to any of embodiments 31 to 34, characterized in that the battery modules (102) of the battery device (100) are clamped together by means of the spacer elements (142) or in that the battery modules (102) of the battery device (100) are clamped by means of clamping elements (162) passed through the spacer elements (142).

Embodiment 37

The battery device according to any of embodiments 1 to 36, characterized in that the frame element (104) of a respective battery module (102) comprises one or more stacking projections (168) projecting away from the frame element (104) parallel to a stacking direction (110) of the battery device (100) and/or one or more stacking recesses (170), in which stacking recesses stacking projections (168) of a frame element (104) of an adjacent battery module (102) can be received.

Embodiment 38

The battery device according to any of embodiments 1 to 37, characterized in that the frame element (104) of a respective battery module (102) is connected or can be connected, for example clipped, to the base element (106) of the battery module (102) in a force-fitting and/or form-fitting manner.

Embodiment 39

The battery device according to any of embodiments 1 to 38, characterized in that the frame element (104) of a respective battery module (102) comprises a stiffening structure (178), for example a stiffening rib structure (180), on a circumferential surface of the frame element (104).

Embodiment 40

The battery device according to any of embodiments 1 to 39, characterized in that one or more, in particular all, battery modules (102) of the battery device (100) are of identical design.

Embodiment 41

The battery device according to any of embodiments 1 to 40, characterized in that the base element (106) of a respective battery module (102) comprises or is formed from a metallic material and forms part of an outer surface (184) of the battery device (100).

Embodiment 42

The battery device according to embodiment 41, characterized in that the base elements (106) of the battery modules (102) protrude beyond the frame elements (104) of the battery modules (102) at least in portions, for example closed in a ring shape, perpendicular to a stacking direction (110) of the battery device (100).

Embodiment 43

The battery device according to embodiment 41 or 42, characterized in that the battery device (100) comprises a heat sink and/or a temperature control element, which are thermally coupled to one or more, preferably to all, base elements (106) of the battery device (100).

Embodiment 44

The battery device according to any of embodiments 41 to 43, characterized in that a respective battery module (102) also comprises a holding body (186) for holding the battery cells (108) of the respective battery module (102), which holding body is connected, in particular integrally, to the base element (106) of the battery module (102).

Embodiment 45

The battery device according to embodiment 44, characterized in that the holding body (186) of a respective battery module (102) comprises a plurality of receiving openings (188), in each of which a battery cell (108) of the battery module (102) is received.

Embodiment 46

The battery device according to embodiment 44 or 45, characterized in that the holding body (186) of a respective battery module (102) comprises a honeycomb structure (190) or is formed by a honeycomb structure (190).

Embodiment 47

The battery device according to any of embodiments 44 to 46, characterized in that the holding body (186) of a respective battery module (102) is injection molded onto the base element (106) of the battery module (102).

Embodiment 48

The battery device according to any of embodiments 44 to 47, characterized in that the holding body (186) is designed in one piece.

Embodiment 49

The battery device according to any of embodiments 44 to 48, characterized in that a respective battery module (102) also comprises a sealing element (134), in particular two sealing elements (134), that is connected, in particular integrally, to the base element (106) of the battery module (102).

Embodiment 50

The battery device according to embodiment 49, characterized in that the two sealing elements (134) are arranged on two opposing sides of the base element (106) of a respective battery module (102), in particular injection molded onto the base element (106).

Embodiment 51

The battery device according to embodiment 49 or 50, characterized in that the sealing element (134) comprises a first sealing portion (136) and a second sealing portion (138).

Embodiment 52

The battery device according to any of embodiments 41 to 51, characterized in that the battery cells (108) of a respective battery module (102) are thermally coupled to the base element (106) of the battery module (102).

Embodiment 53

The battery device according to any of embodiments 41 to 52, characterized in that the base element (106) of a respective battery module (102) comprises one or more temperature control channels, for example a temperature control channel structure.

Embodiment 54

The battery device according to any of embodiments 41 to 53, characterized in that the base element (106) of a respective battery module (102) is a hybrid component, in particular a metal-elastomer hybrid component.

Embodiment 55

A method for fixing battery cells (108), the method comprising:
  providing a layer element (212);
  providing a plurality of battery cells (108);
  fixing the battery cells (108) in the layer element (212) by means of, in particular, plastic deformation of the layer element (212).

Embodiment 56

The method according to embodiment 55, characterized in that the battery cells (108) are fixed in the layer element

US 12,597,661 B2

(212) by heating the layer element (212) and/or by subsequently cooling the layer element (212).

Embodiment 57

The method according to embodiment 55 or 56, characterized in that the layer element (212) is plastically deformed by heating or in that the layer element (212) is heated and the heated layer element (212) is then plastically deformed.

Embodiment 58

The method according to embodiment 56 or 57, characterized in that the layer element (212) is cooled after heating.

Embodiment 59

The method according to any of embodiments 55 to 58, characterized in that the layer element (212) is shrunk onto the battery cells (108).

Embodiment 60

The method according to any of embodiments 55 to 59, characterized in that the battery cells (108) are aligned relative to one another, in particular by means of a mold (214), before they are fixed in the layer element (212).

Embodiment 61

The method according to embodiment 60, characterized in that the battery cells (108) are initially aligned parallel to one another and/or in a predetermined pattern.

Embodiment 62

The method according to embodiment 61, characterized in that one or more battery cells (108) are moved parallel to a longitudinal axis (126) of the battery cells (108) after the parallel alignment and/or after the alignment in a predetermined pattern.

Embodiment 63

The method according to embodiment 62, characterized in that one or more battery cells (108) are moved parallel to a longitudinal axis (126) of the battery cells (108) to such an extent that base surfaces (238) of all battery cells (108) are arranged substantially in a single plane.

Embodiment 64

A battery device (100), the battery device (100) comprising one or more battery modules (102),
a respective battery module (102) comprising:
a frame element (104);
a base element (106); and
a plurality of battery cells (106),
the battery cells (108) being fixed in a layer element (212) by means of the method according to any of embodiments 55 to 63 and
the layer element (212) and the battery cells (108) fixed in the layer element (212) being fixed to the base element (106) of the battery module (102).

The invention claimed is:
1. A battery device, the battery device comprising one or more battery modules, at least one of the battery modules comprising:
a frame element;
a base element;
a receiving space comprising a plurality of battery cells;
one or more stacking protrusions protruding in a stacking direction of the battery device;
one or more stacking recesses, in which stacking recesses stacking protrusions of a frame element of an adjacent battery module can be received; and
a sealing element in addition to the one or more stacking protrusions;
wherein
the frame element comprises a double wall, the double wall comprising an inner wall element and an outer wall element, wherein the inner wall element is closer to the receiving space than the outer wall element, and
wherein at least part of at least one stacking protrusion of the one or more stacking protrusions and/or at least part of at least one stacking recess of the one or more stacking recesses is in a radial direction offset from the inner wall element towards or onto the receiving space or in a radial direction offset from the outer wall element away from the receiving space.
2. The battery device according to claim 1, wherein the frame element and/or the base element is produced of a metallic material.
3. The battery device according to claim 1, wherein a temperature control medium can flow through the double wall of the frame element.
4. The battery device according to claim 1, wherein the double wall of the frame element delimits a temperature control space of the at least one of the battery modules.
5. The battery device according to claim 1, wherein the frame element comprises a frame element main body that is designed in multiple parts, the frame element main body in particular comprising a plurality of frame element main body parts.
6. The battery device according to claim 5, wherein the frame element main body parts of the frame element main body are or can be connected to one another in a form-fitting manner, the frame element main body parts preferably each comprising one or more form-fitting elements, by means of which the frame element main body parts are connected to each other in a form-fitting manner.
7. The battery device according to claim 1, wherein the base element of the at least one of the battery modules comprises one or more passage openings that open into a temperature control space of the battery module.
8. The battery device according to claim 1, wherein the sealing element is arranged between the frame element of the at least one of the battery modules and the base element of an adjacent battery module.
9. The battery device according to claim 1, wherein the at least one battery module comprises one or more spacer elements, by means of which the base elements of the battery modules are arranged or can be arranged substantially parallel to one another.
10. The battery device according to claim 9, wherein the one or more spacer elements of the at least one battery module comprise two contact surfaces arranged on opposing sides of the spacer element, a spacer element contacting the base element of the at least one battery module with a first contact surface and the spacer element contacting or being able to contact the base element of an adjacent battery module with a second contact surface.

11. The battery device according to claim 9, wherein a spacer element of a respective battery module is formed by the frame element of the battery module.

12. The battery device according to claim 1, wherein the frame element of the at least one battery module is connected or can be connected to the base element of the at least one battery module in a force-fitting and/or form-fitting manner.

13. The battery device according to claim 1, wherein one or more battery modules of the battery device are of identical design.

14. A battery device, the battery device comprising at least two battery modules which include a first battery module and a second battery module, the first battery module comprising:

a frame element of the first battery module;

a base element of the first battery module; and a plurality of battery cells of the first battery module, wherein the frame element of the first battery module comprises a double wall, the second battery module comprising:

a frame element of the second battery module;

a base element of the second battery module; and a plurality of battery cells of the second battery module, wherein the first battery module comprises two compressible sealing elements, a first sealing element of the first battery module being compressed between the frame element of the first battery module and the base element of the first battery module, wherein a material of the first sealing element is different from the materials of the frame element of the first battery module and the base element of the first battery module, and a second sealing element of the first battery module being compressed between the frame element of the first battery module and the base element of the second battery module, wherein a material of the second sealing element is different from the materials of the frame element of the first battery module and the base element of the second battery module.

15. The battery device according to claim 14, wherein the first battery module comprises one or more spacer elements, by means of which the base element of the first battery module and the base element of the second battery module are arranged or can be arranged substantially parallel to one another.

16. The battery device according to claim 14, wherein the frame element of the first battery module comprises one or more stacking projections projecting away from the frame element of the first battery module parallel to a stacking direction of the battery device and/or one or more stacking recesses, in which stacking recesses stacking projections of the frame element of the second battery module or of another adjacent battery module can be received.

* * * * *